(12) United States Patent
Crivelli et al.

(10) Patent No.: US 10,038,506 B2
(45) Date of Patent: *Jul. 31, 2018

(54) SINGLE-CHIP TRANSCEIVER WITH ELECTRONIC DISPERSION COMPENSATION FOR COHERENT OPTICAL CHANNELS

(71) Applicant: INPHI CORPORATION, Santa Clara, CA (US)

(72) Inventors: Diego Ernesto Crivelli, Cordoba (AR); Mario Rafael Hueda, Cordoba (AR); Hugo Santiago Carrer, Mediolaza (AR); Jeffrey Zachan, Newport Beach, CA (US); Vadim Gutnik, Irvine, CA (US); Martin Ignacio Del Barco, Cordoba (AR); Ramiro Rogelio Lopez, Cordoba (AR); Shih Cheng Wang, Pensacola Beach, CA (US); Geoffrey O. Hatcher, Orange, CA (US); Jorge Manuel Finochietto, Cordoba (AR); Michael Yeo, Irvine, CA (US); Andre Chartrand, Del Mar, CA (US); Norman L. Swenson, Mountain View, CA (US); Paul Voois, Ladera Ranch, CA (US); Oscar Ernesto Agazzi, Irvine, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/800,745

(22) Filed: Nov. 1, 2017

(65) Prior Publication Data

US 2018/0062760 A1 Mar. 1, 2018

Related U.S. Application Data

(63) Continuation of application No. 15/597,120, filed on May 16, 2017, now Pat. No. 9,838,140, which is a
(Continued)

(51) Int. Cl.
*H04B 10/00* (2013.01)
*H04B 10/61* (2013.01)
(Continued)

(52) U.S. Cl.
CPC ..... *H04B 10/6162* (2013.01); *H04B 10/2569* (2013.01); *H04B 10/40* (2013.01)

(58) Field of Classification Search
None
See application file for complete search history.

(56) References Cited

U.S. PATENT DOCUMENTS 6,782,211 B1    8/2004  Core
7,580,454 B2    8/2009  Carrer et al.
(Continued)

OTHER PUBLICATIONS

Statement of Applicant, Clariphy Communications, Submitted on Behalf of Assignee, Jan. 9, 2017, 1 page.
(Continued)

*Primary Examiner* — Daniel Dobson
(74) *Attorney, Agent, or Firm* — Richard T. Ogawa; Ogawa P.C.

(57) ABSTRACT

A transceiver for fiber optic communications. The transceiver can include a transmitter module having a transmitter host interface configured to receive an input host signal; a transmitter framer configured to frame the input host signal and to generate a framed host signal; and a transmitter coder configured to encode the framed host signal to generate an encoded host signal for transmission over a communication channel. The transceiver can also include a receiver module
(Continued)

having a bulk chromatic dispersion, fiber length estimation, and coarse carrier recovery circuit configured to equalize a digital input ingress signal to generate an equalized ingress signal; a receiver framer configured to frame the equalized ingress signal to generate a framed ingress signal; and a receiver host interface configured to output the framed ingress signal. The receiver host interface is compatible with a framing protocol of the receiver framer.

20 Claims, 53 Drawing Sheets

Related U.S. Application Data continuation of application No. 14/629,243, filed on Feb. 23, 2015, now Pat. No. 9,673,910, which is a continuation-in-part of application No. 13/608,993, filed on Sep. 10, 2012, now abandoned, and a continuation-in-part of application No. 12/938,040, filed on Nov. 2, 2010, now Pat. No. 8,761,609.

(60) Provisional application No. 61/533,016, filed on Sep. 9, 2011, provisional application No. 61/257,384, filed on Nov. 2, 2009.

(51) Int. Cl.
  *H04B 10/40* (2013.01)
  *H04B 10/2569* (2013.01)
  *H04J 14/00* (2006.01)

(56) References Cited

U.S. PATENT DOCUMENTS

| | | | |
|---|---|---|---|
| 7,606,498 B1 | 10/2009 | Wu et al. | |
| 7,623,797 B2 | 11/2009 | Crivelli et al. | |
| 7,769,305 B1 | 8/2010 | Roberts et al. | |
| 8,041,233 B2 | 10/2011 | Hueda et al. | |
| 8,103,173 B2 | 1/2012 | Schemmann et al. | |
| 8,116,367 B2 | 2/2012 | Carrer et al. | |
| 8,457,504 B2 | 6/2013 | Hueda et al. | |
| 8,565,297 B2 | 10/2013 | Carrer et al. | |
| 8,873,974 B2 | 10/2014 | Hueda et al. | |
| 2001/0035994 A1 | 11/2001 | Agazzi et al. | |
| 2002/0012493 A1 | 1/2002 | Newell et al. | |
| 2002/0196510 A1 | 12/2002 | Hietala et al. | |
| 2003/0035179 A1* | 2/2003 | May | H04B 10/2513 398/147 |
| 2004/0037572 A1 | 2/2004 | Matsuyama | |
| 2006/0013597 A1 | 1/2006 | Crivelli et al. | |
| 2007/0176814 A1 | 8/2007 | Grace | |
| 2009/0074428 A1 | 3/2009 | Liu | |
| 2009/0097860 A1 | 4/2009 | Papakos et al. | |
| 2009/0103926 A1 | 4/2009 | Hotchkiss et al. | |
| 2009/0169217 A1 | 7/2009 | Meagher et al. | |
| 2009/0317073 A1* | 12/2009 | Hotchkiss | H04J 3/1652 398/1 |
| 2010/0092181 A1 | 4/2010 | Roberts et al. | |

OTHER PUBLICATIONS

Agazzi, O., et al., "Timing Recovery in Digital Subscriber Loops," IEEE Transactions on Communications, vol. COM-33, No. 6, pp. 558-569, Jun. 1985.

Crivelli, D.E., et al., "Adaptive Digital Equalization in the Presence of Chromatic Dispersion, PMD, and Phase Noise in Coherent Fiber Optic Systems," IEEE 2004 Global Telecommunications Conference, Nov. 29-Dec. 3, 2004, vol. 4, pp. 2545-2551.

El-Chammas, M., et al., "A 12-GS/s 81-mW 5-bit Time-Interleaved Flash ADC With Background Timing Skew Calibration," IEEE Journal of Solid-Sate Circuits, vol. 46, No. 4, pp. 838-847, Apr. 2011.

Greshishchev, Y.M., et al., "A 40GS/s 6b ADC in 65nm CMOS," IEEE 2010 International Solid-State Circuits Conference Digest of Technical Papers, Feb. 7-11, 2010, pp. 390-391.

Leven, A., et al., "Real-Time Implementation of Digital Signal Processing for Coherent Optical Digital Communications Systems," IEEE Journal of Selected Topics in Quantum Electronics, vol. 16, No. 5, pp. 1227-1234, Sep./Oct. 2010.

Nelson, L.E., et al., "Performance of a 46-Gbps Dual-Polarization QPSK Transceiver With Real-Time Coherent Equalization Over High PMD Fiber," Journal of Lightwave Technology, vol. 27, No. 3, pp. 158-167, Feb. 1, 2009.

Roberts, K., et al., "Performance of Dual-Polarization Qpsk for Optical Transport Systems," Journal of Lightwave Technology, vol. 27, No. 16, pp. 3546-3559, Aug. 15, 2009.

Viterbi, A.J., et al., "Nonlinear Estimation of PSK-Modulated Carrier Phase with Application to Burst Digital Transmission," IEEE Transactions on Information Theory, vol. IT-29, No. 4, pp. 543-551, Jul. 1983.

United States Office Action, U.S. Appl. No. 13/608,993, dated Apr. 11, 2014, 10 pages.

United States Office Action, U.S. Appl. No. 12/938,040, dated May 6, 2013, 26 pages.

United States Office Action, U.S. Appl. No. 12/938,040, dated Jun. 19, 2012, 6 pages.

United States Office Action, U.S. Appl. No. 14/311,019, dated Aug. 25, 2015, 24 pages.

* cited by examiner

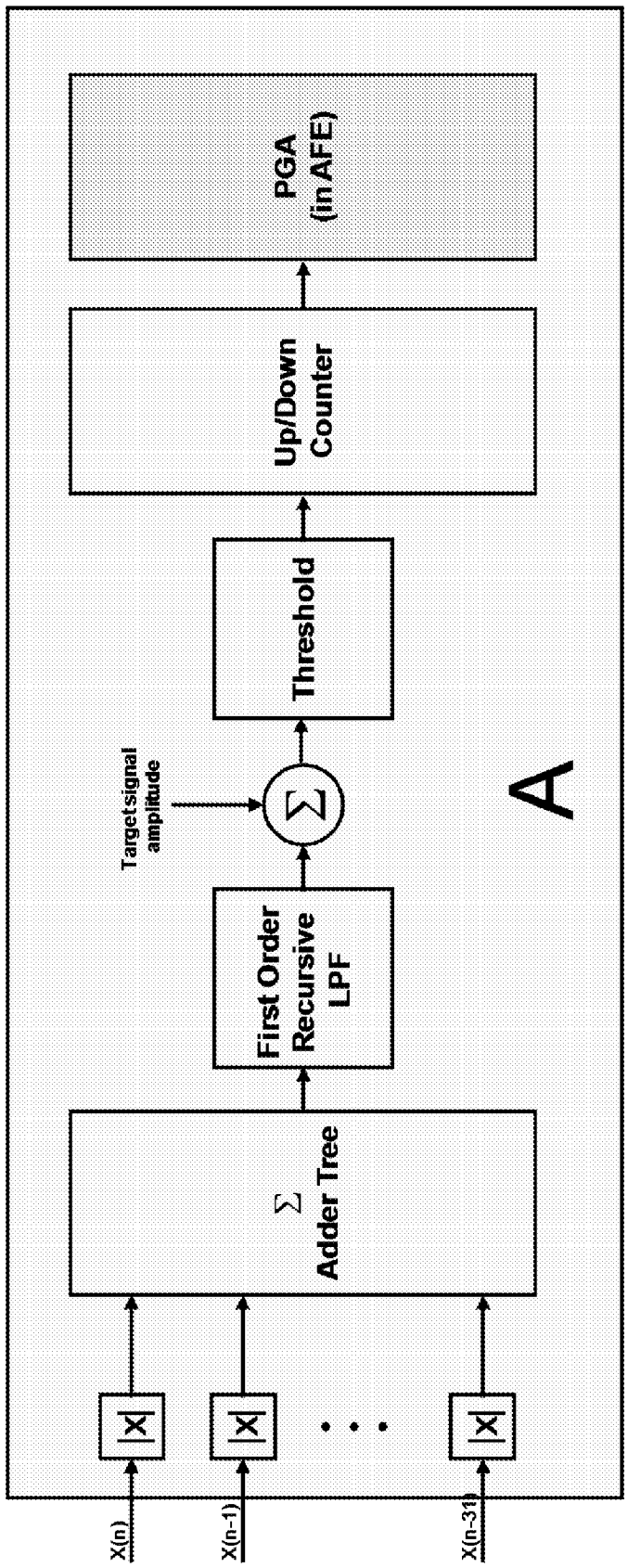
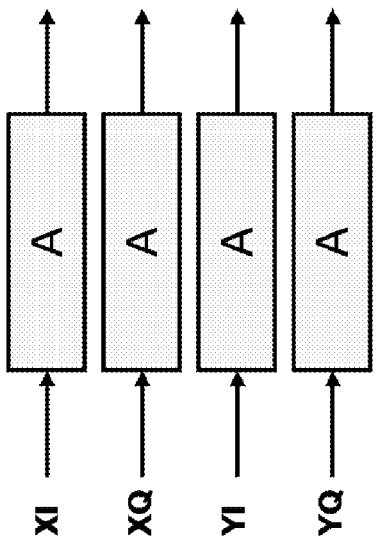
FIG. 4

$y_0 = c_{00}x_0 + c_{01}x_1 + c_{02}x_2 + c_{03}x_3$
$y_1 = c_{10}x_0 + c_{11}x_1 + c_{12}x_2 + c_{13}x_3$
$y_2 = c_{20}x_0 + c_{21}x_1 + c_{22}x_2 + c_{23}x_3$
$y_3 = c_{30}x_0 + c_{31}x_1 + c_{32}x_2 + c_{33}x_3$

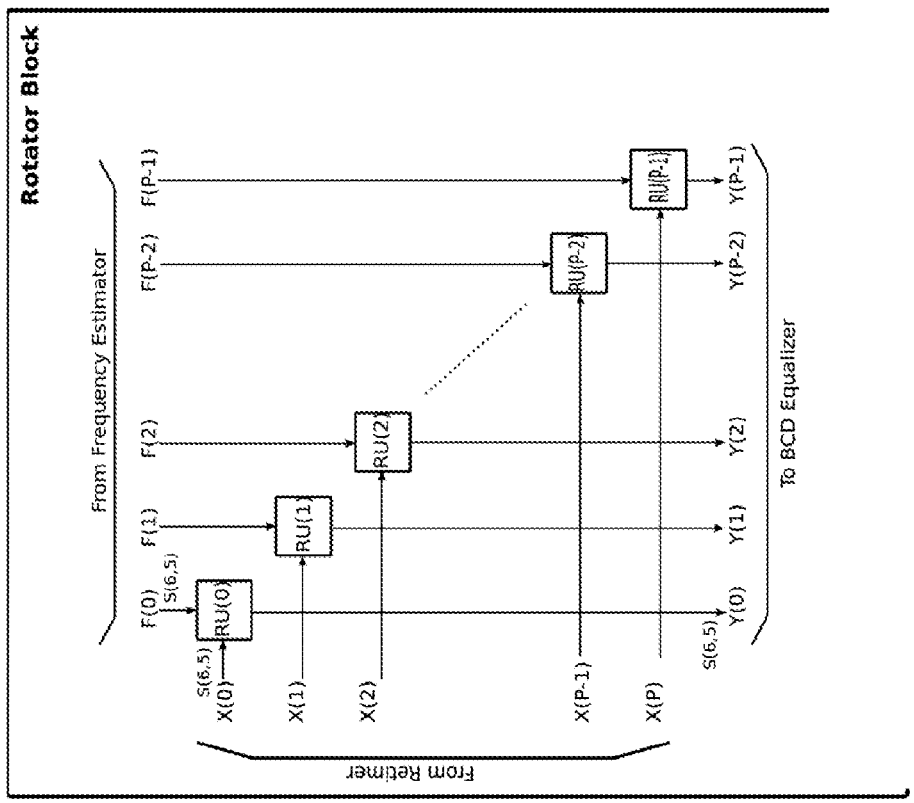
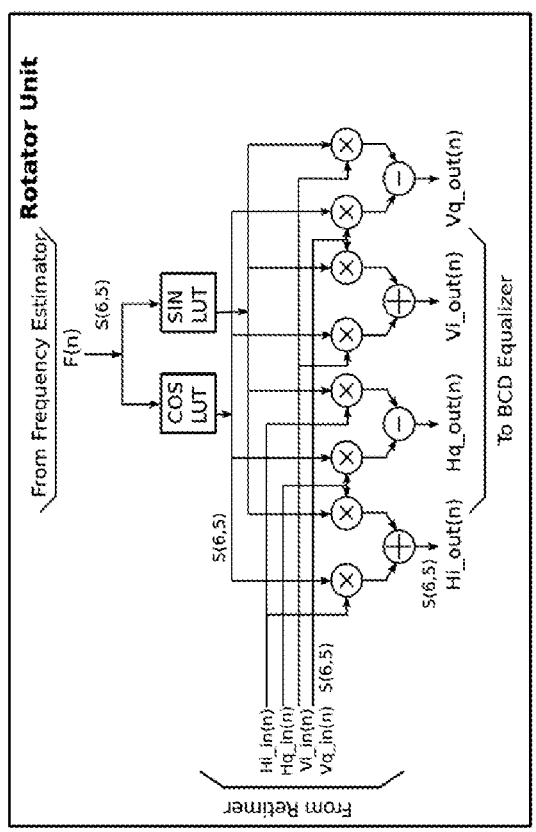
FIG. 17

Let e=(e1,e2,e3,e4) be the output of the FFE
The Stokes parameters for e are:

$$s_0 = e_1^2 + e_2^2 + e_3^2 + e_4^2$$
$$s_1 = e_1^2 + e_2^2 - e_3^2 - e_4^2$$
$$s_2 = 2(e_1 e_3 + e_2 e_4)$$
$$s_3 = 2(e_1 e_4 - e_2 e_3)$$

In the following we assume $S_0 = 1$

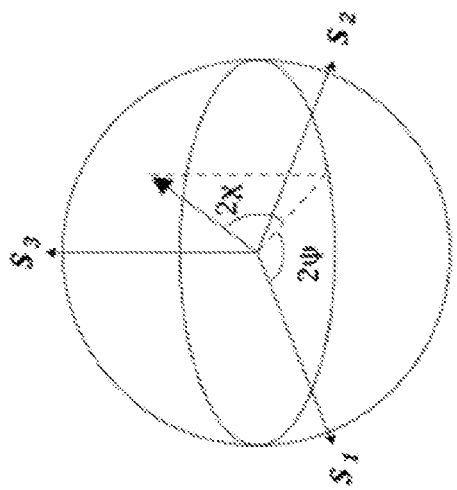

FIG. 34A

- Circularly polarized states are represented by $S_3=1$ or $S_3=-1$ (north or south poles)
- Linearly polarized states are represented by vectors in the equatorial plane
- Linearly polarized states aligned with the X and Y axes lie on the $S_1$ axis
- Linearly polarized states at 45° or 135° with the X axis lie on the $S_2$ axis

| X Polarization | | Y Polarization | | Stokes Parameters | | |
|---|---|---|---|---|---|---|
| $a_1$ | $a_2$ | $a_3$ | $a_4$ | $s_1$ | $s_2$ | $s_3$ |
| 1 | 1 | 1 | 1 | 0 | 1 | 0 |
| -1 | 1 | 1 | 1 | 0 | 0 | -1 |
| -1 | -1 | 1 | 1 | 0 | -1 | 0 |
| 1 | -1 | 1 | 1 | 0 | 0 | 1 |
| 1 | 1 | -1 | 1 | 0 | 0 | 1 |
| -1 | 1 | -1 | 1 | 0 | 1 | 0 |
| -1 | -1 | -1 | 1 | 0 | 0 | -1 |
| 1 | -1 | -1 | 1 | 0 | -1 | 0 |
| 1 | 1 | -1 | -1 | 0 | -1 | 0 |
| -1 | 1 | -1 | -1 | 0 | 0 | 1 |
| -1 | -1 | -1 | -1 | 0 | 1 | 0 |
| 1 | -1 | -1 | -1 | 0 | 0 | -1 |
| 1 | 1 | 1 | -1 | 0 | 0 | -1 |
| -1 | 1 | 1 | -1 | 0 | -1 | 0 |
| -1 | -1 | 1 | -1 | 0 | 0 | 1 |
| 1 | -1 | 1 | -1 | 0 | 1 | 1 |

FIG. 34B

Unwrapped phase error from plot on the left and least squares fit to phase error Samples of phase error (mod π/2) for a carrier frequency error of 312.5MHz

| Framing/CCR Operations |
| --- |
| Dynamically rotate X constellation by $\pi/(2T)$ |
| Dynamically rotate X constellation by $-\pi/(2T)$ |
| Dynamically rotate X constellation by $\pi/T$ |
| Dynamically rotate Y constellation by $\pi/(2T)$ |
| Dynamically rotate Y constellation by $-\pi/(2T)$ |
| Dynamically rotate Y constellation by $\pi/T$ |

| Framing Operations |
| --- |
| Swap X and Y polarizations |
| Rotate X constellation by $\pi/2$ |
| Rotate X constellation by $-\pi/2$ |
| Rotate X constellation by $\pi$ |
| Flip X constellation |
| Rotate Y constellation by $\pi/2$ |
| Rotate Y constellation by $-\pi/2$ |
| Rotate Y constellation by $\pi$ |
| Flip Y constellation |
| Shift Y polarization left by T |
| Shift Y polarization left by 2T |
| Shift Y polarization left by 3T |
| Shift Y polarization left by 4T |
| Shift Y polarization left by 5T |
| Shift Y polarization right by T |
| Shift Y polarization right by 2T |
| Shift Y polarization right by 3T |
| Shift Y polarization right by 4T |
| Shift Y polarization right by 5T |

FIG. 40

| | Condition | Alt. Implementation | This Work |
|---|---|---|---|
| OSNR [dB] Penalty at Condition | CD=55,000ps/nm | 0.5 | 0.5 |
| | DGD=100ps | 0.4 | <0.1 |
| | DGD=200ps | N/A | <0.1 |
| | SOPMD=4000ps² | 0.5 | <0.1 |
| | SOPMD=8000ps² | N/A | <0.1 |
| | SOP Rotation=50kHz | N/A | 0.3 |

FIG. 50

SINGLE-CHIP TRANSCEIVER WITH ELECTRONIC DISPERSION COMPENSATION FOR COHERENT OPTICAL CHANNELS

CROSS-REFERENCES TO RELATED APPLICATIONS

This application is a continuation of U.S. application Ser. No. 15/597,120 filed May 16, 2017, which is a continuation of U.S. patent application Ser. No. 14/629,243, entitled "Single-Chip Transceiver with Electronic Dispersion Compensation for Coherent Optical Channels," filed on Feb. 23, 2015 (now U.S. Pat. No. 9,673,910 issued Jun. 6, 2017), to Crivelli, et al. U.S. patent application Ser. No. 14/629,243 is a continuation-in-part of U.S. patent application Ser. No. 13/608,993, entitled "Single-Chip Transceiver with Electronic Dispersion Compensation for Coherent Optical Channels," filed on Sep. 10, 2012, to Crivelli, et al. U.S. patent application Ser. No. 13/608,993 claims priority under 35 U.S.C. § 119(e) to U.S. Provisional Patent Application Ser. No. 61/533,016, entitled "40 nm Single-Chip 50 Gb/s DP-QPSK/BPSK Transceiver with Electronic Dispersion Compensation for Coherent Optical Channels," filed on Sep. 9, 2011, to Crivelli, et al. U.S. patent application Ser. No. 13/608,993 is also a continuation-in-part of U.S. patent application Ser. No. 12/938,040, entitled "High-Speed Optical Communications System," filed Nov. 2, 2010 (now U.S. Pat. No. 8,761,609 issued Jun. 24, 2014), to Oscar E. Agazzi, et al., which claims priority under 35 U.S.C. § 119(e) to U.S. Provisional Patent Application Ser. No. 61/257,384, entitled "Optical Communication System Architecture and Implementation," filed Nov. 2, 2009, to Oscar Agazzi, et al. The subject matter of all of the foregoing is incorporated herein by reference in their entirety.

BACKGROUND OF THE INVENTION

1. Field of the Invention

This invention relates generally to high speed data communications.

2. Description of the Related Art

Optical fiber is widely used as a communications medium in high speed digital networks, including local area networks (LANs), storage area networks (SANs), and wide area networks (WANs). There has been a trend in optical networking towards ever-increasing data rates.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 4 is a block diagram of automatic gain control (AGC) of a digital receiver system.

FIG. 17 is a block diagram of a rotator block.

FIG. 34A is a diagram of a Poincare sphere and Stokes parameters.

FIG. 34B tabulates Stokes parameters for decision vectors.

FIG. 40 is a diagram illustrating an external framing technique.

FIG. 50 is a comparison of system performance of an embodiment of a chip versus an alternative implementation.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

An optical fiber communications link includes a transmitter coupled through optical fiber (the communications channel) to a receiver. A typical transmitter may include a serializer or parallel/serial converter (P/S) for receiving data from a data source on a plurality of parallel lines and providing serial data to modulator drivers. The drivers then drive modulators that modulate the in-phase and/or quadrature components of one or both polarizations of an optical carrier produced by a continuous wave laser source. The modulated optical waveform carrying the digital data is launched on optical fiber. In one particular approach, the incoming data is divided into four serial data streams, each of which drives a modulator. The four modulators account for the four possible combinations of the two polarizations (denoted X and Y) with the in-phase and quadrature components (denoted I and Q). Other types of modulators and transmitters/receivers can also be used.

On the receive side, a typical receiver includes an optical front end and a digital receiver backend. The optical front end typically includes a local oscillator laser and an integrated coherent receiver that outputs four analog electrical signals for the digital receiver to process, accounting for the two polarizations and the in-phase and quadrature component on each polarization of the received optical signal. Alternative embodiments may process fewer than four signals from the integrated coherent receiver; one of the two polarizations may be processed, and one of the in-phase and quadrature components on each polarization may be processed.

Figure 1:
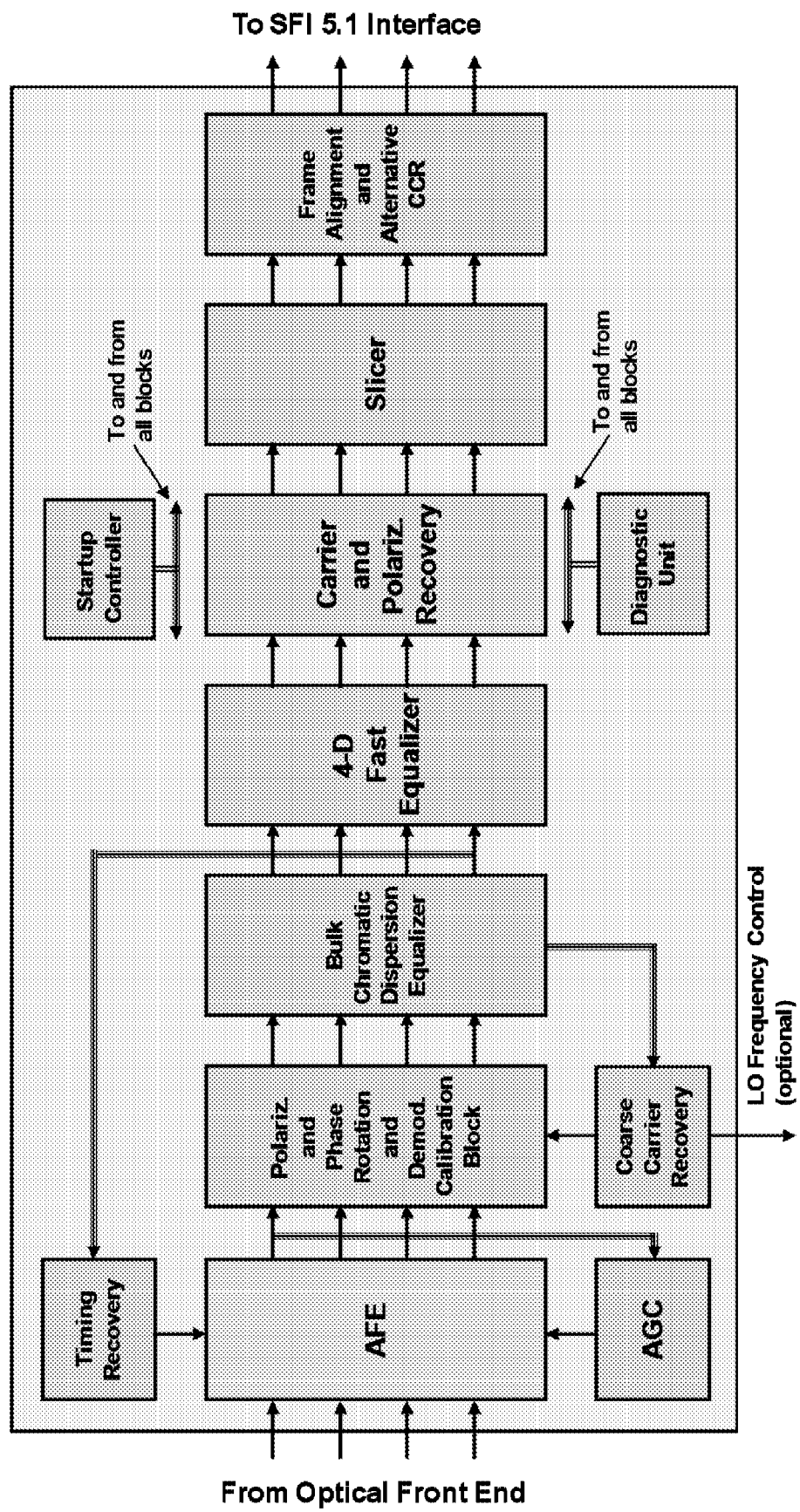
FIG. 1 is a block diagram of a digital receiver system.

FIG. 1 is a block diagram of a digital receiver system. This example receives signals from the optical front end and produces data to an SFI 5.1 interface (SERDES Framer Interface Level 5). The following example will be based on this particular interface and 40 Gb/s operation, although the invention is not limited to these specifics. The signal path from optical front end to SFI 5.1 interface has the following components: analog front end (AFE), polarization and phase rotation module and demodulation calibration block, bulk chromatic dispersion (BCD) equalizer, 4-D fast equalizer, carrier and polarization recovery module, slicer, and frame alignment and alternative CCR. Additional modules implemented in feedback loops include automatic gain control (AGC), timing recovery and coarse carrier recovery (CCR). The digital receiver system also includes a startup controller and diagnostic unit. Not all of these modules are required in every system. They are shown here for illustrative purposes. The remaining FIGS. 2-41 describe examples of the different modules, their functions and implementations in more detail.

Figure 2:
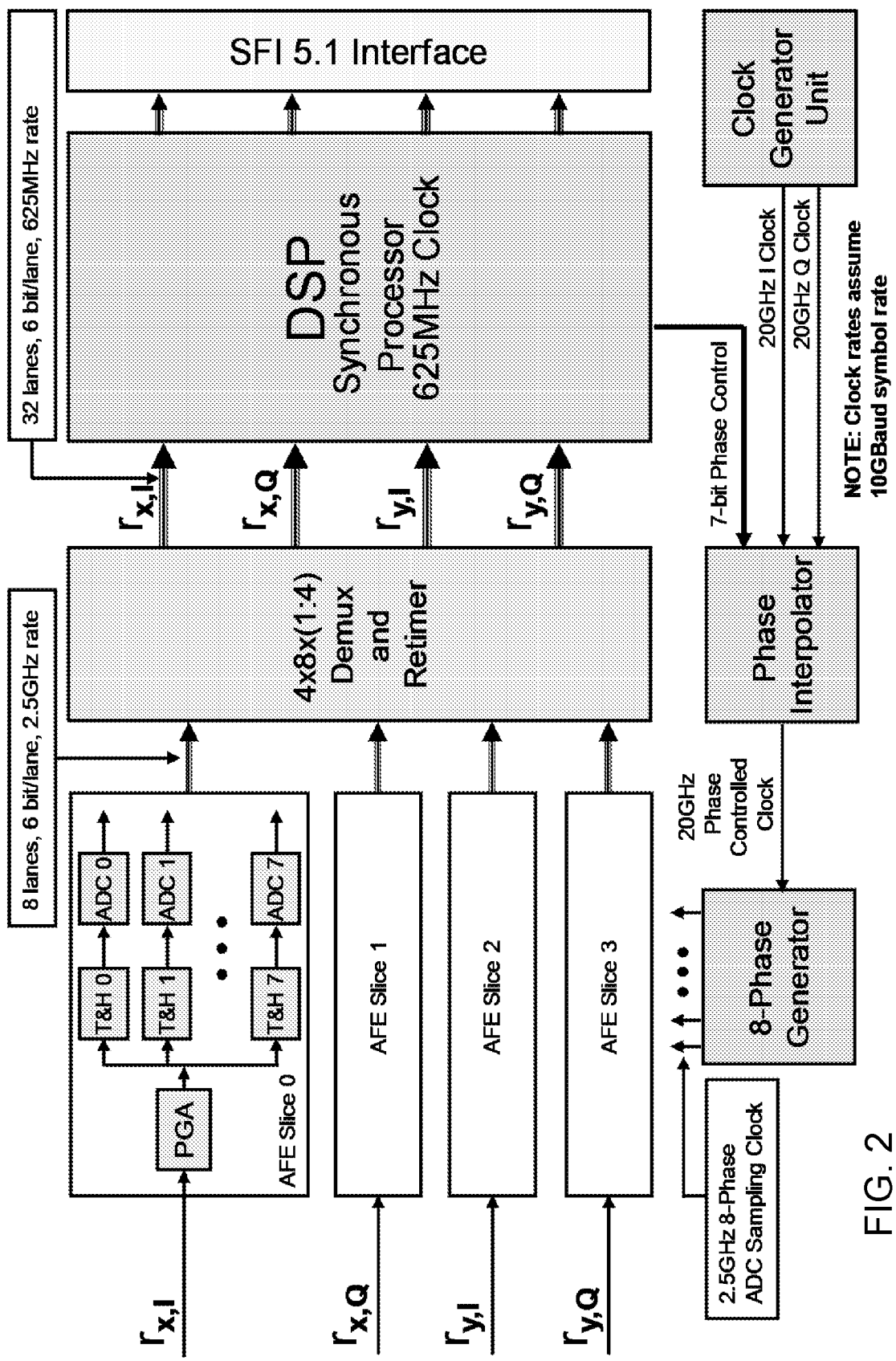
FIG. 2 is a block diagram that includes an analog front end (AFE) of a digital receiver system.

FIG. 2 is a block diagram that includes an analog front end (AFE) of a digital receiver system. In these figures, x and y represent two polarizations and I and Q represent in-phase and quadrature components. Thus, the different combinations of polarization and quadrature yield four channels. The AFE includes a programmable gain amplifier (PGA) and an interleaved analog to digital converter (ADC) (with 8 branches in this example). Each branch includes a track and hold (T&H) and sub-ADC (labeled ADC 0 through ADC 7).

Figure 3:
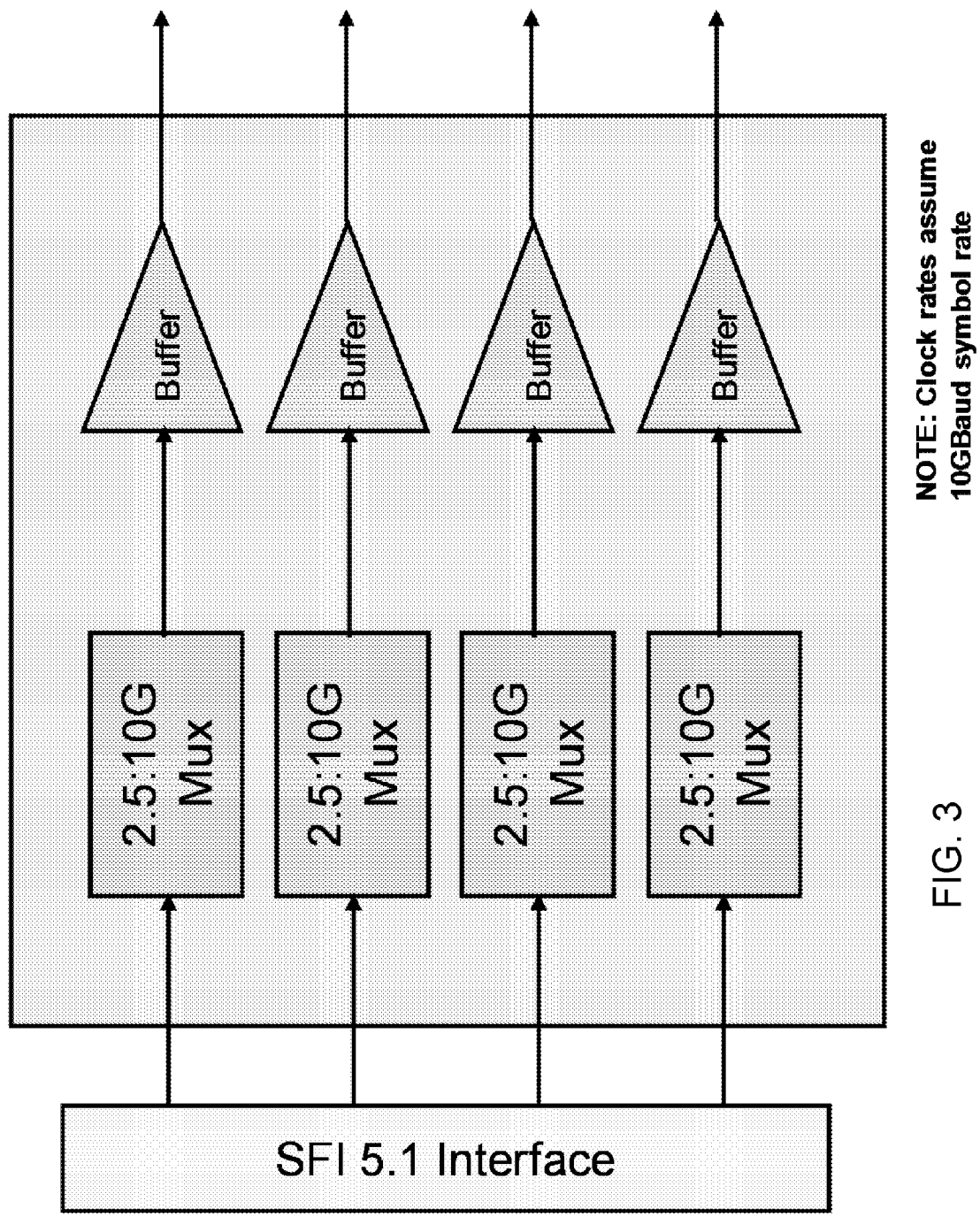
FIG. 3 is a block diagram of an analog front end for a transmitter.

FIG. 3 is a block diagram of an analog front end for a transmitter, for example if the receiver is to be combined with a transmitter to produce a transceiver.

FIG. 4 is a block diagram of automatic gain control (AGC) of a digital receiver system. Block A in the top part of FIG. 4 shows the feedback path for one channel. The PGA shown in block A is shown as part of the AFE in FIG. 2. The feedback path A is implemented for each of the four channels, as shown in the bottom part of FIG. 4.

Figure 5:
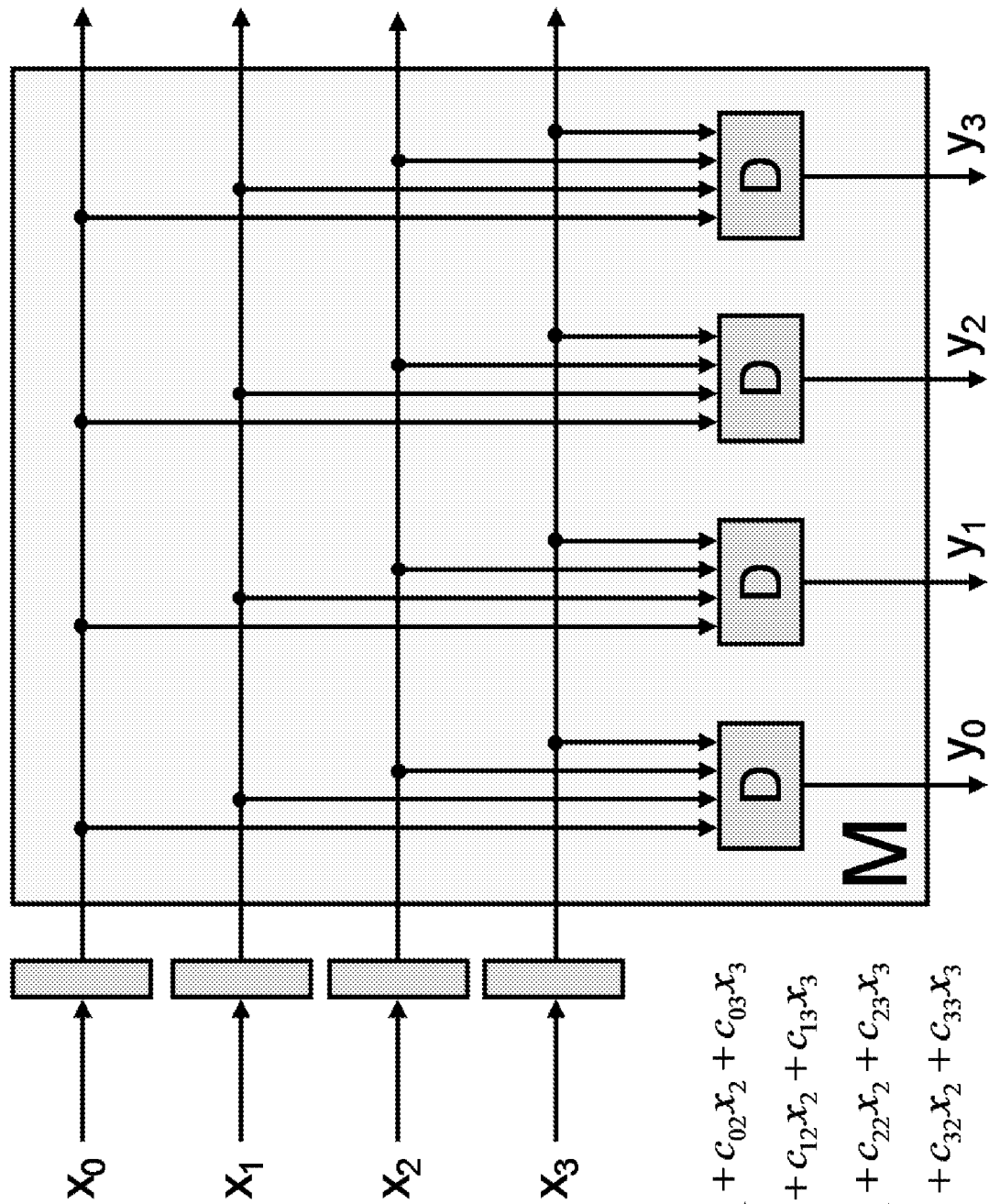
FIG. 5 is a block diagram of a demodulator calibration block of a digital receiver system.

FIG. 5 is a block diagram of a demodulator calibration block of a digital receiver system. This block M multiplies the 4-D input vector by a user-programmable 4×4 matrix. It is a building block of the FFE, reused here to calibrate the demodulator with user-provided parameters and to rotate the polarization and phase under control of the startup state machine. Besides matrix transformations, the calibration block also compensates the demodulator skews. This is done by digitally controlling the phase interpolators in the analog front-end (separate phase interpolators are used for the XI, XQ, YI, and YQ channels).

Figure 6:
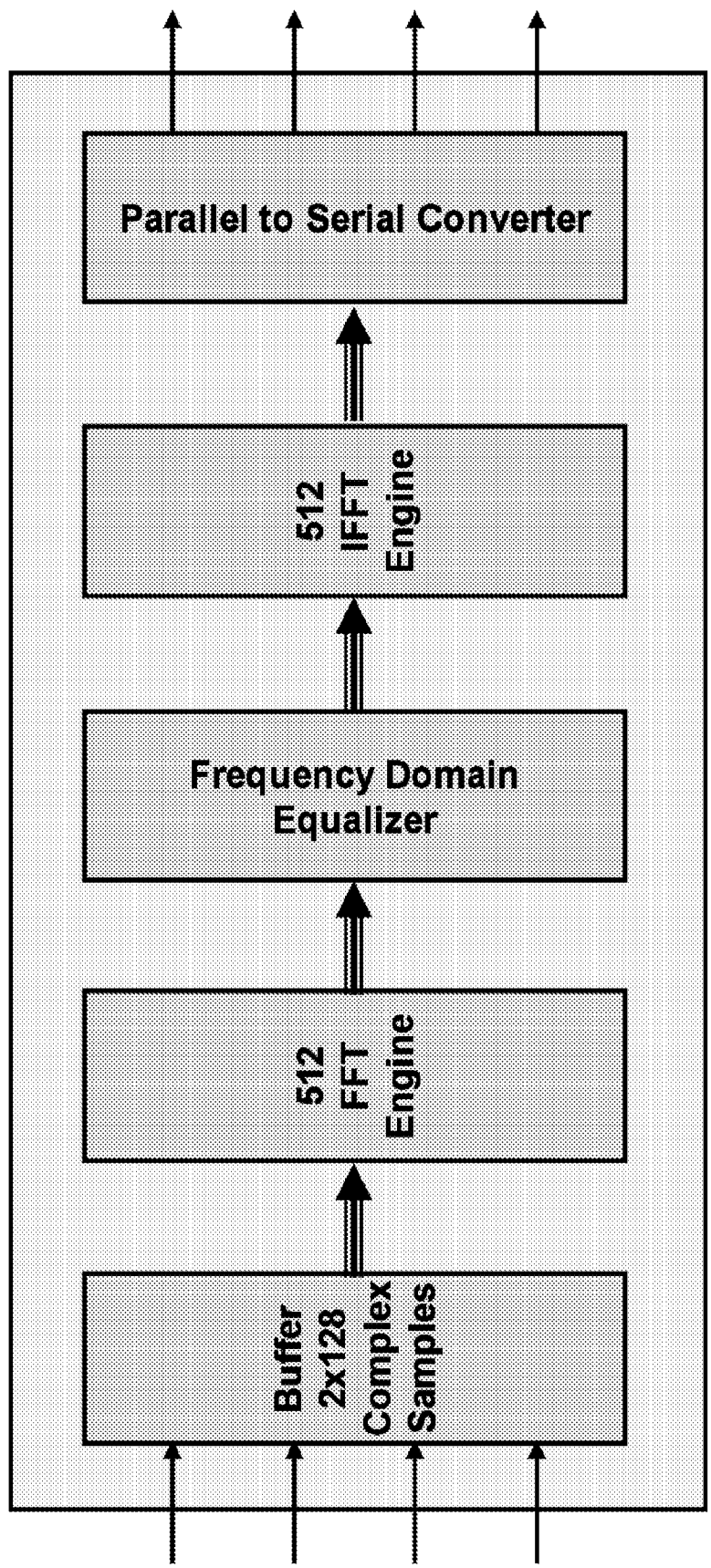
FIGS. 6-7 are block diagrams of a bulk chromatic dispersion (BCD) equalizer of a digital receiver system.
Figure 7:
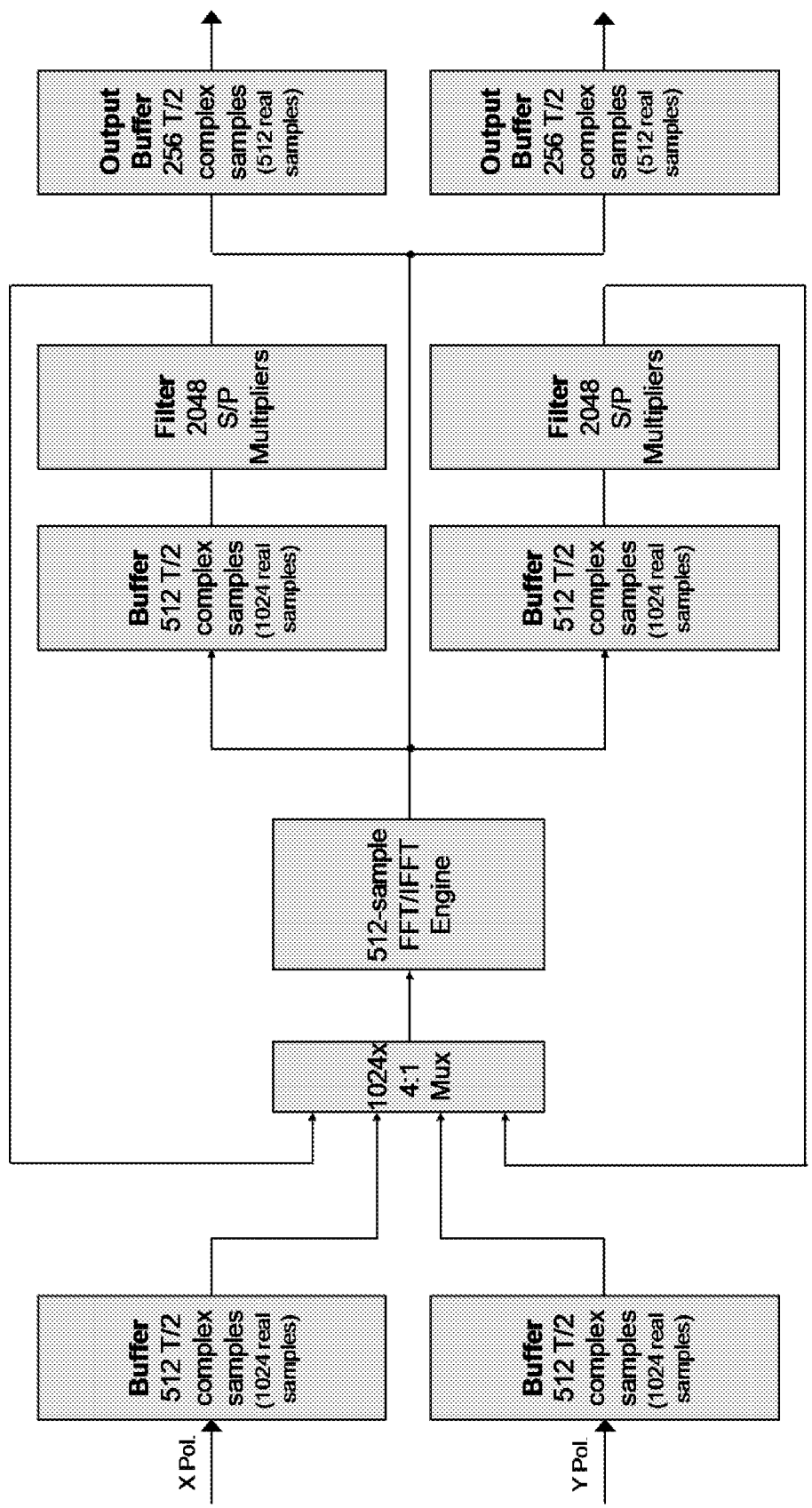
Figure 8:
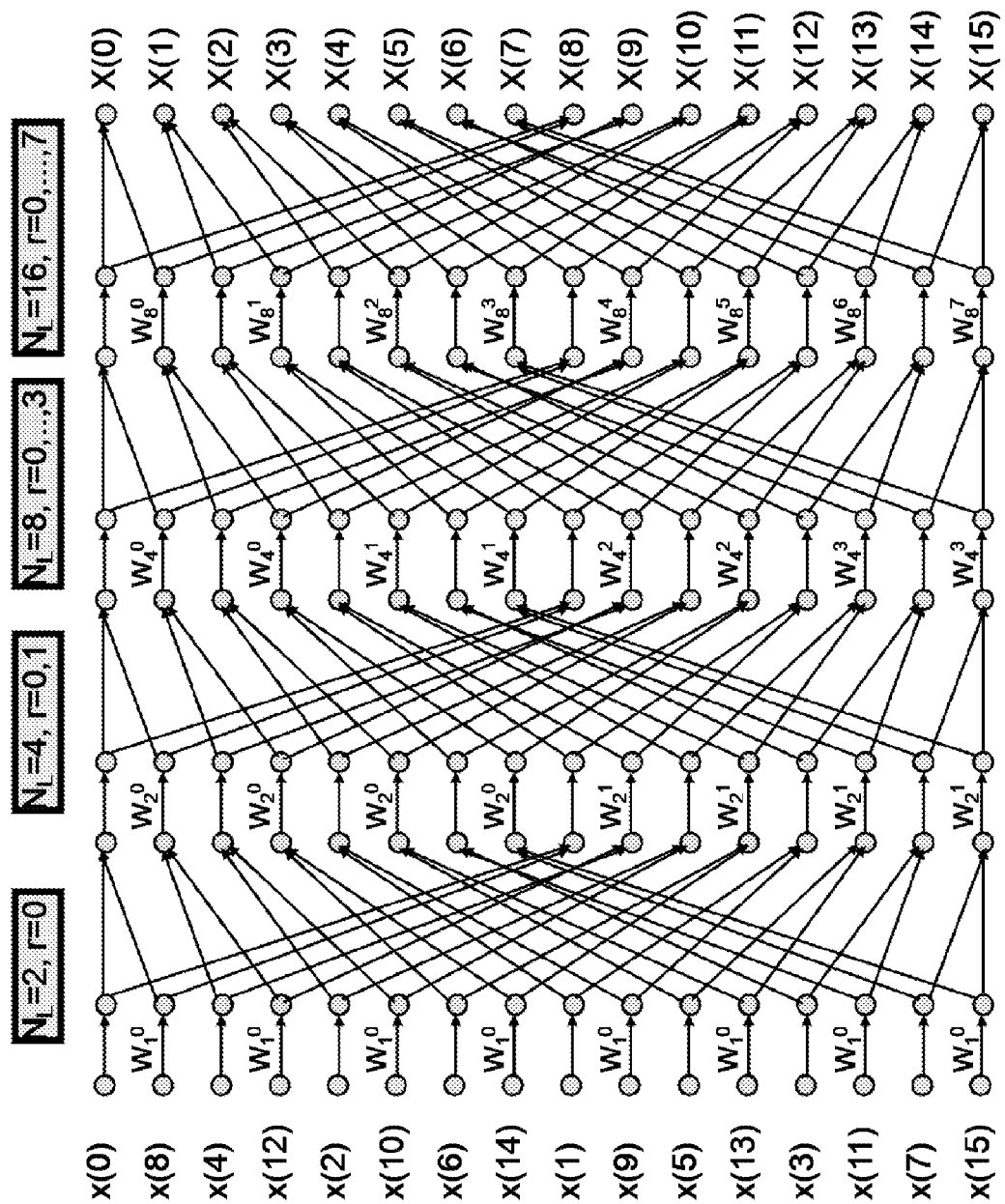
FIGS. 8-9 are block diagrams illustrating an FFT algorithm implementation and systolic processor architecture.
Figure 9:
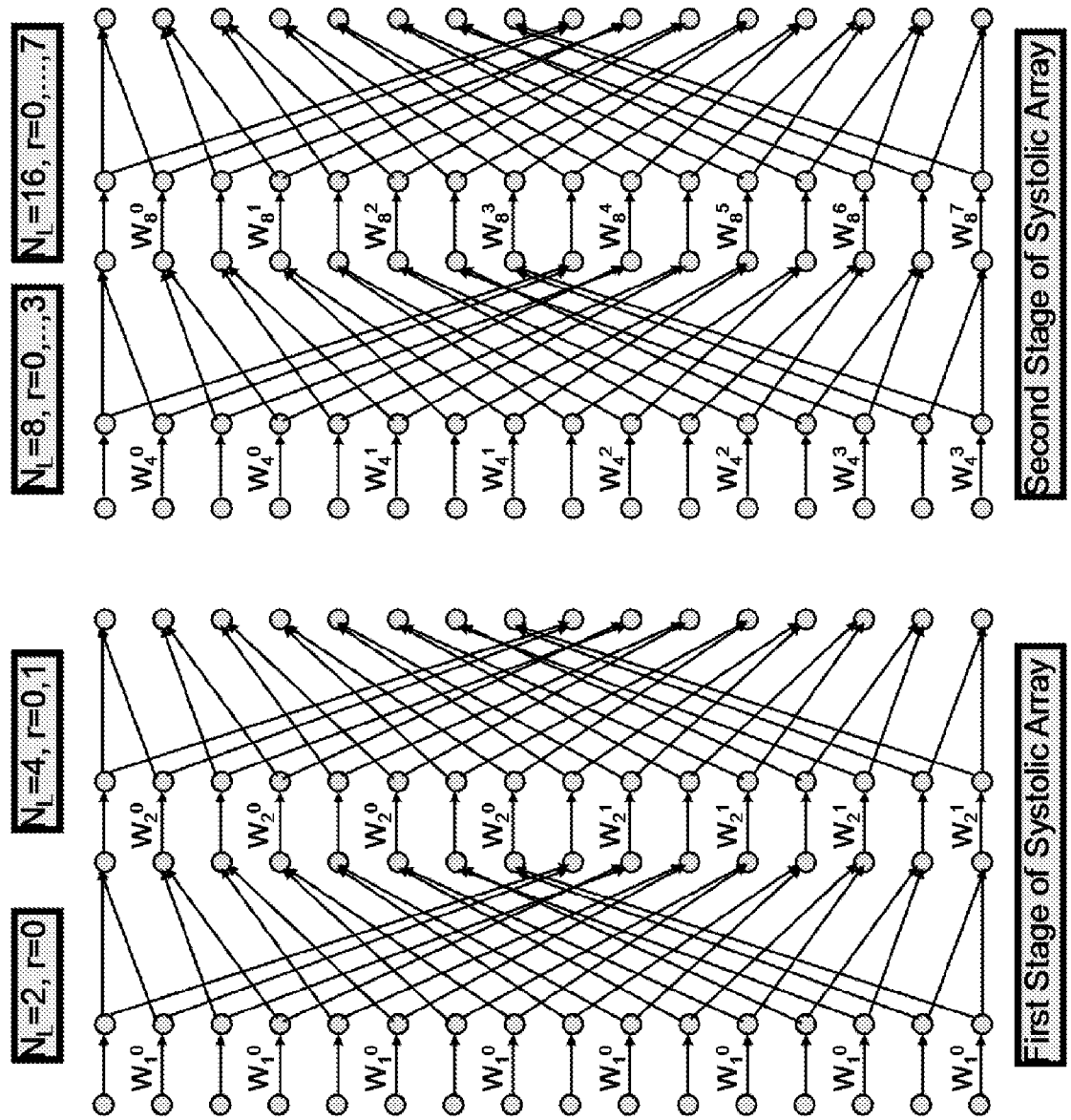
Figure 10:
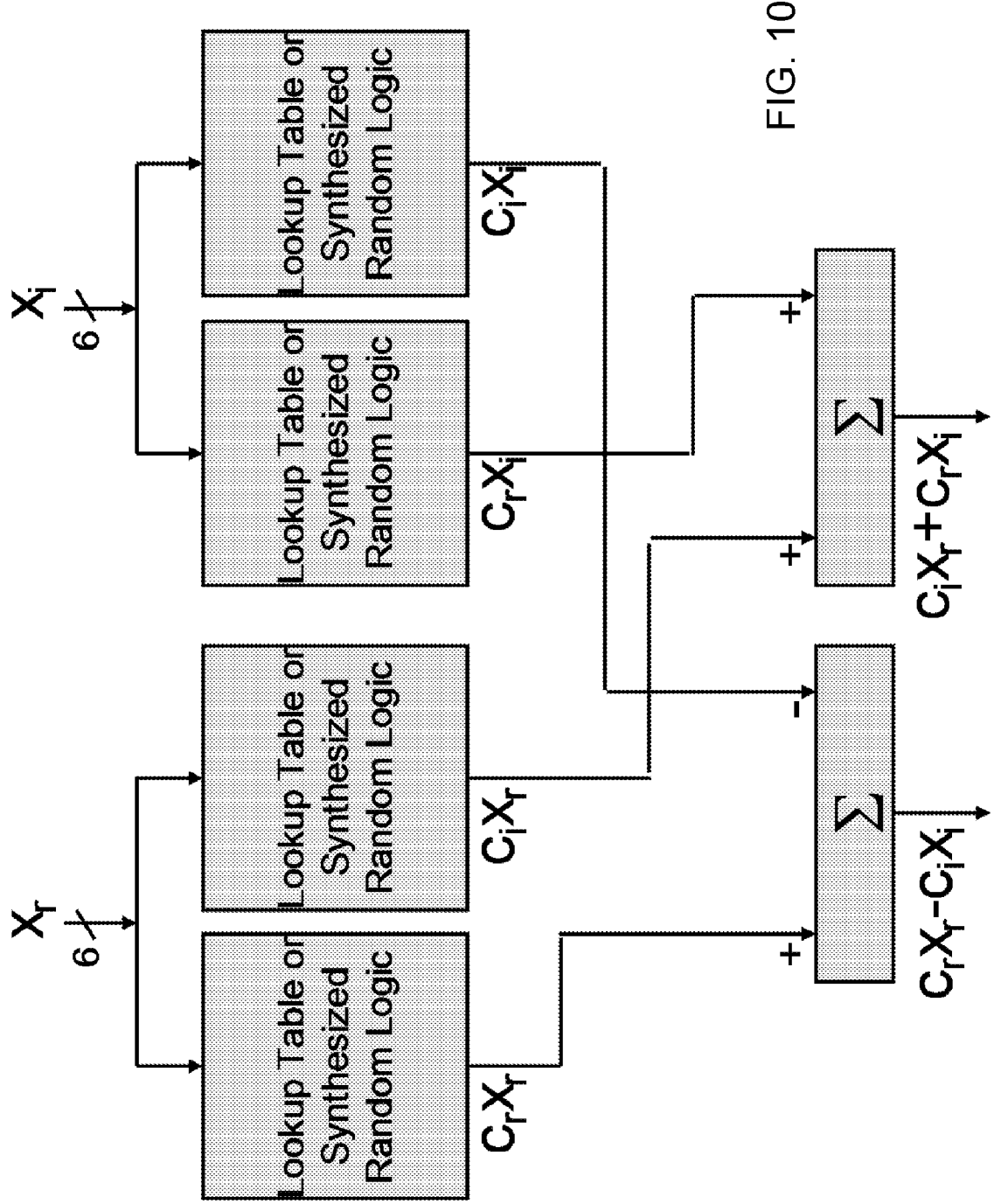
FIG. 10 is a block diagram of a lookup table (LUT) complex multiplier.

FIGS. 6-7 are block diagrams of a bulk chromatic dispersion (BCD) equalizer of a digital receiver system, and FIGS. 8-10 show components within the BCD equalizer. FIGS. 8-9 are block diagrams illustrating an FFT algorithm implementation and systolic processor architecture. FIG. 10 is a block diagram of a lookup table (LUT) complex multiplier.

This example is based on the following. The impulse response length <128T (256 T/2 samples), where T is the symbol period (or one baud). The input block consists of 256 T/2 samples. The FFT size is 512. An overlap and save implementation of the frequency domain filter is used. The block size is twice the input block, or 512 complex samples. Half of these samples come from a new input block, and the other half are repetition of the previous input block. The FFT engine can process 1 FFT/IFFT in two DSP clock cycles, or 4 FFT/IFFT in 8 DSP clock cycles. Multiplications in the filter are done with serial/parallel multipliers. Each S/P multiplier can process one multiplication in 8 clock cycles. The total number of multiplications in the filter is 2×512 complex, or 4096 real (every 8 DSP clock cycles). In an alternate embodiment, parallel multipliers could be used. In this example, the number of multipliers would be 512.

As shown in FIG. 8, the FFT/IFFT is implemented using a standard algorithm. This algorithm requires $(N/2)\log_2 N$ complex multiplications for an N-point FFT. One possible implementation is a direct mapping of this flow chart into hardware, as shown in FIG. 9. With this architecture, the result is a systolic processor with a throughput of 1 N-point FFT per clock cycle (of the FFT processor, which is not necessarily the same as the clock of the rest of the DSP).

In this specific example, the FFT has a size of N=512, which in an overlap and save FIR architecture corresponds to a block size of 256 samples (since 2 consecutive blocks are concatenated). For T/2 sampling, this corresponds to 128 bauds, and for a 16-parallel DSP, this corresponds to 8 DSP clock cycles. Therefore, with the systolic architecture of FIG. 8 and assuming the processor processes 4 FFTs per block, its clock would run at half the DSP clock frequency, which is inefficient. To achieve a better utilization of the hardware it is convenient to reconfigure the systolic processor so that each stage processes two consecutive steps of the FFT, running at the full DSP clock frequency, as shown in FIG. 9. This results in a reduction of the hardware of approximately a factor of two. However, now the factors in the multiplications are not always the same, so the actual saving is less than a factor of two.

Figure 11:
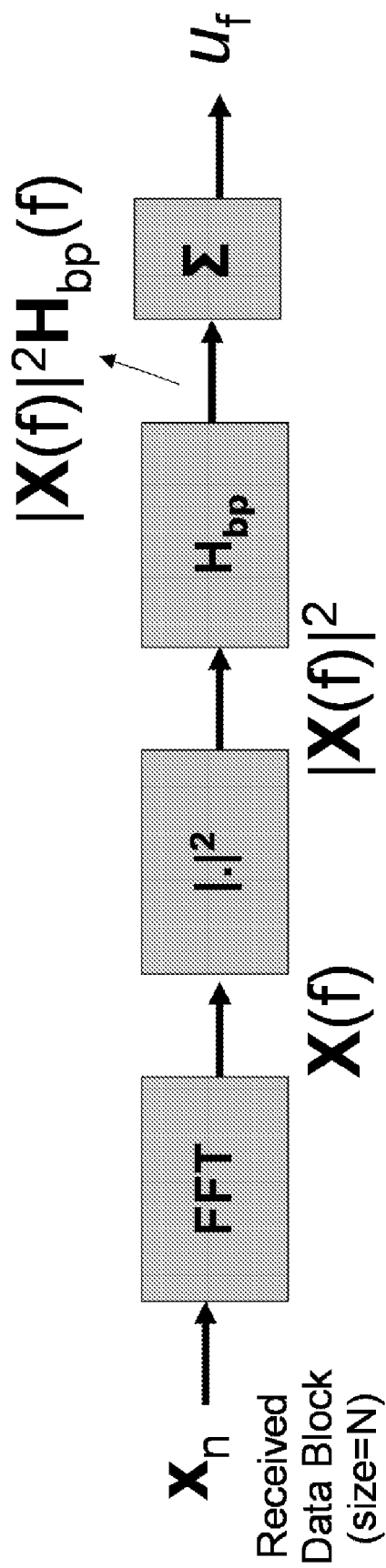
FIG. 11 is a functional block diagram of a frequency error function (FEF).
Figure 12:
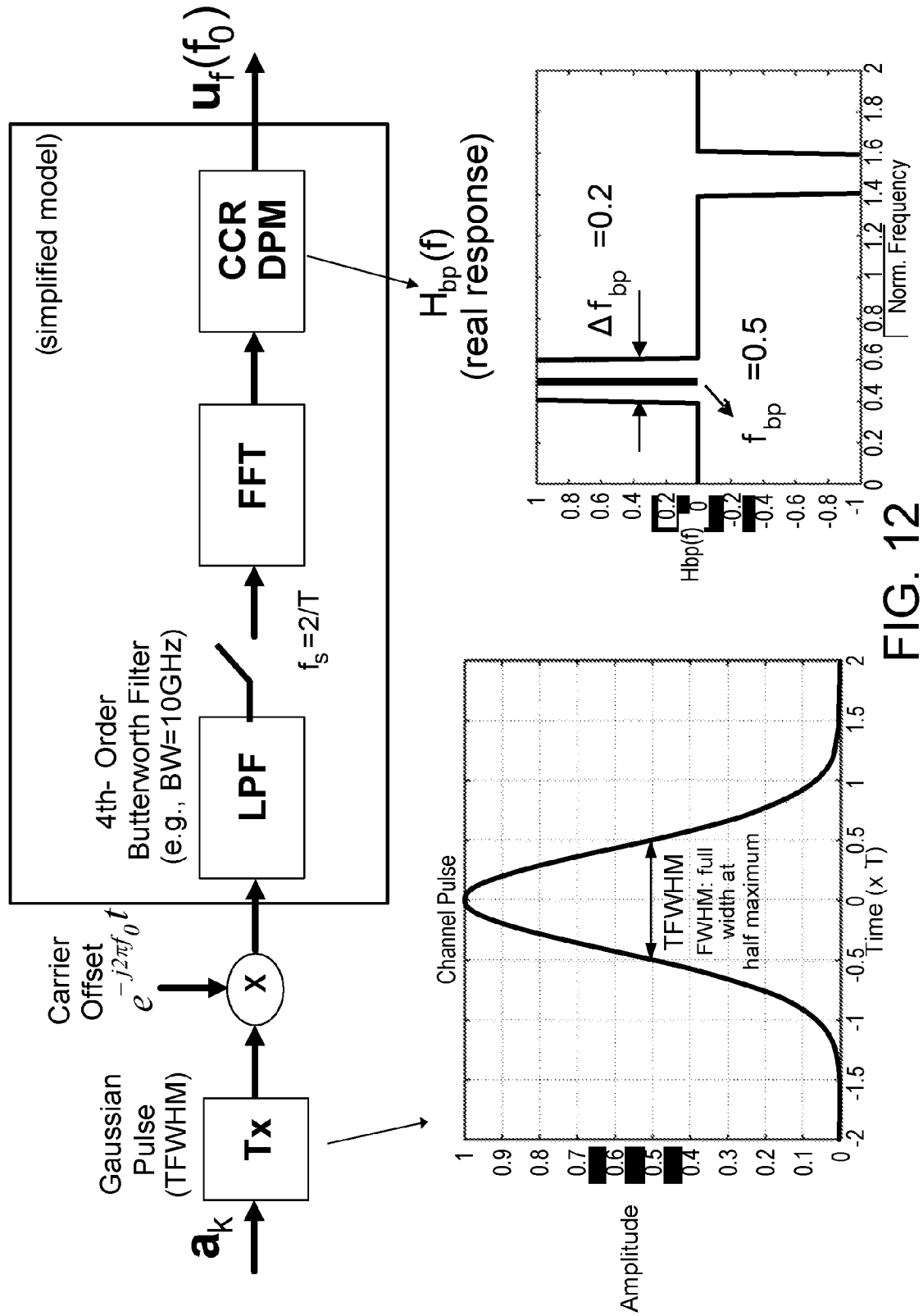
FIG. 12 is a diagram illustrating analysis of the FEF.
Figure 13:
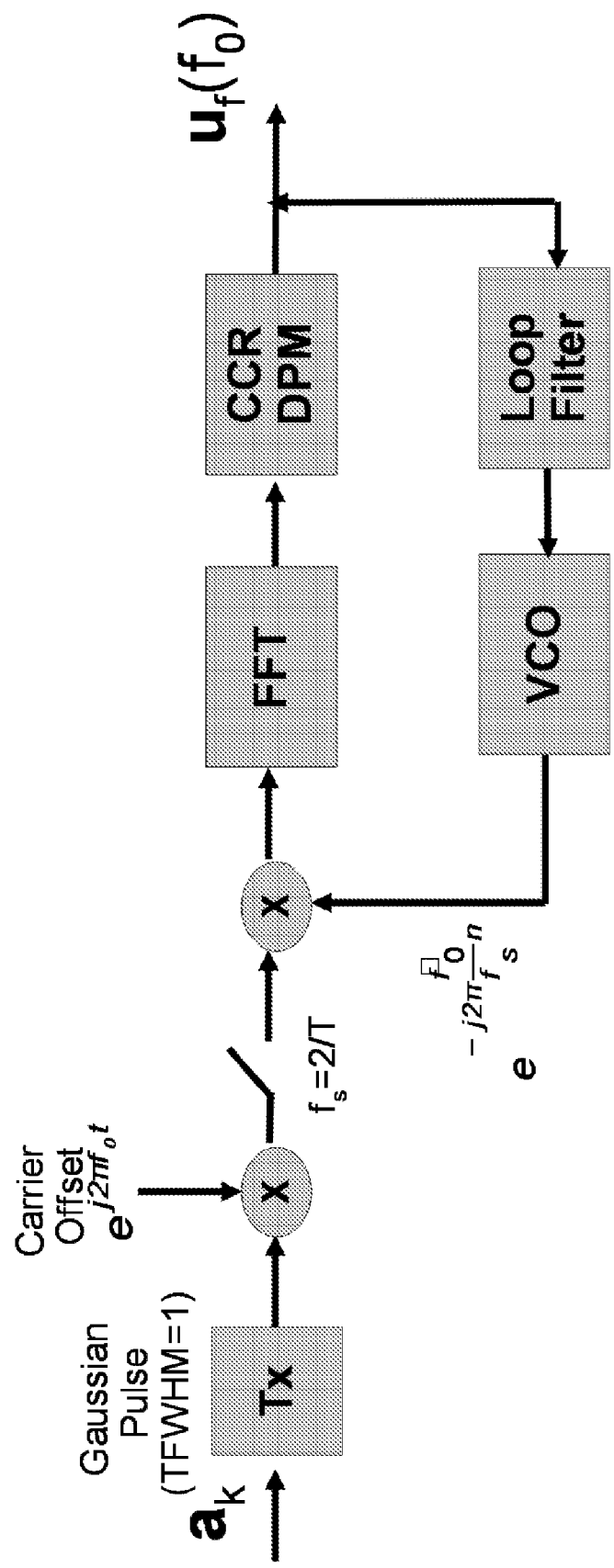
FIG. 13 is a block diagram of the CCR loop.

FIGS. 11-17 relate to the coarse carrier recovery. FIGS. 11-13 illustrate operation of the CCR loop, and FIGS. 14-17 show one possible implementation.

FIG. 11 is a functional block diagram of a frequency error function (FEF) $u_f$. FIG. 12 is a diagram illustrating analysis of the FEF. FIG. 13 is a block diagram of the CCR loop.

Figure 14:
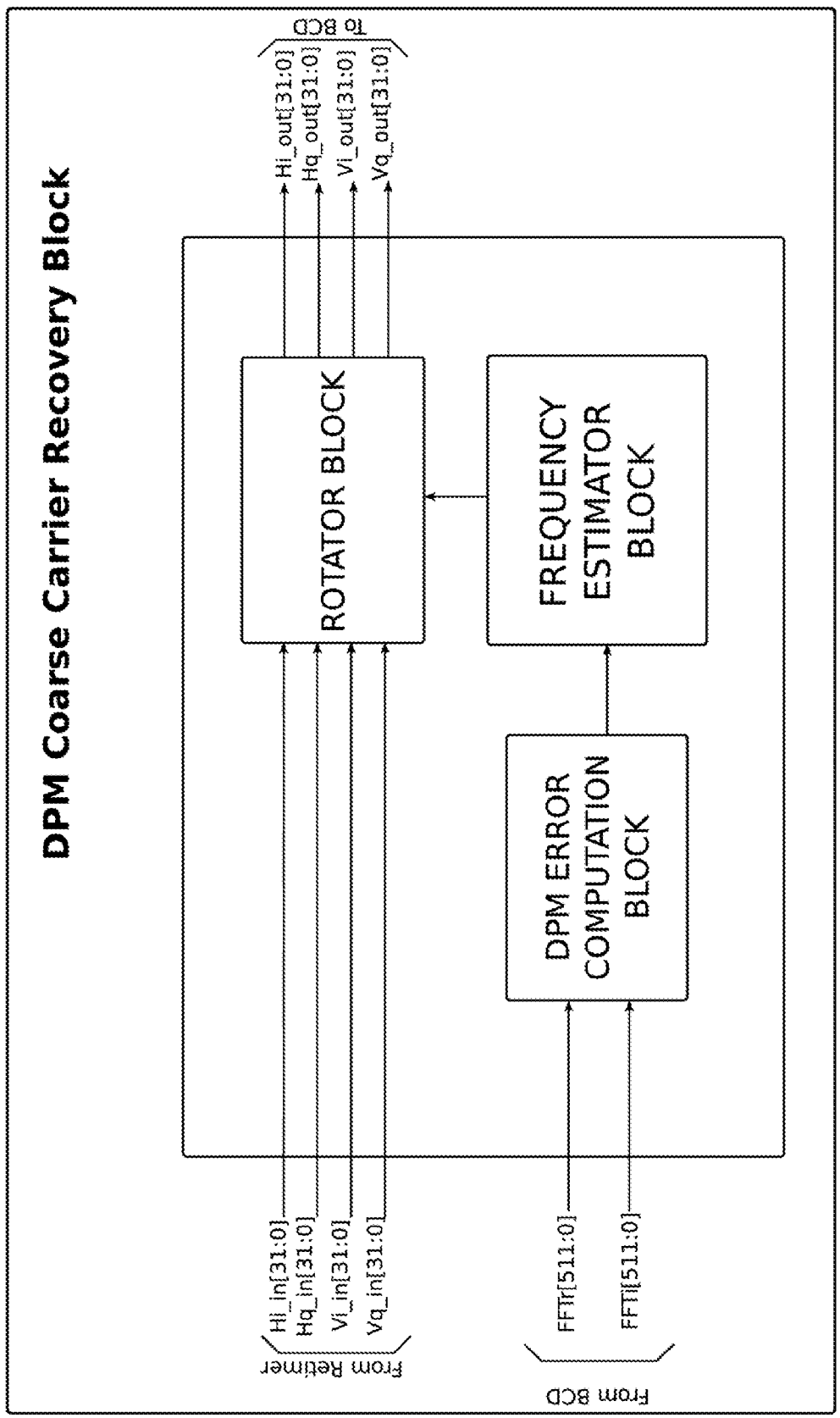
FIG. 14 is a block diagram of the DPM CCR block.
Figure 15:
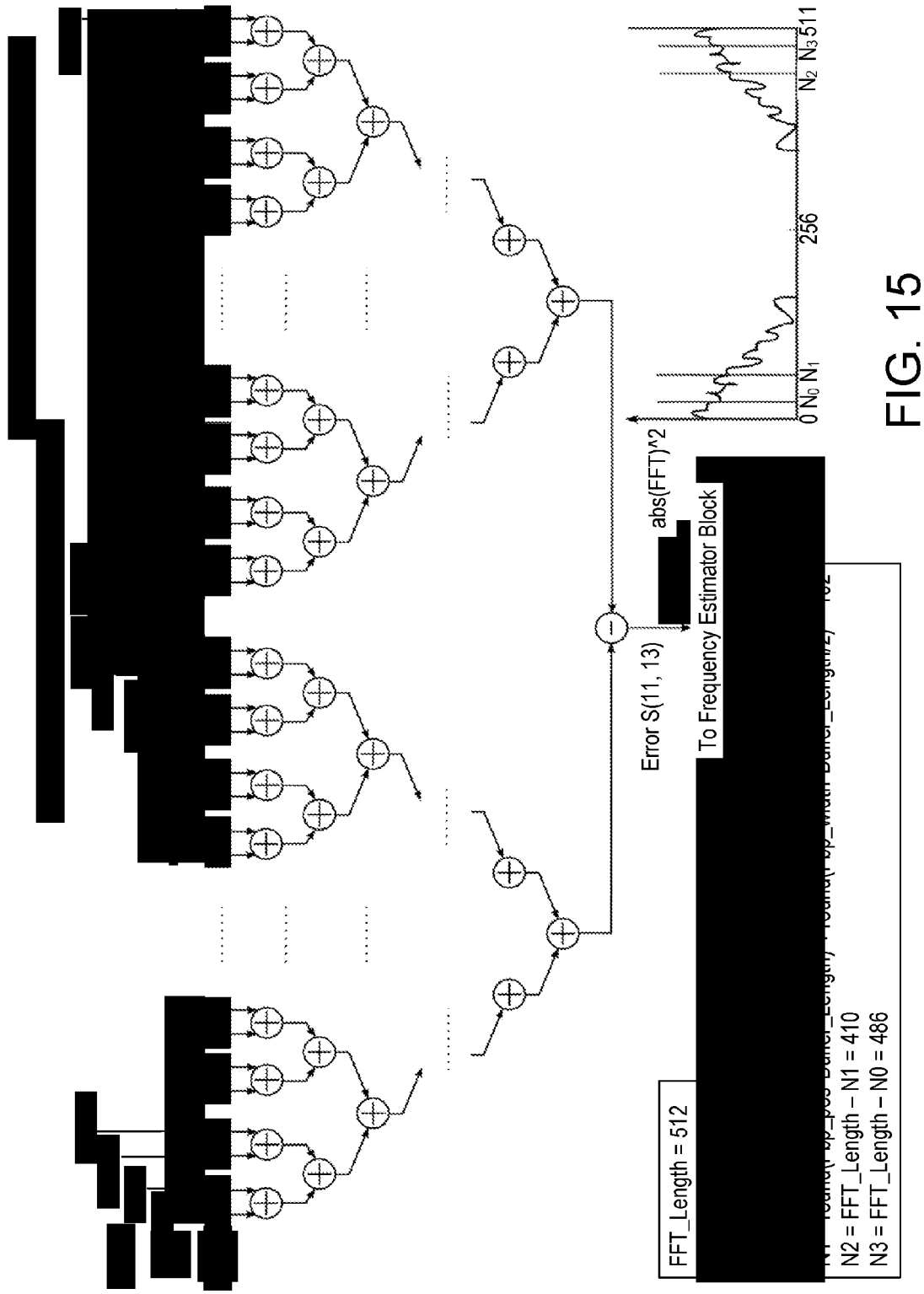
FIG. 15 is a block diagram of a DPM error computation block.
Figure 16:
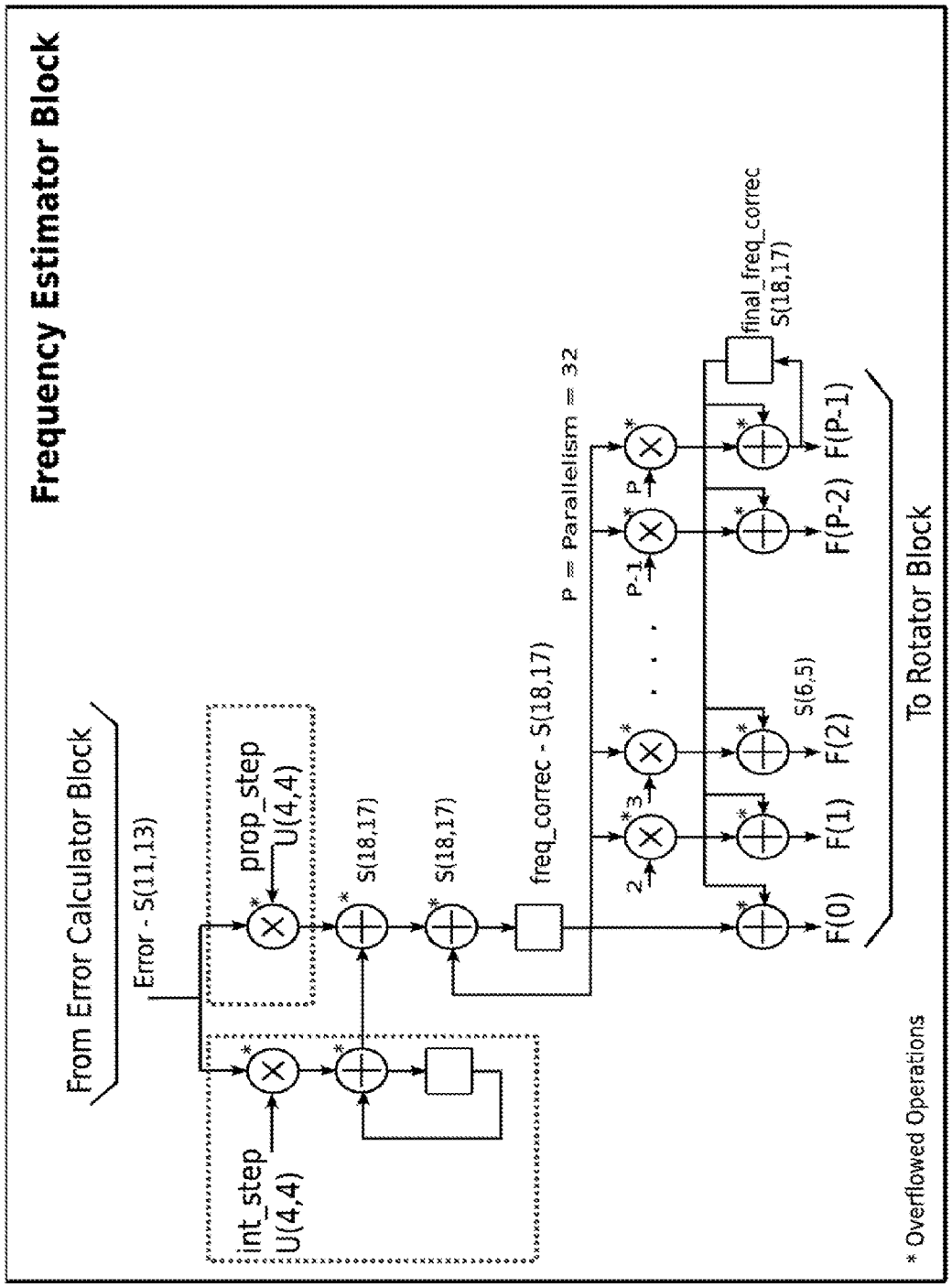
FIG. 16 is a block diagram of a frequency estimator block.

FIG. 14 is a block diagram of the DPM CCR block. FIGS. 15-17 are block diagrams of components within the CCR block. FIG. 15 is a block diagram of a DPM error computation block. This block calculates the power density difference (error) between both sides of the BCD FFT output. FIG. 16 is a block diagram of a frequency estimator block. This block uses the calculated error to estimate the frequency offset. There is a different frequency correction factor $F(n)$ for each input symbol. The final frequency correction for the block is taken from the last frequency correction factor $F(P-1)$. This term is added to the next block. FIG. 17 is a block diagram of a rotator block, which rotates the retimer output (input to the receiver) using the frequency estimate. There may also be a CCR status flag block, to assert an OK flag when the filtered error is below a certain threshold.

In this example, the feedforward equalizer (FFE) is a traditional 16-tap T/2 equalizer with a MIMO structure. The input is a 4-dimensional (real) vector and coefficients are 4×4 (real) matrices. In this example, "complex butterfly" constraints are not imposed; an alternative embodiment uses complex butterfly constraints. Complex butterfly constraints are equivalent to making the equalizer 2-dimensional complex instead of 4-dimensional real. Alternatively, they can be viewed as forcing the 4×4 real coefficient matrices to be composed of 4 2×2 unitary matrices. By removing the unitary constraints in the 2×2 submatrices, the equalizer is allowed to compensate angle errors in the modulator or other errors that cause the QPSK constellation not to be perfectly square. Imposing the unitary constraints may, in some cases, simplify implementation of algorithms developed using complex mathematical representations of the channel and signals.

Figure 18:
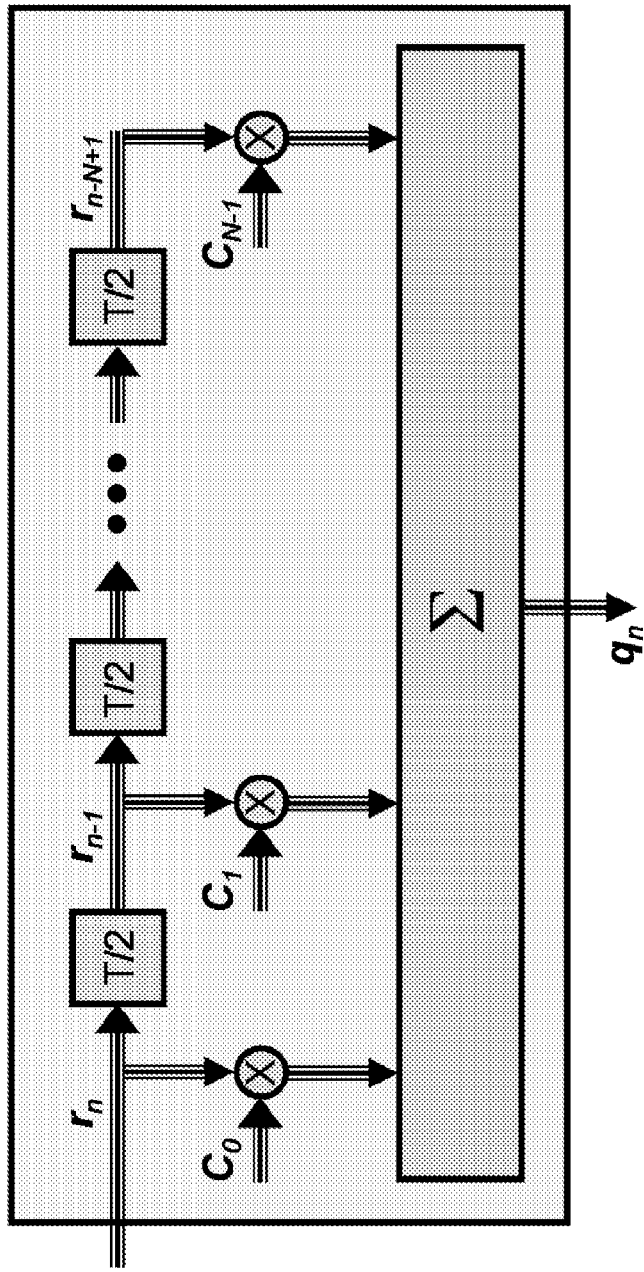
FIG. 18 is a block diagram of a joint phase and polarization equalization.
Figure 19:
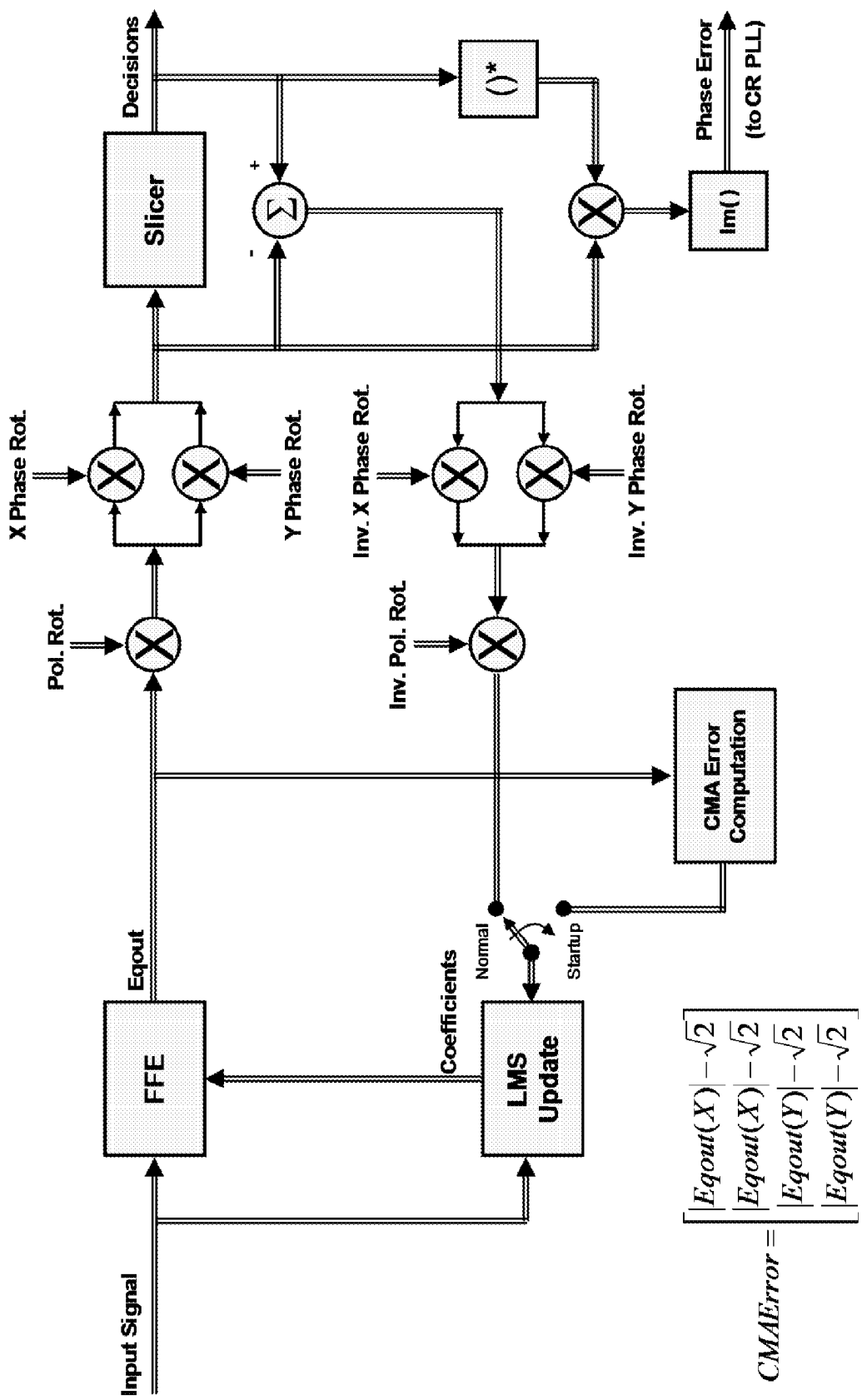
FIG. 19 is a block diagram of error computation and equalizer adaptation.

FIG. 18 is a block diagram of a joint phase and polarization equalization. FIG. 19 is a block diagram of error computation and equalizer adaptation.

Figure 20:
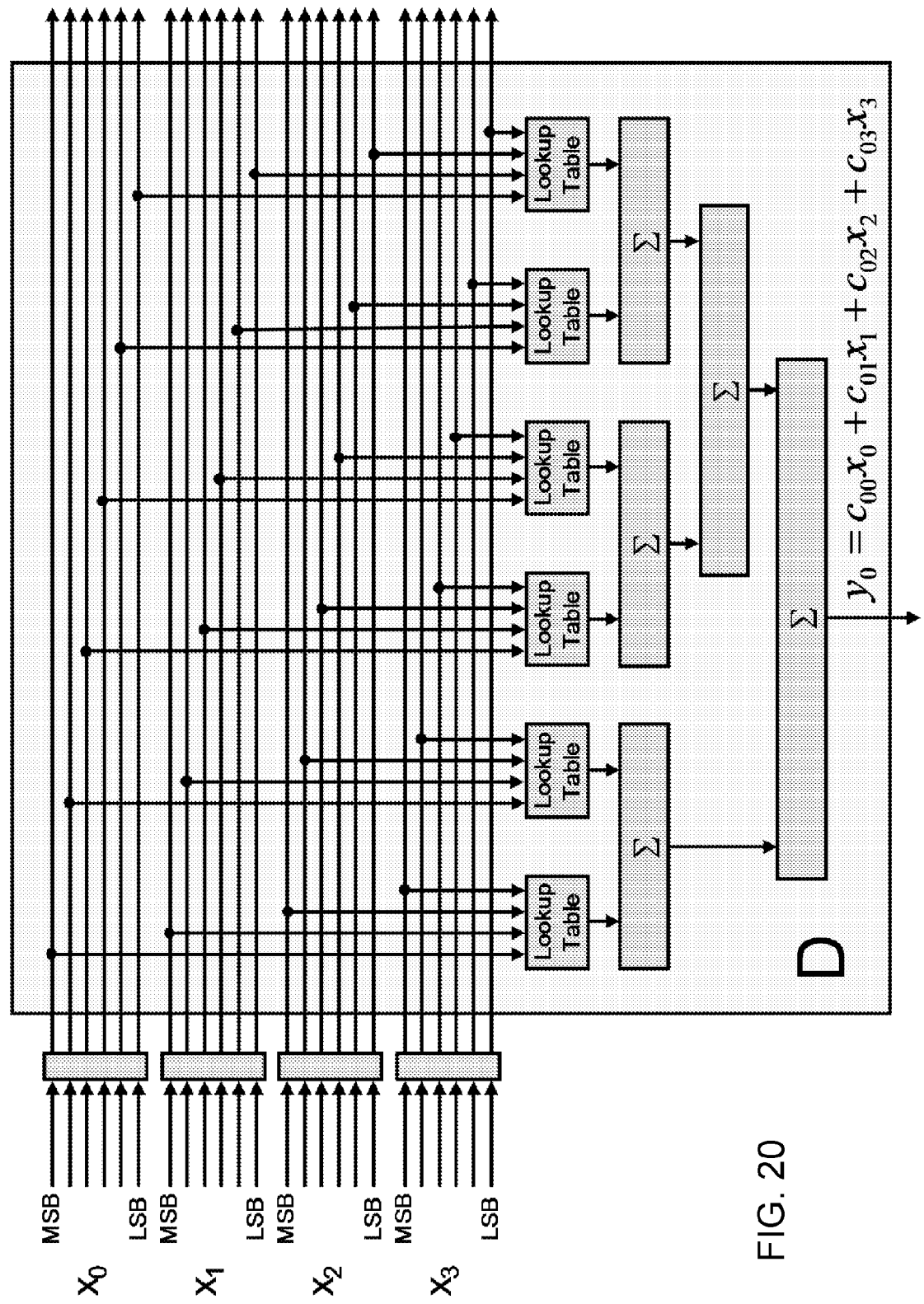
FIGS. 20-23 are block diagrams of a 16-tap, 16-way-parallel T/2 MIMO feedforward equalizer.
Figure 21:
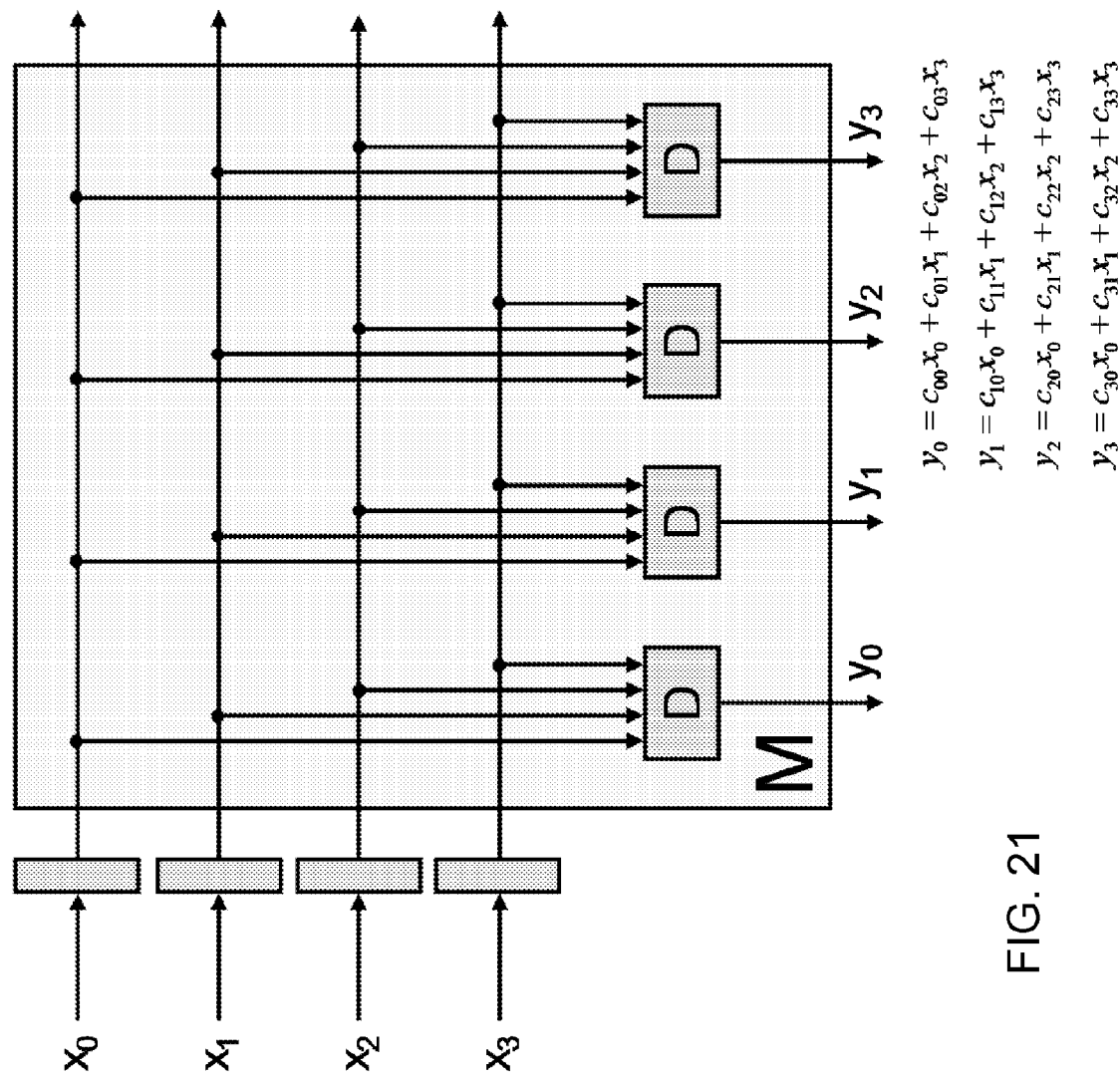
Figure 22:
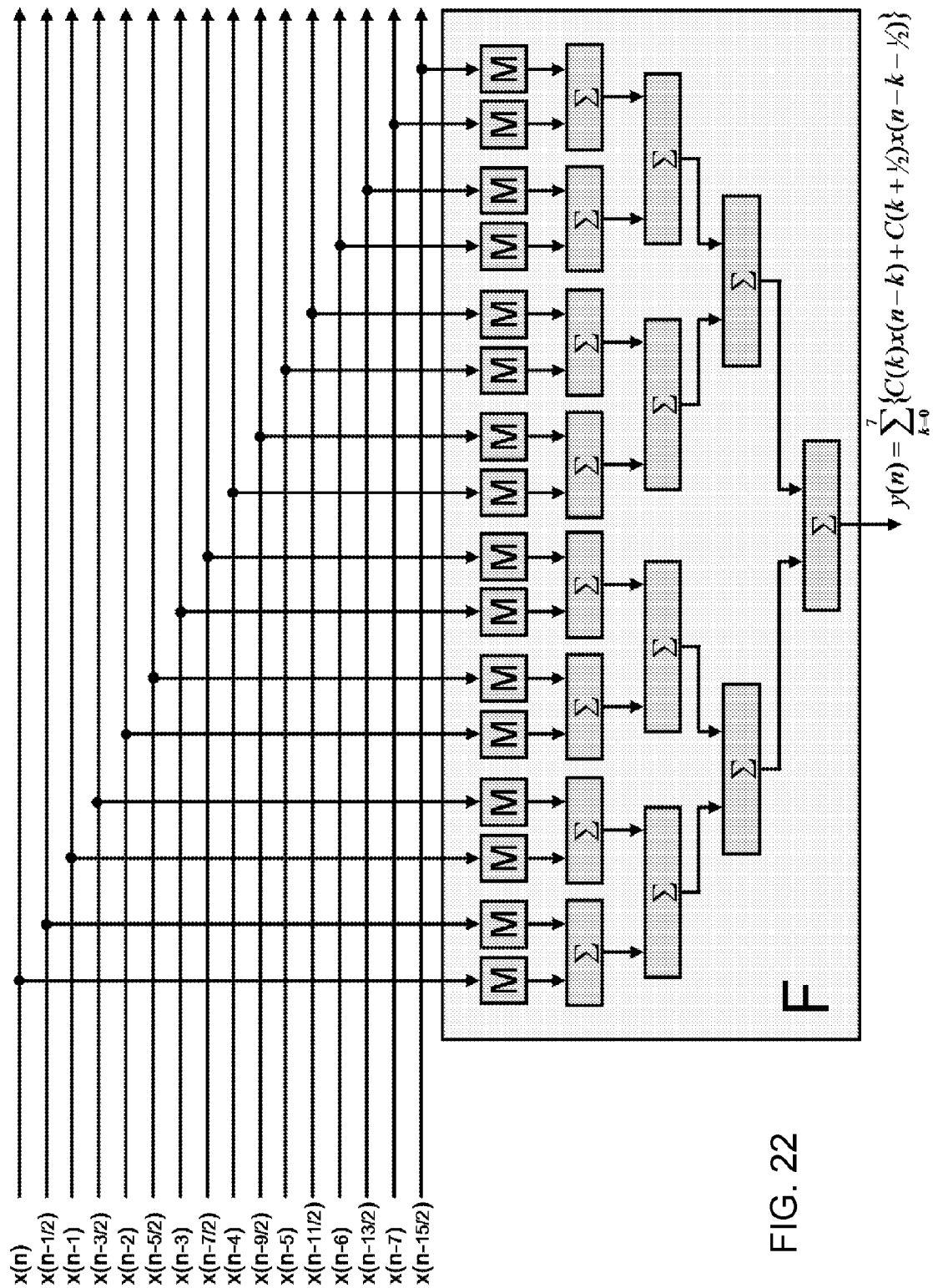
Figure 23:
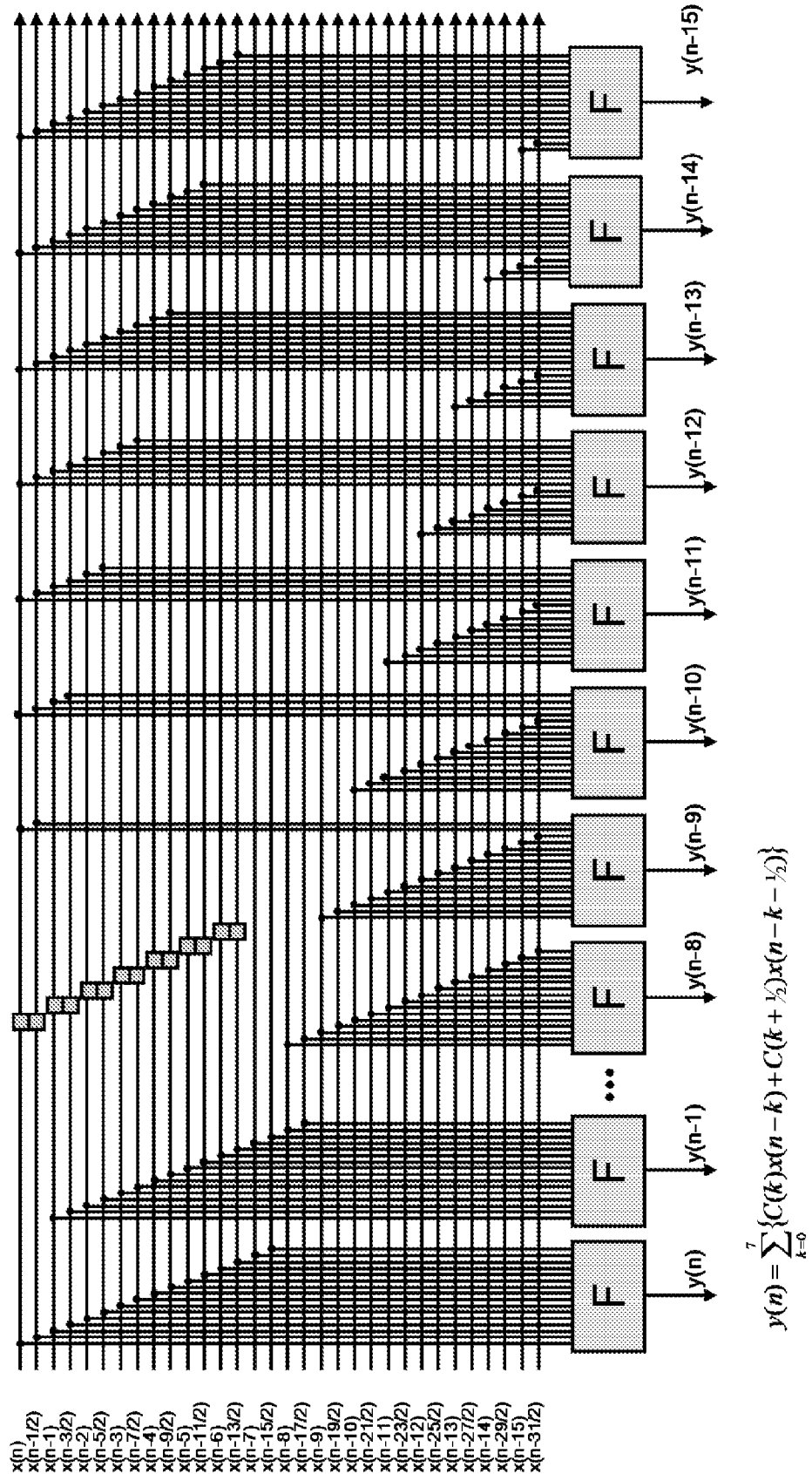

FIGS. 20-23 illustrate one implementation of a 16-tap, 16-way-parallel T/2 MIMO feedforward equalizer. It is easiest to start with FIG. 23, which shows the overall architecture. C(k) are 4×4 matrices, and x(n) and y(n) are 4-D vectors. FIG. 22 illustrates 16-tap processing element block F from FIG. 23. FIG. 21 illustrates a distributed arithmetic matrix-vector multiplication engine (block M in FIG. 22). FIG. 20 illustrates a distributed arithmetic dot product engine (block D in FIG. 21).

The total number of 16-entry lookup tables for a 16-tap, 16-way parallel MIMO equalizer is 6 tables per dot product×4 dot products per matrix multiplication×16 matrix multiplications per interleave×16 interleaves=6144 tables. However, out of these 6144 tables, there are only 64 groups of 96 tables each, where the 96 tables within the group have identical contents. The 64 distinct groups correspond to the 4 rows of each matrix tap, times the 16 taps of the FFE. Each group of 96 tables with identical contents consists of 6 tables per dot product×16 interleaves. It may be possible to share hardware among identical tables. However this requires multiple access logic, which may be more complicated than creating multiple instances of each table.

Figure 24:
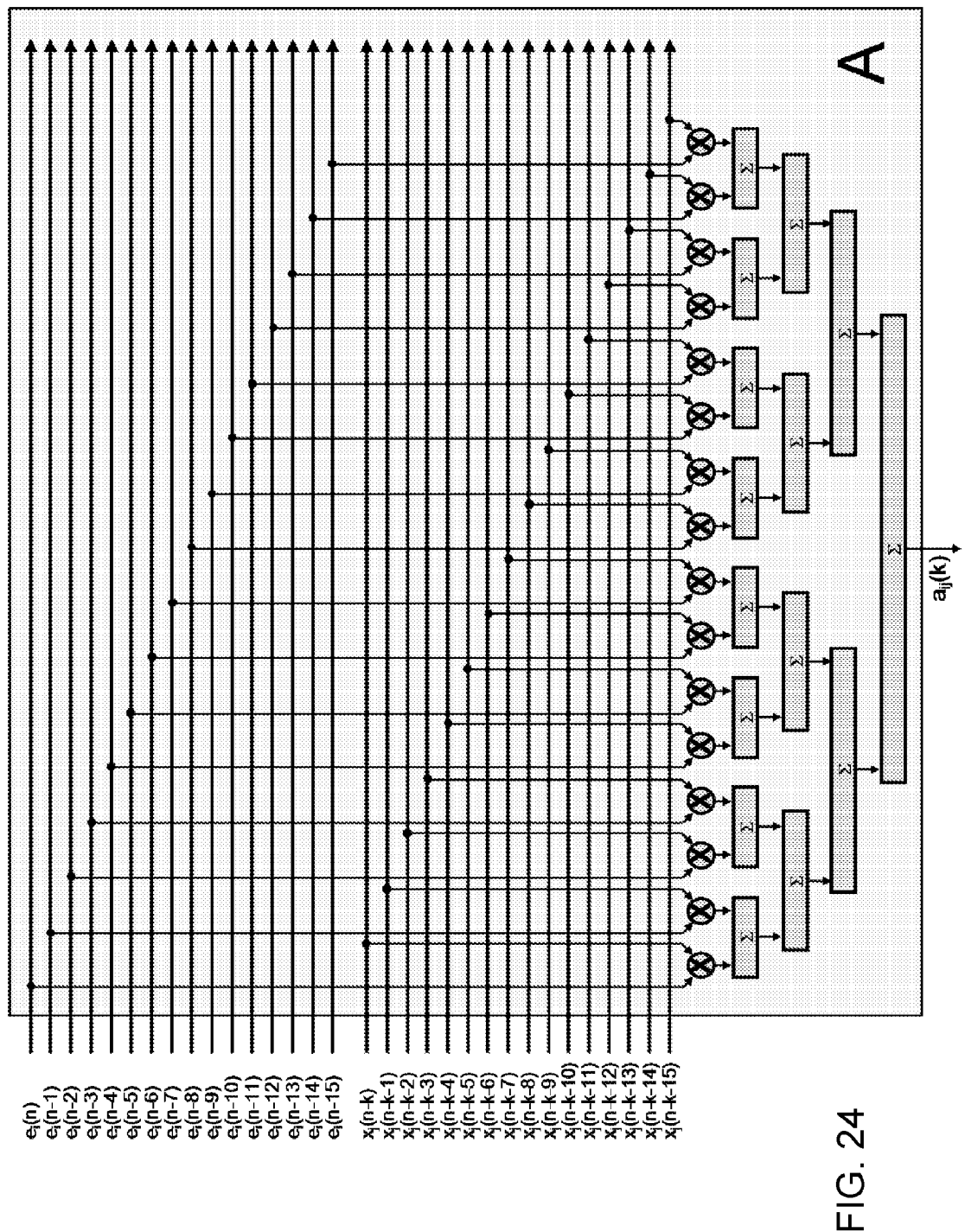
FIGS. 24-26 are block diagrams of a $C_{ij}(k)$ ($k=0, \ldots, 15$) update engine.
Figure 25:
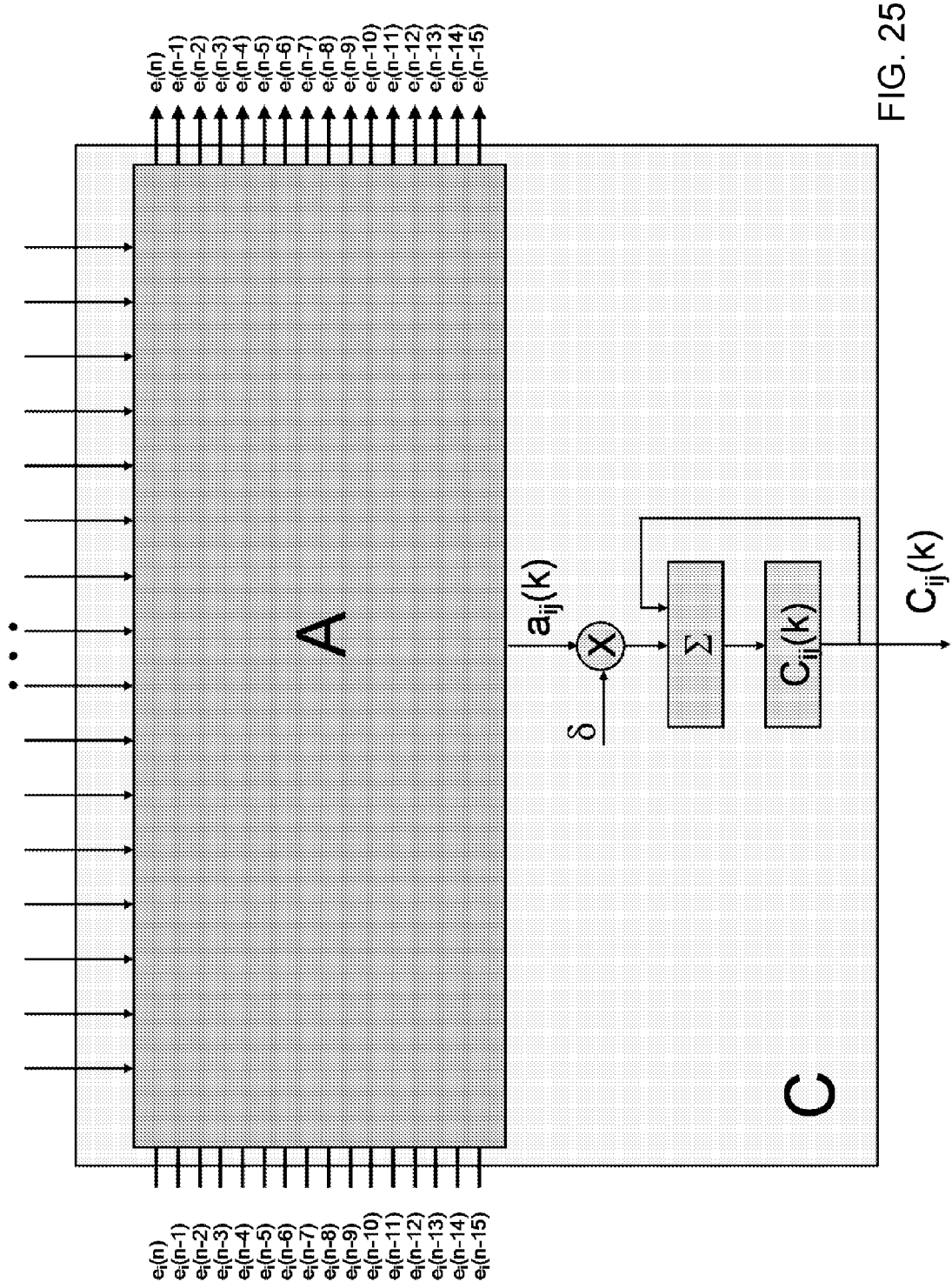
Figure 26:
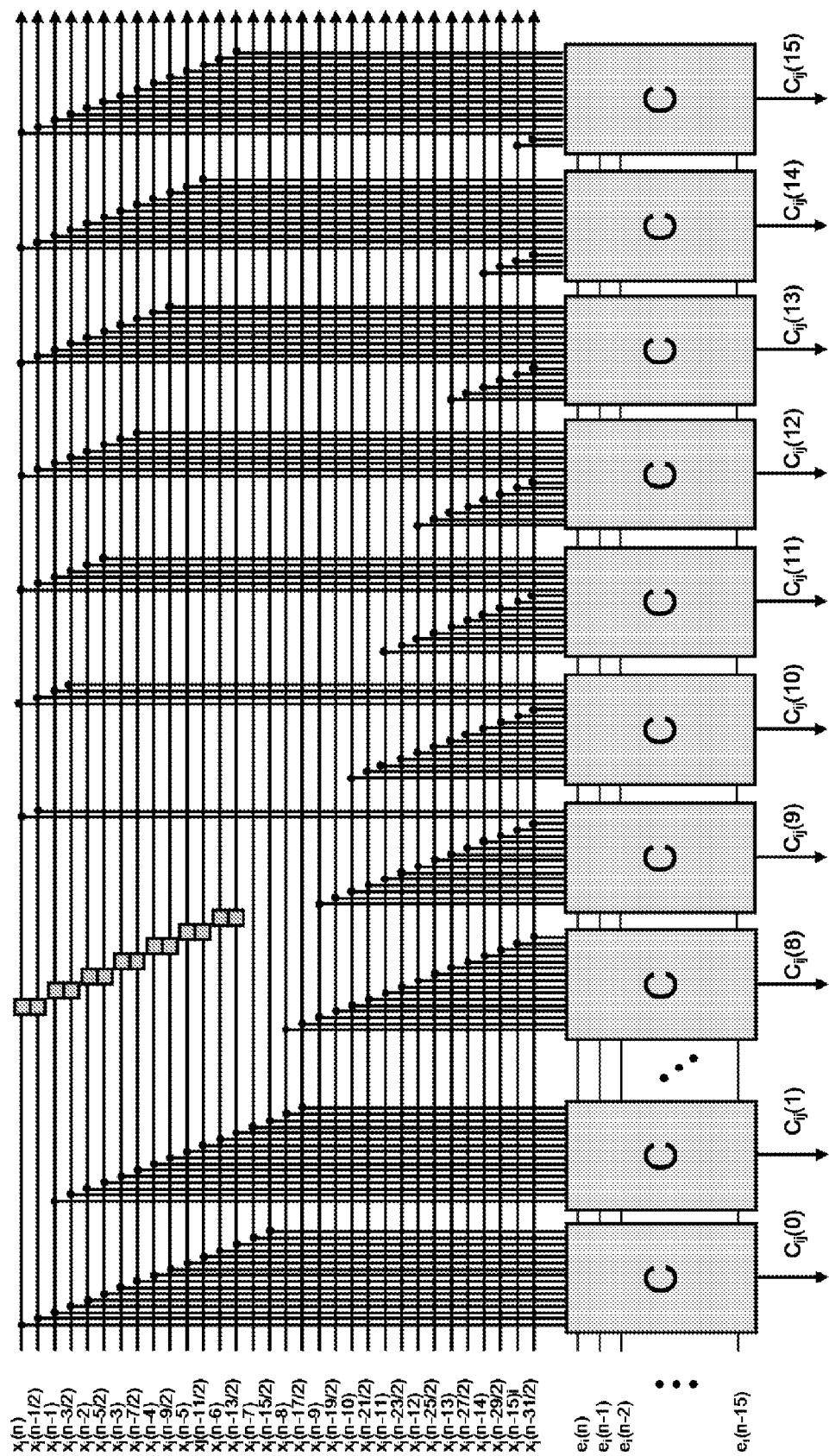

FIGS. 24-26 illustrate one implementation of an $C_{ij}(k)$ (k=0, ..., 15) update engine. FIG. 26 shows the overall block diagram, which is instantiated 16 times (for i=0, ..., 3 and j=0, ... 3,). FIG. 25 is a block diagram of a single FFE coefficient update engine (block C in FIG. 26). FIG. 24 is a block diagram of an adaptation dot product engine (block A in FIG. 25).

Figure 27:
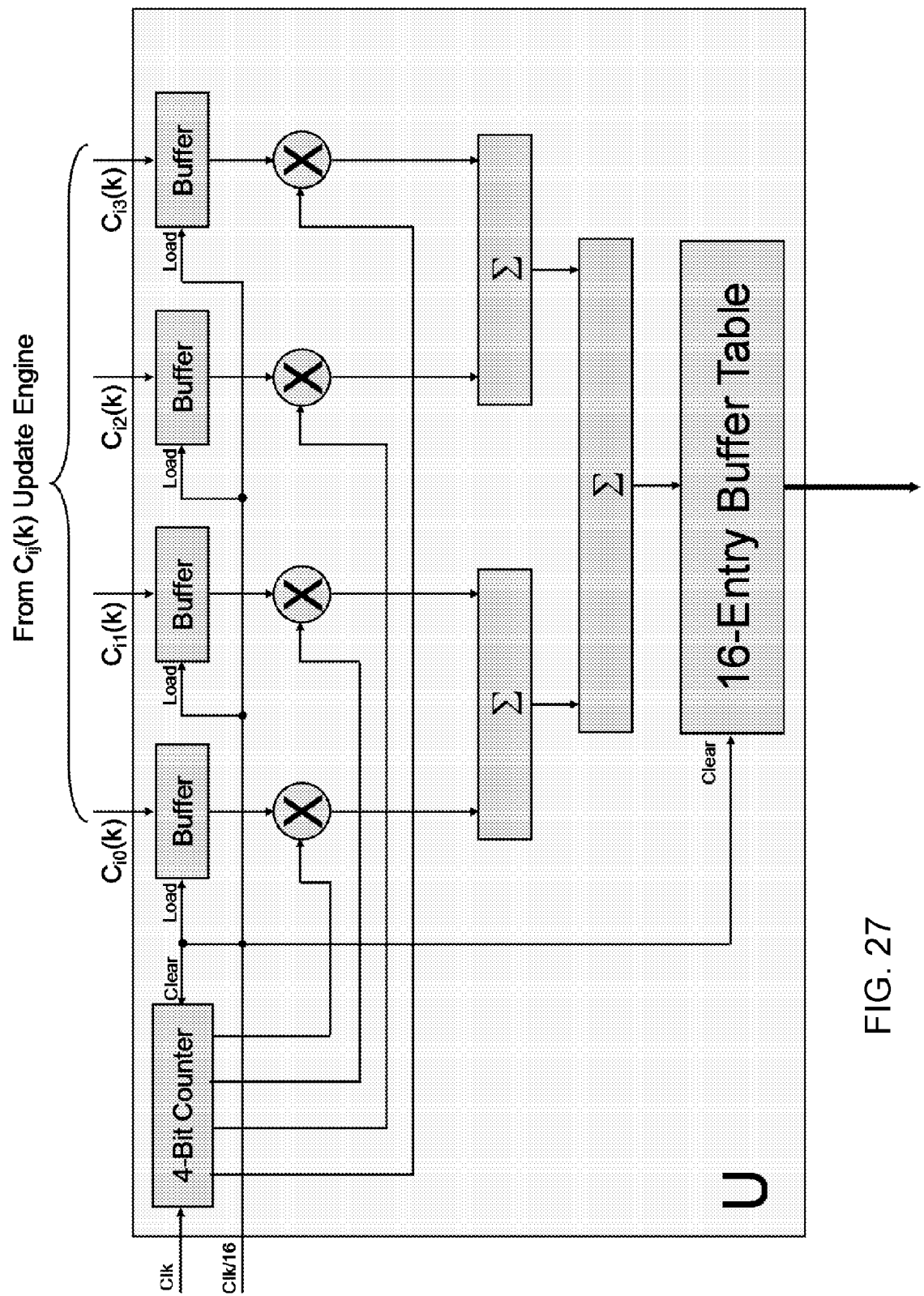
FIG. 27 is a block diagram of a lookup table refresh unit.

FIG. 27 is a block diagram of a lookup table refresh unit. This refreshes multiple entries, such as 16 entries, of each one of 96 lookup tables with identical contents in one clock cycle. There are 64 instances of this engine, corresponding to the 4 rows of each matrix coefficient of the FFE times its 16 coefficients.

Figure 28:
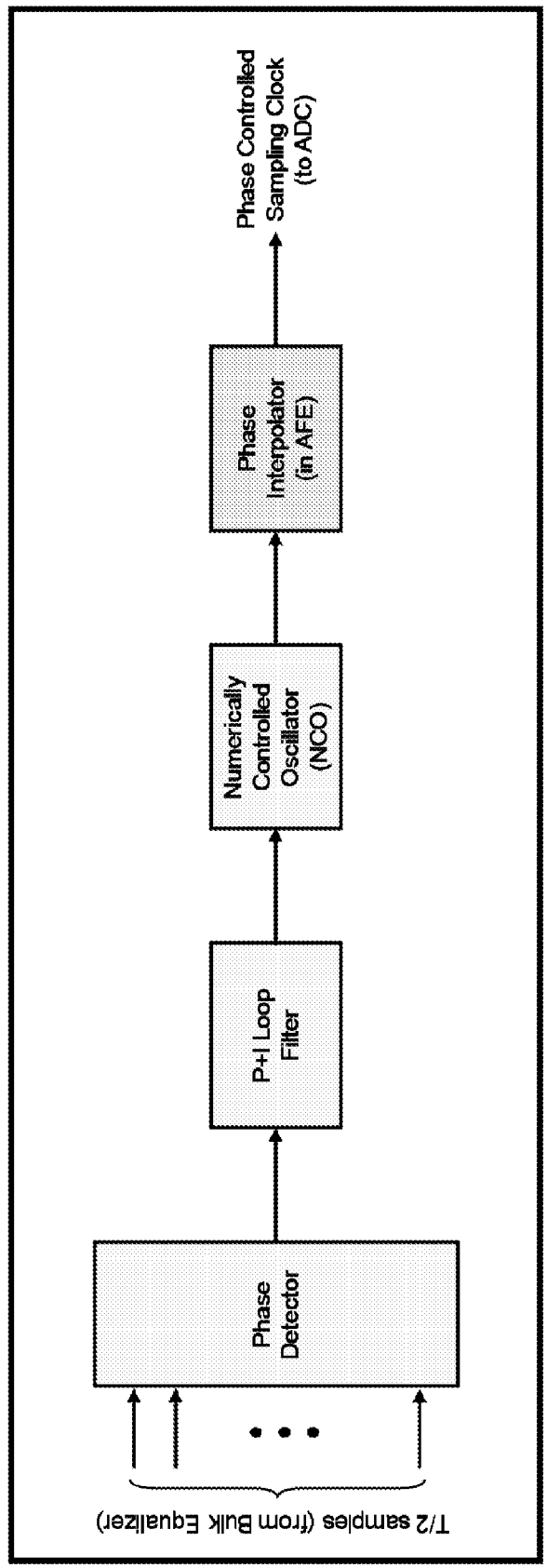
FIG. 28 is a block diagram of a timing recovery PLL.

FIGS. 28-31 relate to timing recovery. FIG. 28 is a block diagram of a timing recovery PLL. The phase detector is based on the "Wave Difference Method" (see Agazzi et al, "Timing Recovery in Digital Subscriber Loops", IEEE Transactions on Communications, June 1985, pp. 558-569), which is incorporated by reference herein in its entirety. In this method, the phase error is computed as the difference between the square magnitude of the (complex) samples of the signal taken at T/4 before and after the center of the eye. The above computation generates a nearly sinusoidal tone at the difference frequency between the local sampling clock and the clock used in the remote transmitter to transmit symbols. The phase detector seeks the zero crossings of this sinusoidal tone. The T/2 feedforward equalizer that follows interpolates the sample at the center of the eye from the samples at T/4 before and after. This method works well in the presence of intersymbol interference. To avoid excessive ISI in the input signal, the phase detector is placed at the output of the bulk equalizer.

Figure 29:
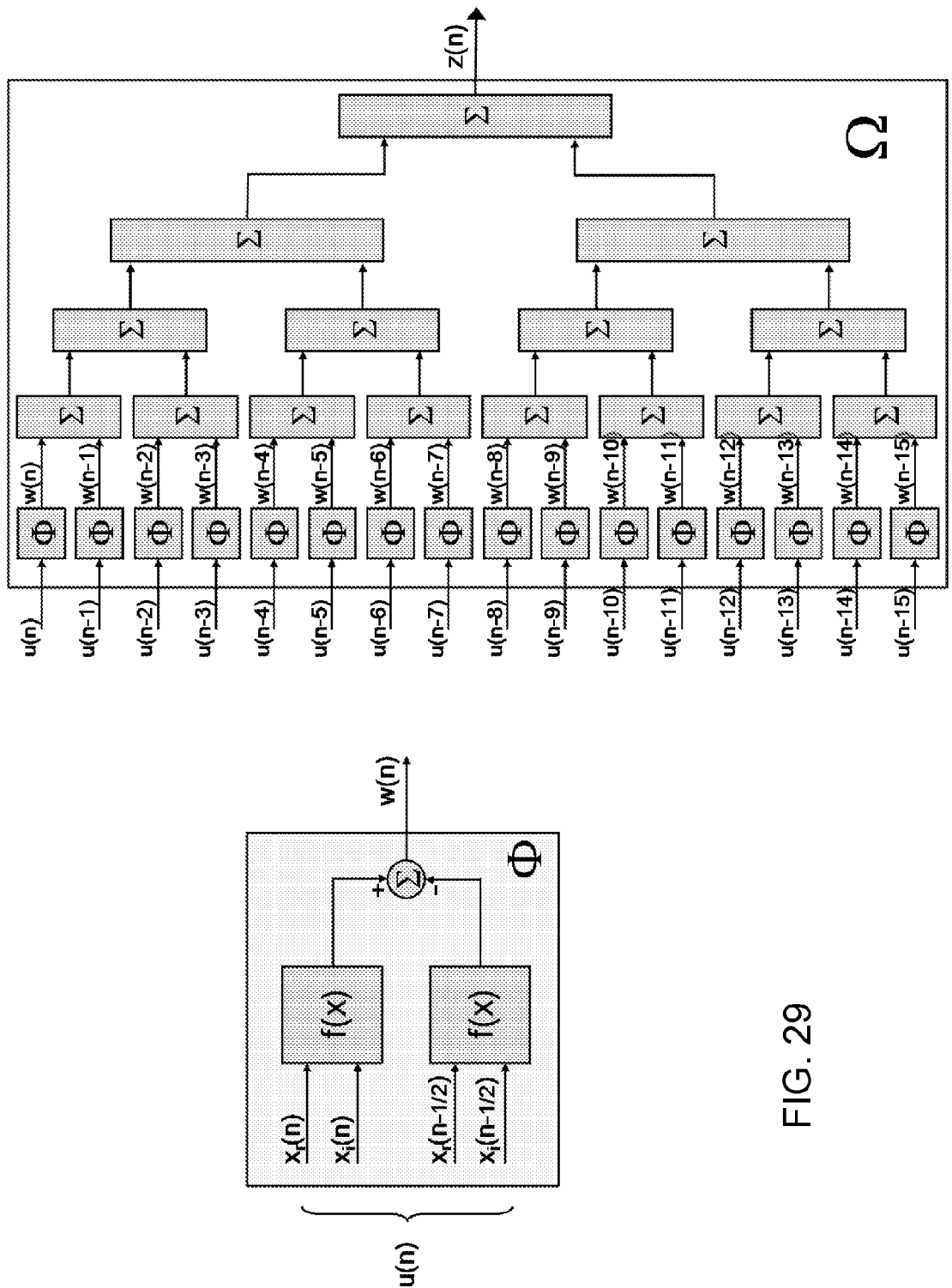
FIGS. 29-30 are block diagrams of a timing recovery phase detector.
Figure 30:
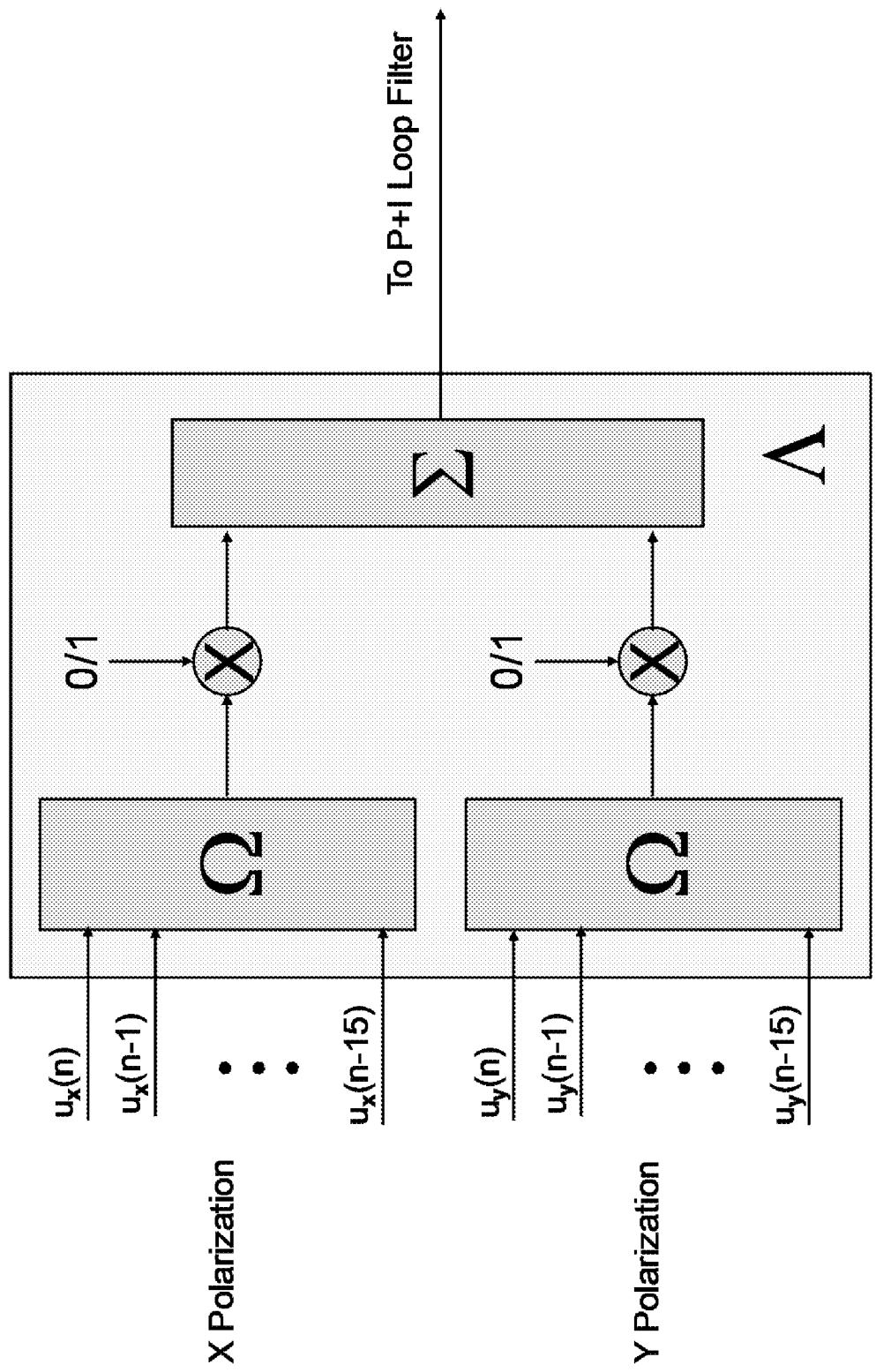

FIGS. 29-30 are block diagrams of a timing recovery phase detector. FIG. 30 shows the phase detector, including both X and Y polarizations. FIG. 29 shows more details of block Ω in FIG. 30, and also block Φ in FIG. 29. By register programming, the phase detector may operate based on the phase error information from one (selectable) or the two polarizations.

In this particular implementation, because of the latency of the parallel processing implementation of the timing recovery PLL, its capture range is limited to about 100 ppm. However, a capture range of at least +/−200 ppm is desirable. The capture range of at least +/−200 ppm can be achieved by initializing the frequency register (I register) in the P+I loop with an initial estimate of the frequency error.

Figure 31:
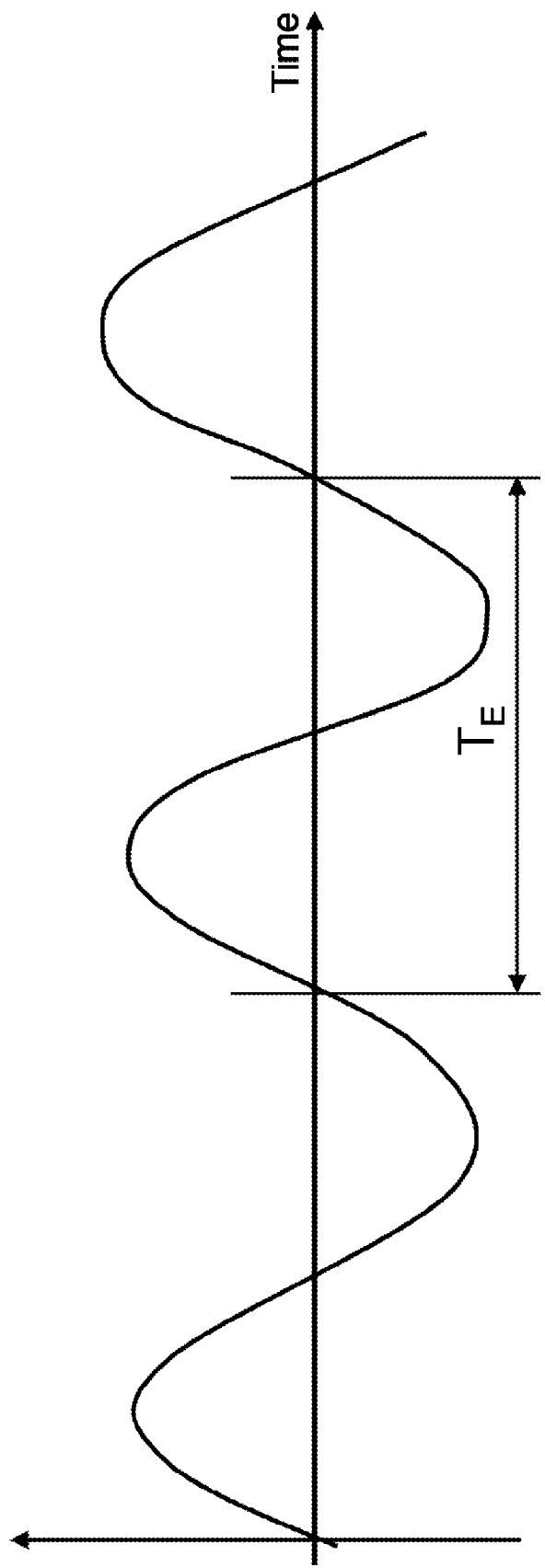
FIG. 31 is a diagram illustrating timing recovery initial frequency acquisition.

FIG. 31 is a diagram illustrating this timing recovery initial frequency acquisition. The period $T_E$ of the timing recovery phase error is a measure of the timing frequency error. By measuring $T_E$ an accurate estimate of the timing frequency error can be obtained. The estimate of the timing frequency error thus obtained is "jammed" into the frequency register (I register) in the P+I loop filter. To determine the sign of the phase error, the above procedure is repeated. A positive sign is assumed for the frequency error in the first iteration of the algorithm. If this actually doubles the frequency error instead of cancelling, the algorithm is repeated and the second estimate of frequency error is subtracted from the first.

Figure 32:
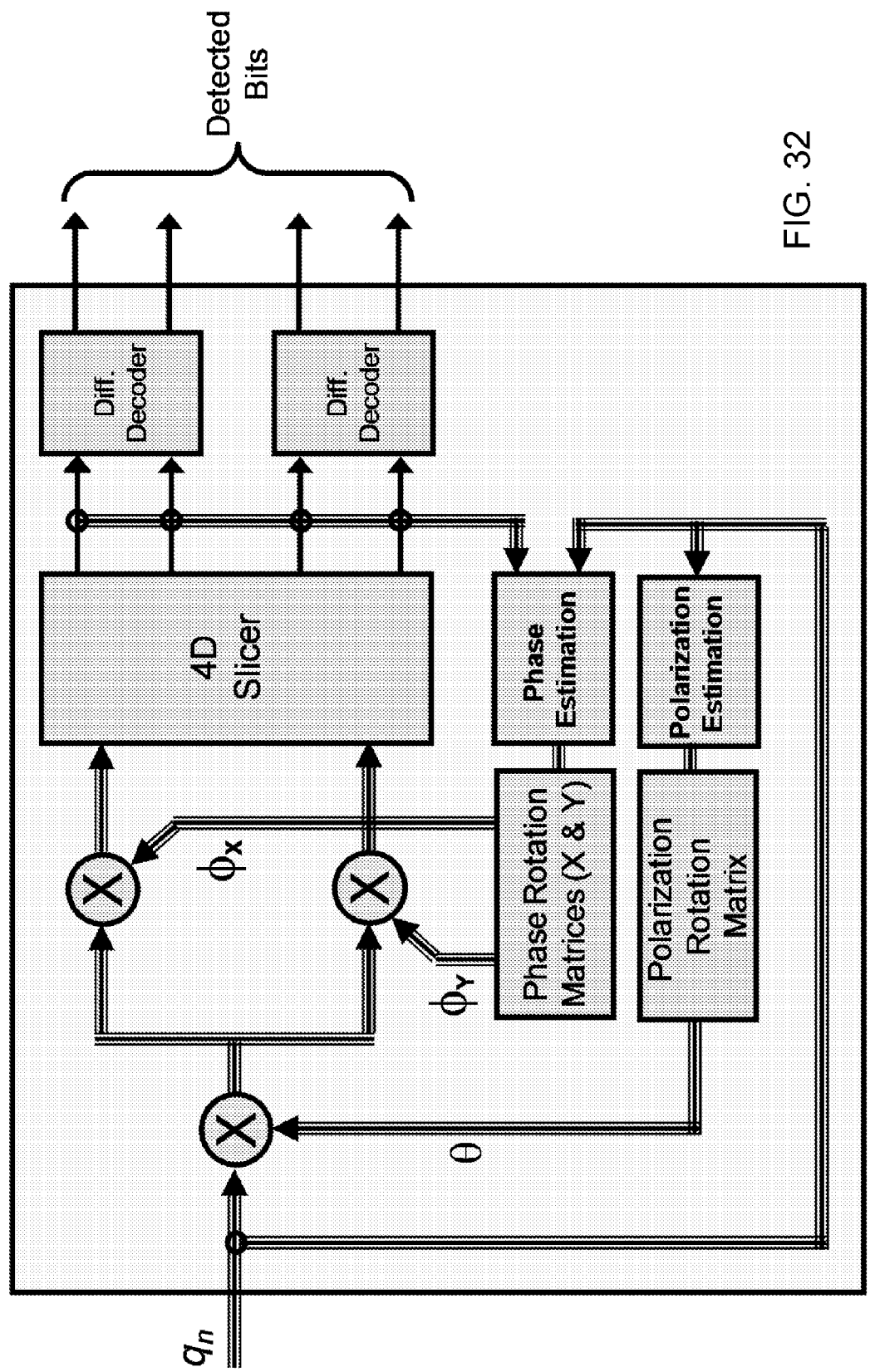
FIG. 32 is a block diagram of a carrier and polarization recovery module.
Figure 33:
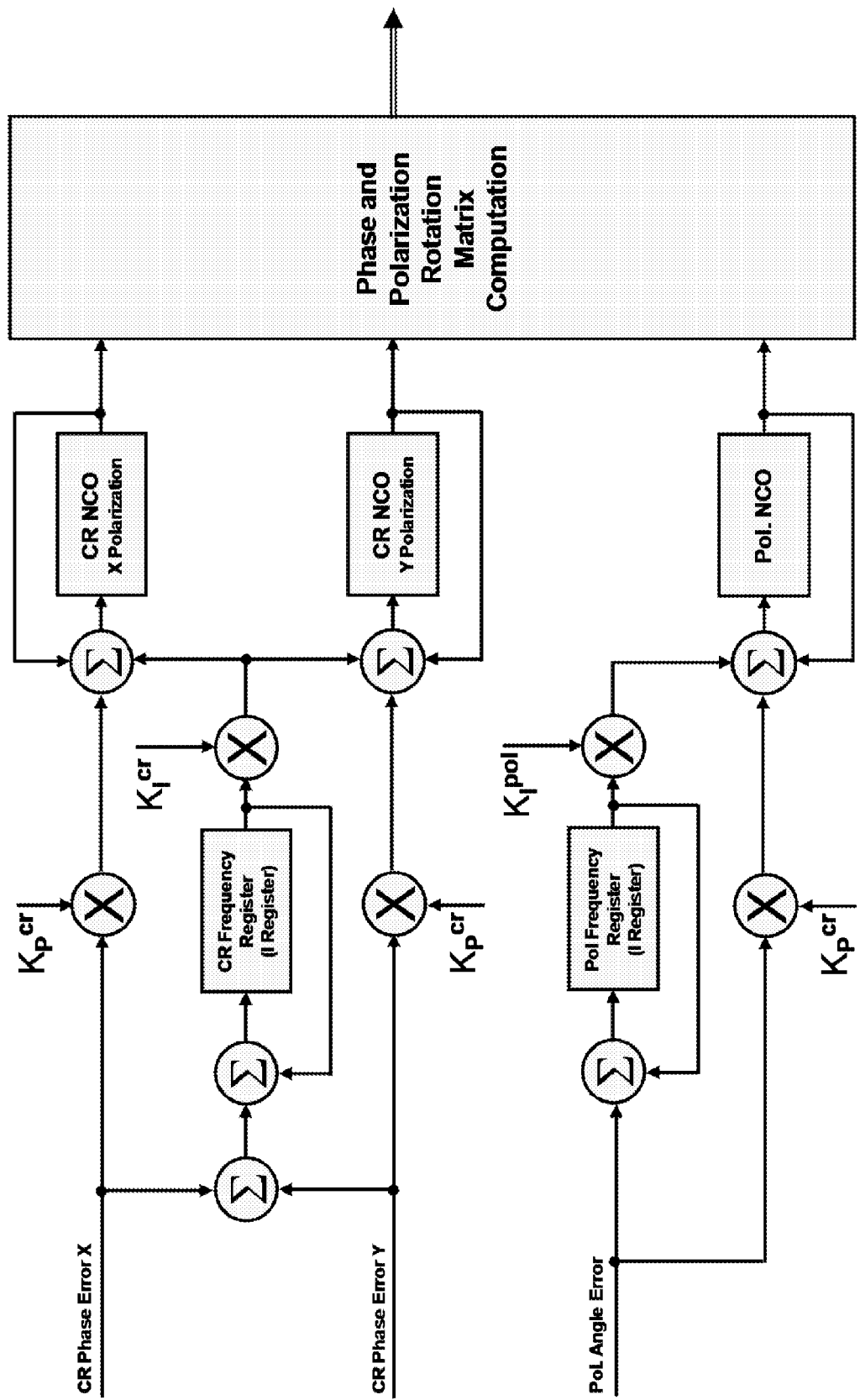
FIG. 33 is a block diagram of carrier and polarization recovery PLLs.

FIGS. 32-38 relate to carrier and polarization recovery. FIG. 32 is a block diagram of a carrier and polarization recovery module. FIG. 33 is a block diagram of carrier and polarization recovery PLLs.

Decision-directed polarization recovery techniques are based on computing a polarization angle error signal using decisions and the equalizer output. Proper alignment of phase and polarization enables correct decision to be made. Therefore, the joint convergence of three algorithms: equalization, carrier recovery, and polarization recovery enables decision-directed techniques. A polarization recovery technique that does not require decisions may be more robust.

This particular example uses Stokes parameter based polarization recovery. FIG. 34A is a diagram of a Poincare sphere and Stokes parameters. FIG. 34B tabulates Stokes parameters for decision vectors. The desired polarization states lie all in the $S_1=0$ plane. For linearly polarized states it is also $S_3=0$. For linearly polarized states that do not lie in the $S_1=0$ plane, the product $e_P = S_1 \text{sign}(S_2)$ can be used as an error signal in a feedback loop that aligns the axes of polarization of the equalizer output with the X and Y axes. The above error signal is forced to zero for circularly or elliptically polarized states, in other words, for states such that $S_3$ is nonzero. In one approach, the error signal is forced to zero if $S_3$ is larger than a certain threshold, say 0.2 (assuming $S_0=1$ normalization).

Polarization alignment does not require that phase be aligned. On the other hand, polarization alignment facilitates decision directed carrier recovery techniques. Therefore, the preferred sequence of operations is as follows. Enable blind convergence of equalizer. After blind convergence, switch to decision-directed convergence and at the same time enable polarization recovery. After convergence of polarization recovery, enable carrier recovery. In alternate embodiment, polarization recovery is enabled in an intermediate step before enabling decision-directed operation of the equalizer.

For carrier recovery, in a parallel processing implementation, the bandwidth and the capture range of a carrier recovery PLL could be significantly reduced as a result of the latency inherent in the parallel architecture. However, these problems can be alleviated by a more elaborate design. In this example, the Least Squares Carrier Frequency Estimation and the Zero Phase Start techniques are used to alleviate the capture range problem, and the Tentative Decision Phase Error Prediction technique is used to alleviate the bandwidth reduction problem.

Figure 35:
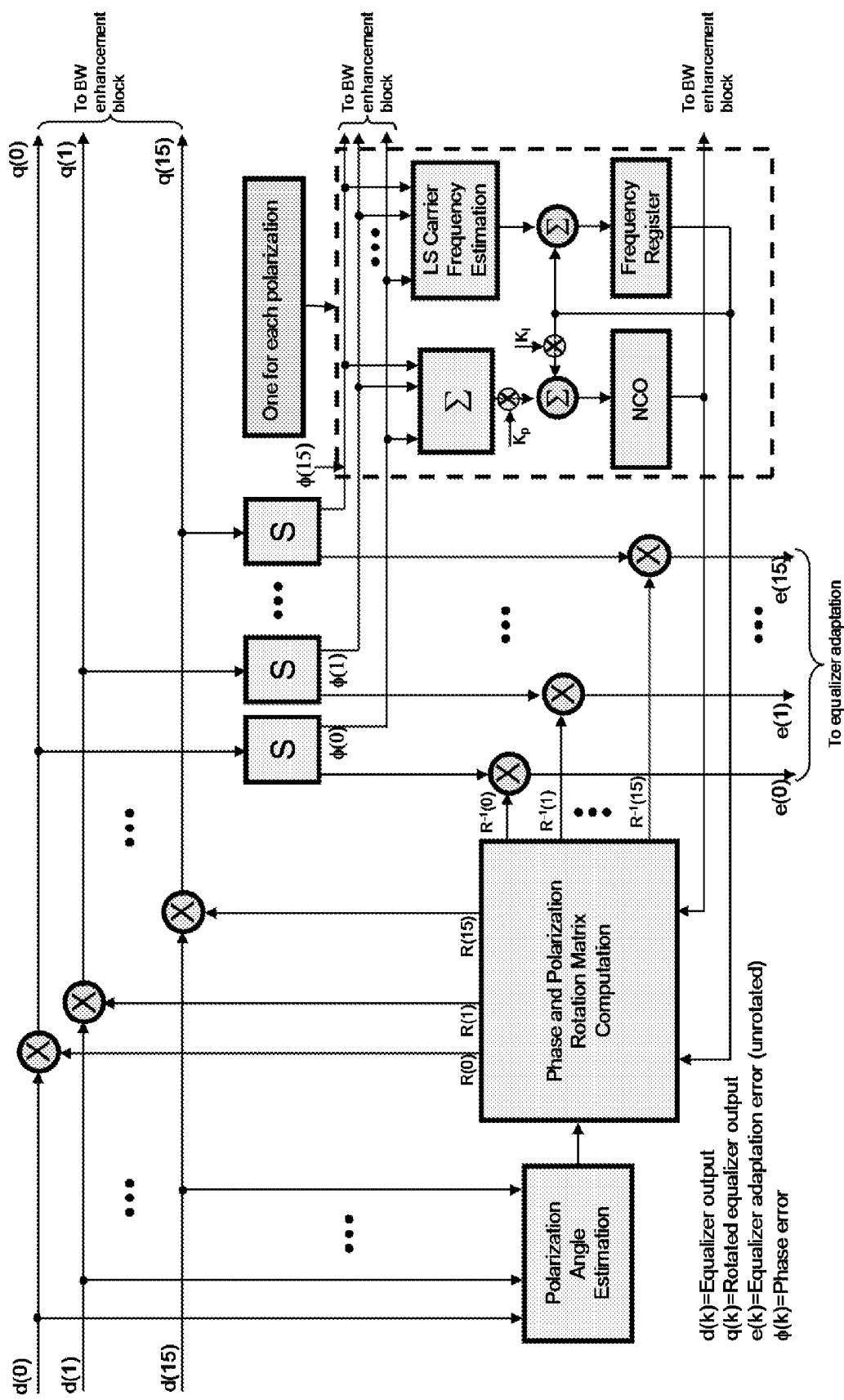
FIG. 35 is a block diagram of a parallel processing polarization and carrier recovery module.
Figure 36B:
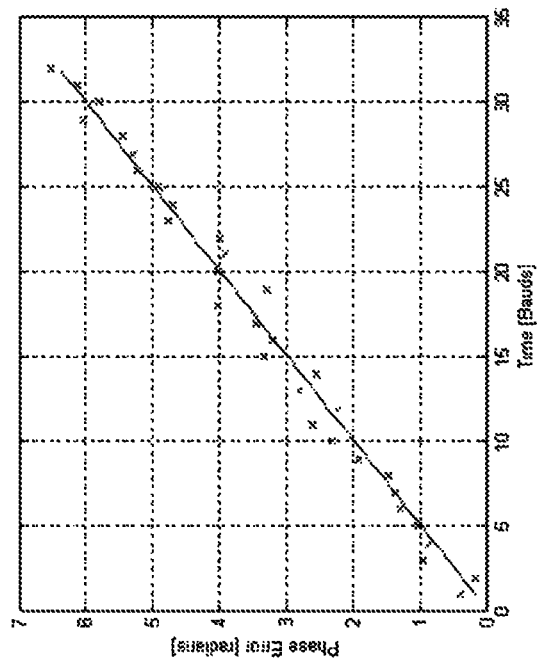
FIGS. 36A-B are diagrams illustrating least squares carrier frequency estimation.
Figure 36A:
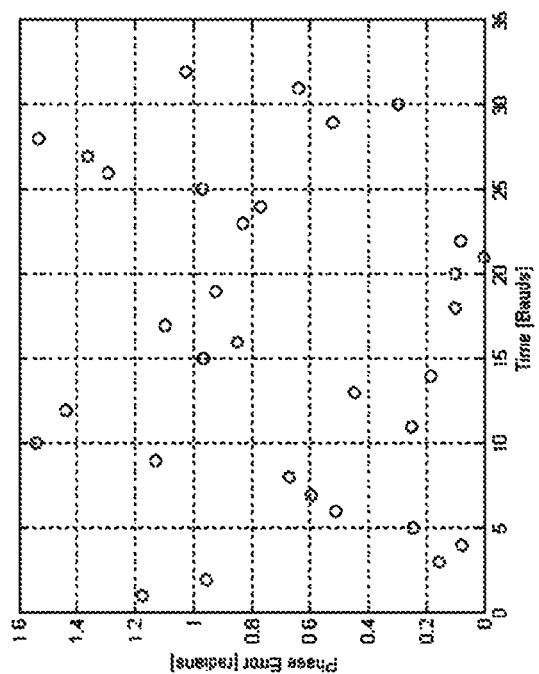
Figure 37:
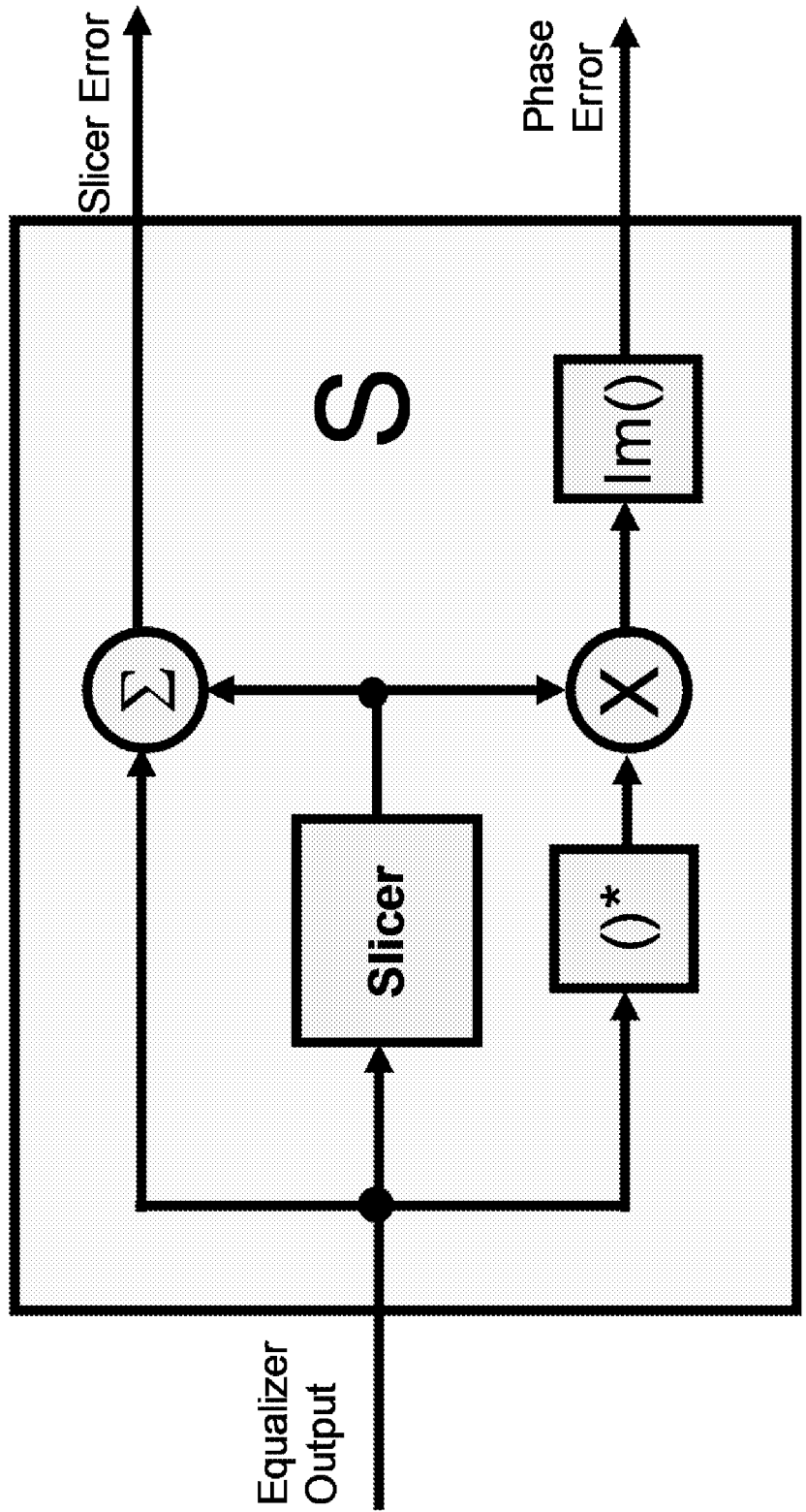
FIG. 37 is a block diagram of computation of phase error using tentative decisions.

FIGS. 35 and 37 are block diagrams of a parallel processing polarization and carrier recovery module. FIG. 35 is the high level block diagram. FIG. 37 illustrates block S in FIG. 35. FIGS. 36A-B are diagrams illustrating least squares carrier frequency estimation. In FIG. 36, the slope of least squares straight line fit to unwrapped phase error is an estimate of the carrier frequency.

In this particular example, as a result of latency, a parallel processing implementation limits the capture range of the carrier recovery PLL. To enhance the capture range, a technique based on the least squares estimator of the carrier frequency is used. During an initialization period at startup, the LS estimate of the carrier frequency is iteratively computed and added to the frequency register (I register) in the P+I loop filter until the value stored in this register accurately represents the carrier frequency. Then, in normal operation, a simplified form of the LS estimation algorithm is run, where phase unwrapping is no longer performed. The LS estimate of the carrier frequency error continues to be used to update the I register in the PLL.

FIG. 37 is a block diagram of computation of phase error using tentative decisions (block S in FIG. 35). Block S makes "tentative" decisions and uses them to compute the slicer error (used to adapt the equalizer) and the phase error (used to update the carrier recovery PLL). The decisions are "tentative" in the sense that "final" decisions will be made later with a phase error reduced by correcting the NCO output in the carrier recovery PLL using the samples of the phase error that could not be accounted before due to latency constraints.

Figure 38:
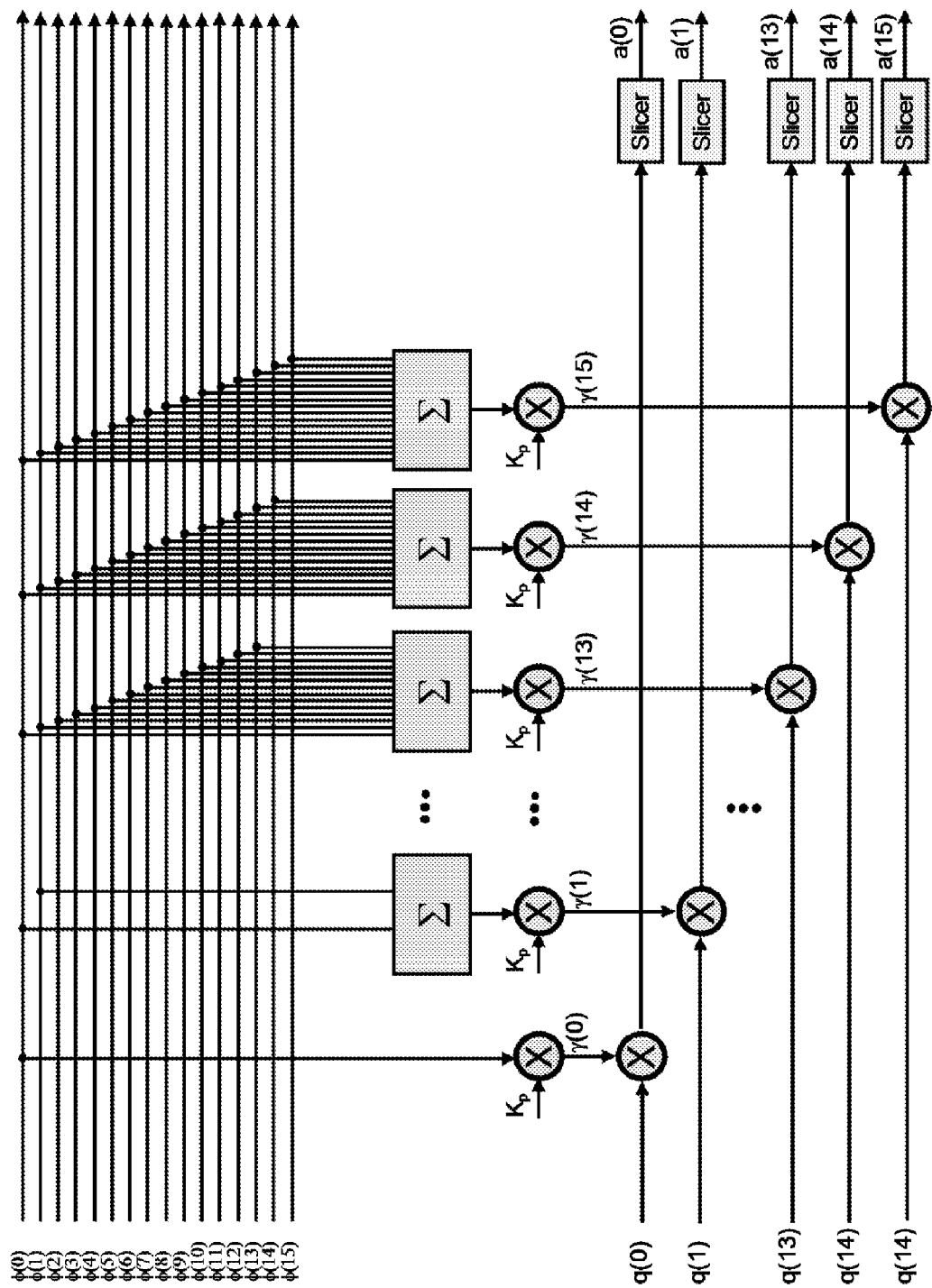
FIG. 38 is a block diagram of phase error prediction for carrier recovery bandwidth enhancement.

FIG. 38 is a block diagram of phase error prediction for carrier recovery bandwidth enhancement.

The Phase and Polarization Rotation Matrix Computation block (in FIG. 35) adds to the output of the NCO a phase rotation proportional to the interleave number and the value of the frequency register to determine the rotation angle of each interleave, thus accounting for the phase rotation generated during each symbol period as a result of the carrier frequency. The Bandwidth Enhancement block delays the samples of the equalizer output to match delays with the phase error and therefore compensate latencies. These delays are not shown in the figure.

Figure 39A:
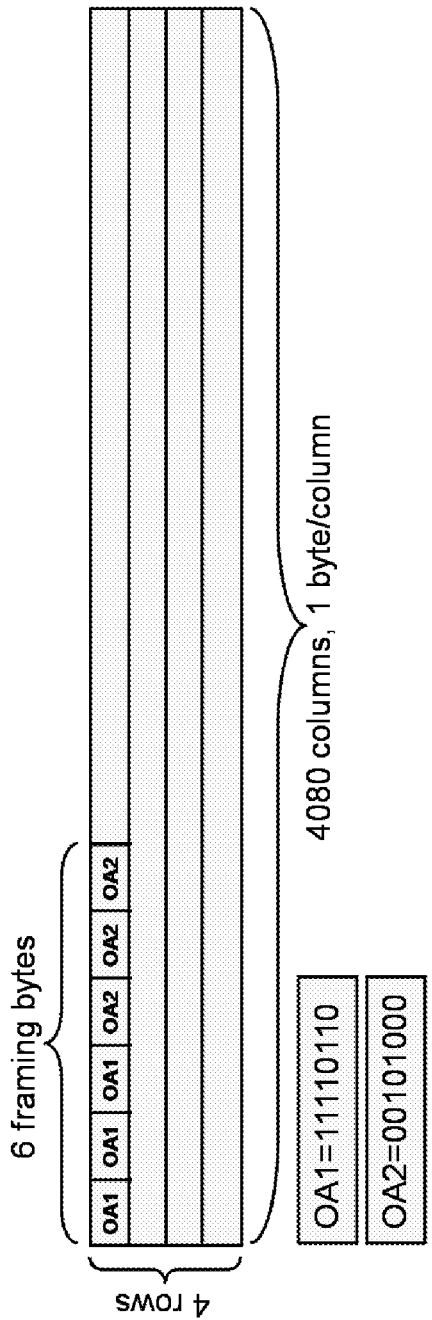
FIGS. 39A-C are diagrams illustrating OTU3 framing.
Figure 39C:
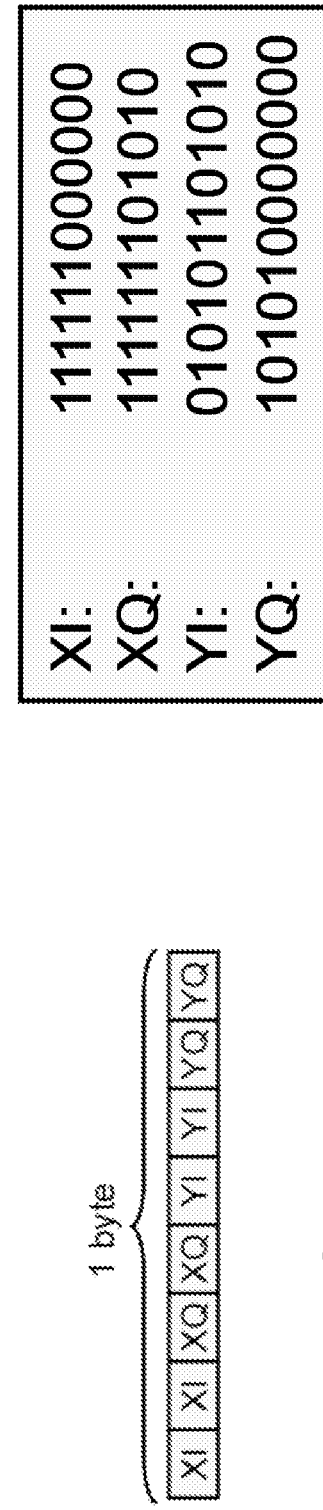
Figure 39B:

FIG. 39 is a diagram illustrating OTU3 framing. In one embodiment, the multiplexing/demultiplexing scheme shown in FIG. 39B can be used for the serial bit stream going into the 4 channels of the 2P-QPSK transmitter/receiver. This scheme results in the 12-bit framing patterns shown in FIG. 39C transmitted on each subchannel of the 2P-QPSK channel. These patterns allow the 4 subchannels to be uniquely identified and properly aligned at the system interface (SFI 5.1 or MLD). Delays between the two polarizations arising from improper convergence of the fast equalizer can also be corrected.

An OTU3 frame detector and "subchannel aligner" can also be included. If OTU3 frames are not available in the received stream, the on-chip OTU3 frame detector can be disabled. External commands will be accepted by the receiver to control the subchannel alignment hardware.

FIG. 40 is a diagram illustrating an external framing technique. The on-chip framing block performs the operations shown, either based on an internal OTU3 framing detector as described above, or on commands issued by external hardware. The framing operations are the same regardless of whether the frame detection is internal (OTU3 based) or external. The dynamic operations are used for the framing-based coarse carrier recovery.

Figure 41:
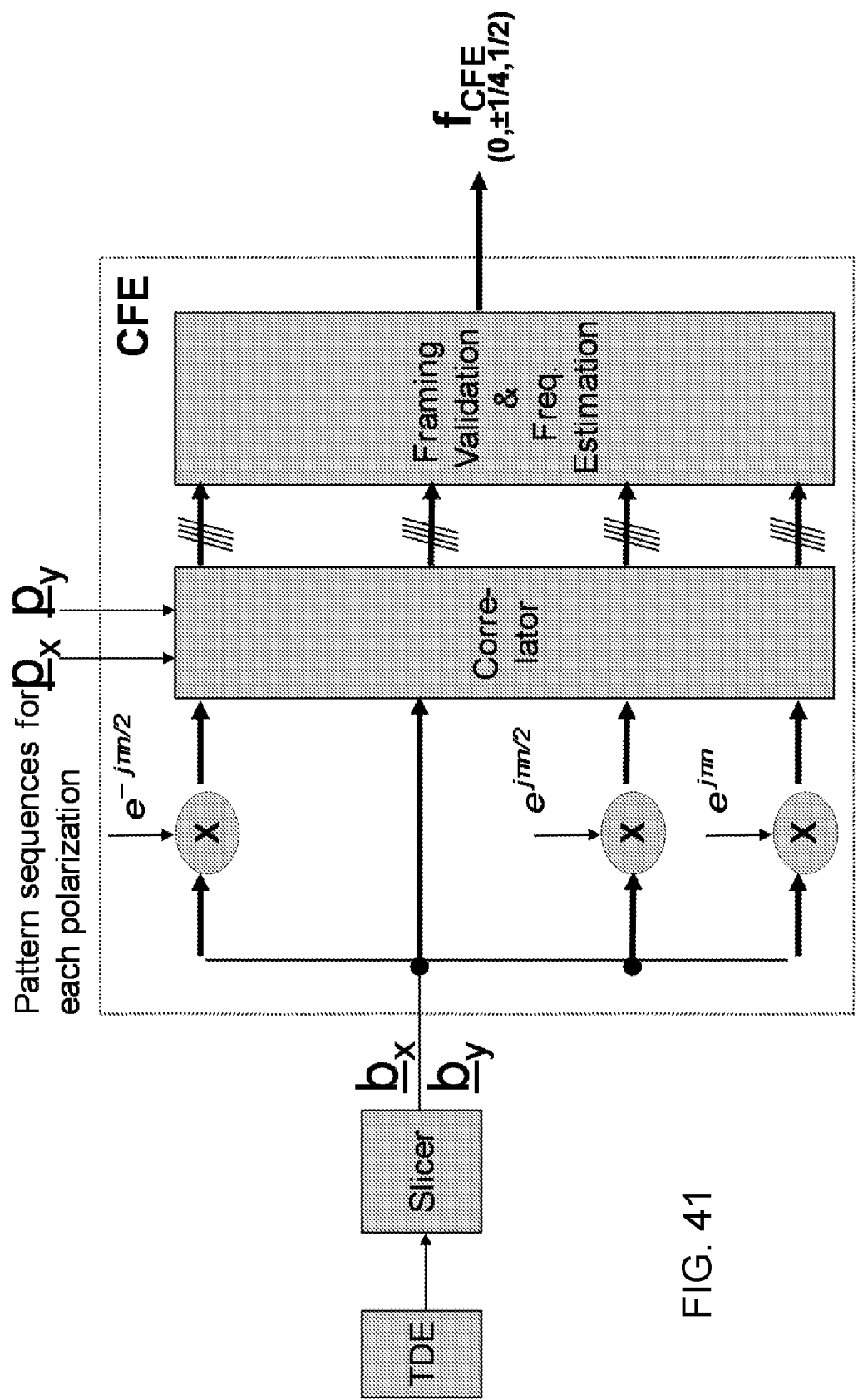
FIG. 41 is a block diagram of framing-based CCR: coarse frequency estimation.

FIG. 41 is a block diagram of framing-based CCR: coarse frequency estimation.

Figure 42:
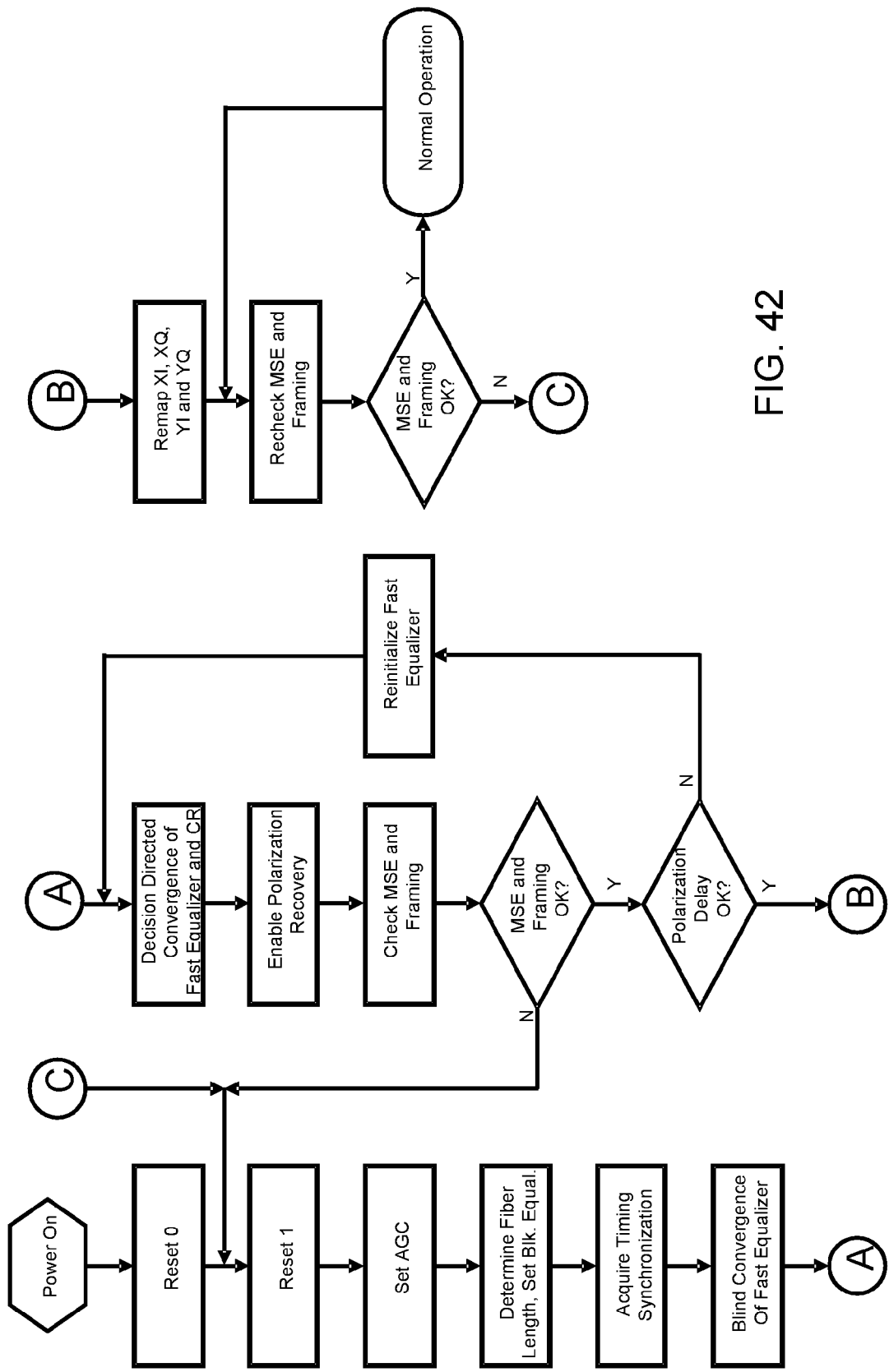
FIG. 42 is a flow diagram of a startup state machine.

FIG. 42 is a flow diagram of a startup state machine.

In one embodiment, a 50 Gb/s single-chip CMOS DP-QPSK/BPSK transceiver based on 40-nm semiconductor fabrication technology is capable of transmission over up to 3,500 km of standard optical fiber. This coherent optical transceiver incorporates transmit, receive, framer, host interface and AFE functionality in a single CMOS chip. The transceiver has the following properties: (1) The transmitter, framer and host interface are integrated with the DSP; (2) the 0.5 W/channel ADC has a 0.4 pJ/conversion-step figure of merit (FOM), which is comparable in performance but at twice the speed compared to other implementations such as that described in Y. Greshishchev et al, "A 40 GS/s 6 b ADC in 65 nm CMOS," ISSCC Dig. Tech. Papers, pp. 390-391, February 2010, and lower but at a slightly lower speed than other implementations such as that described in M. El-Chammas and B. Murmann, "A 12-GS/s 81-mW 5-bit Time-Interleaved Flash ADC With Background Timing Skew Calibration," IEEE J. Solid-State Circuits, vol. 46, no.

4, pp. 838-847, April 2011; (3) The PMD compensation is twice that of other implementations such as that described in L. Nelson et al, "Performance of 46 Gbps Dual Polarization QPSK Transceiver With Real-Time Coherent Equalization Over High PMD Fiber," J. Lightwave Tech., Vol. 27, No. 3, February 2009, pp. 158-167; (4) The length of the Bulk Chromatic Dispersion (BCD) equalizer, implemented in the frequency domain, is increased to 256 taps compared to other implementations such as the 152 tap equalizer described in A. Levene, N. Kaneda, and S. Corteselli, "Real-Time Implementation of Digital Signal Processing for Coherent Optical Digital Communication Systems," IEEE J. Sel. Topics in Quantum Electronics, Vol. 16, No. 5, September/October 2010, pp. 1227-1234; (5) A combination of feedback (FIG. 46) and feedforward fine carrier recovery (FCR), optimizes performance in the simultaneous presence of laser short-term frequency instabilities and phase noise. The feedforward carrier recovery was described above and shown in FIG. 38. An alternative feedforward embodiment is given by Viterbi-Viterbi carrier recovery, as described in A. Viterbi and A. Viterbi, "Nonlinear estimation of PSK-modulated carrier phase with application to burst digital transmission," *Information Theory, IEEE Transactions on*, vol. 29, no. 4, pp. 543-551, July 1983, which is incorporated herein by reference; (6) It incorporates automatic fiber length estimation (FLE), adaptive coarse carrier recovery (CCR) with ±5 GHz capture range, baseline wander (BLW) compensation, channel diagnostics and exhaustive search startup functions.

Figure 43:
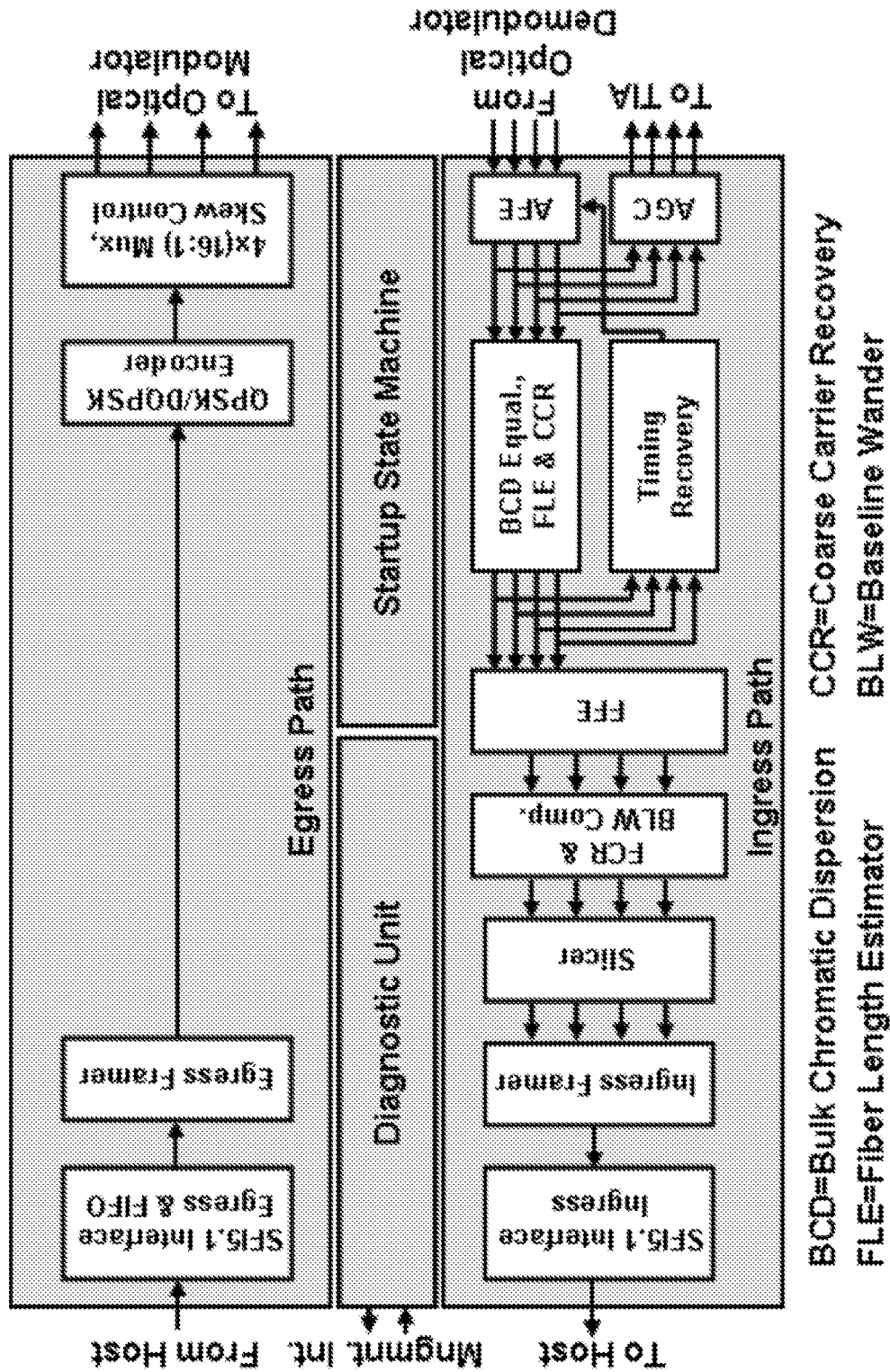
FIG. 43 is a block diagram of a 50 Gb/s single chip CMOS DP-QPSK/BPSK transceiver based on 40 nm technology and capable of transmission over up to 3,500 km of standard optical fiber.
Figure 44:
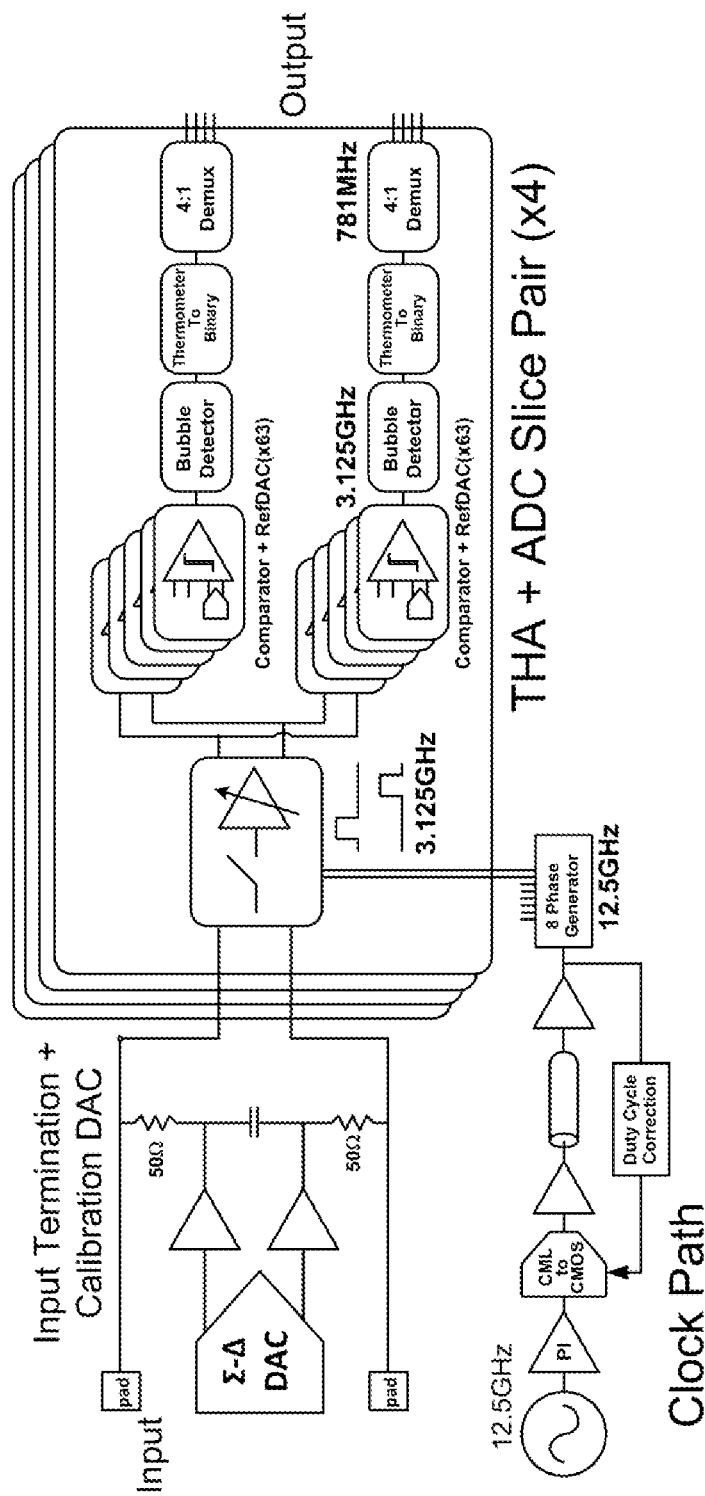
FIG. 44 is a block diagram of the AFE of the single-chip transceiver.
Figure 45:
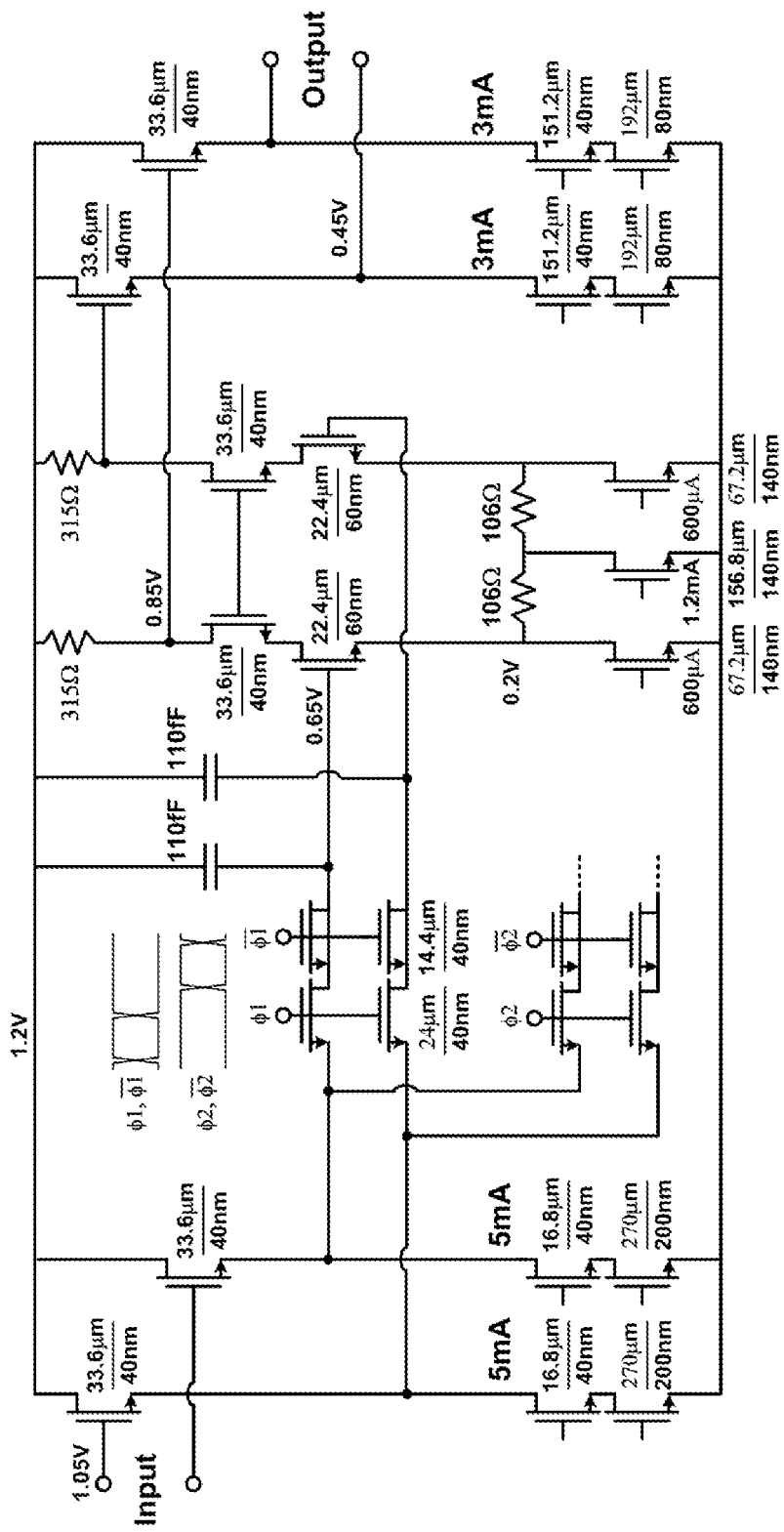
FIG. 45 is a circuit diagram for the track-and-hold and gain buffer of the single-chip transceiver.

FIG. 43 shows a simplified block diagram of the single chip CMOS DP-QPSK/BPSK transceiver (or "chip"). The receiver input signal consists of four channels (the in-phase and quadrature components of the two polarizations) generated by an external optical demodulator (optical front end). FIG. 44 shows an embodiment of an analog front end (AFE). The four channels are sampled at 25 GHz (twice the symbol rate). Each ADC channel consists of 8 interleaved 6-bit flash sub-ADCs. Physically adjacent pairs of sub-ADCs sample out of phase and share a single buffer to minimize input capacitive loading as illustrated in FIG. 45. The sample switch is a thin oxide device with its gate driven from 0V to 1.5V. The large swing maximizes linearity and ensures the switch shuts off. The source/drain/bulk of the switch is biased to 0.6 V to avoid breakdown and allow enough headroom for the differential pair in the following buffer. The buffer drives a bank of comparators, each with an independent Digital-to-Analog Converter (DAC) to set its reference. The ADC outputs are retimed, demultiplexed to 781.25 MHz and passed to the DSP. Each ADC is calibrated at startup by its own on-chip ΣΔ DAC (the CalDAC), with the input squelched. Each comparator threshold is set by its dedicated DAC (RefDAC). The CalDAC generates each of 63 desired references in turn, and an on-chip state machine adjusts each RefDAC to match the desired reference. In this way, buffer nonlinearity, gain and offset are calibrated out, as are comparator offsets. The 8 sampling phases for each ADC are generated from a common 12.5 GHz LC VCO which drives 4 phase interpolators (PI), one for each ADC. Their digital control is generated by the timing recovery block in the DSP. The divider generates eight 3.125 GHz 25% duty cycle clocks that drive the sampling switches. A feedback loop between PI output and 8-phase input ensures a 50% duty cycle. Short clock delays allow interleave timing errors of <2 ps with no other correction or calibration.

Figure 46:
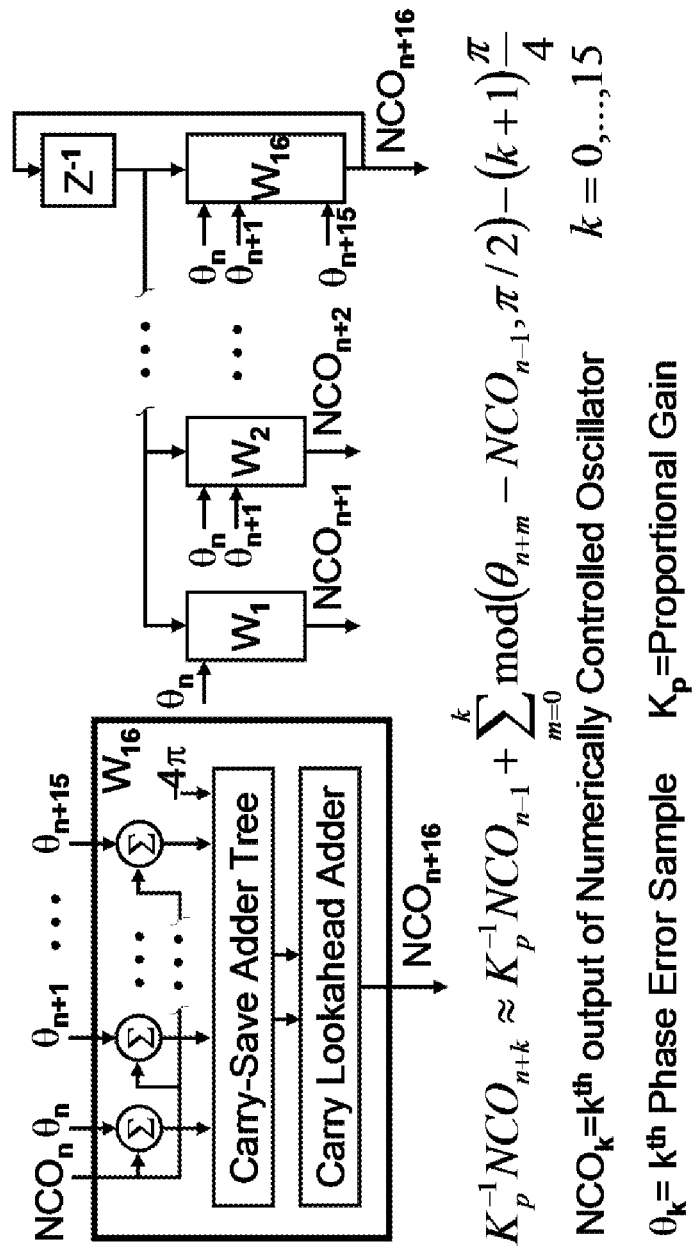
FIG. 46 is the FCR Phase-Locked Loop of the single-chip transceiver.

The DSP implements the main receiver functions, such as compensation of chromatic and polarization mode dispersion, timing and carrier recovery, etc. The DSP uses parallel processing with a parallelization factor of 16, which results in a clock frequency of 781.25 MHz. The chromatic dispersion is compensated by the BCD equalizer, which operates in the frequency domain using a 512-point Fast Fourier Transform (FFT) and inverse FFT (IFFT). The fiber length is automatically identified during the startup and the response of the filter is programmed accordingly. The 16-tap T/2 MIMO FFE performs the polarization demultiplexing and the compensation of PMD and polarization-dependent loss (PDL). Fast adaptation is essential in optical channels since the receiver must track nonstationary effects (PMD, PDL, changes in the state of polarization of the TX or LO lasers, etc.). A decision-directed LMS algorithm with no downsampling of the updates is used. The FCR is key to the receiver performance. It must be able to track high-frequency laser phase noise, nonlinear phase noise and short-term frequency instabilities of the lasers. A combination of a decision-directed PLL and a feedforward carrier recovery results in the best performance. The latency resulting from parallel-processing would severely limit the bandwidth of the PLL, degrading its phase noise tracking performance and its capture range. To achieve high bandwidth, the technique shown in FIG. 46 is used. This technique, based on the approximation of the PLL computation shown in the equation of the figure, allows all parallel NCO outputs to be computed in one clock cycle thus eliminating the latency inherent in parallel processing. A CCR preprocessing block expands the capture range to ±5 GHz. The output of the DSP is the recovered data from the four input channels. The Framer uses OTU3 framing information to identify the four channels and pass them properly sorted to the Ingress Host Interface. Embodiments for carrier recovery are described hereinabove.

In one embodiment, the feedforward FCR comprises a blind phase search (BPS) carrier recovery algorithm. Examples of BPS algorithms are described in Pfau, T.; Hoffmann, S.; Noe, R.; "Hardware-Efficient Coherent Digital Receiver Concept with Feedforward Carrier Recovery for M-QAM Constellations," Lightwave Technology, Journal of, vol. 27, no. 8, pp. 989-999, Apr. 15, 2009. FCR tracks laser phase noise, sinusoidal or quasi-sinusoidal laser frequency jitter, and phase noise introduced by nonlinear optical interactions such as cross phase modulation. When large laser phase noise is present (e.g., in the FFE samples), the BPS algorithm generally provides superior noise performance. In some embodiments, FCR based on a combination of a traditional decision-directed PLL with a subsequent Feedforward Carrier Recovery stage based on the BPS algorithm offers significant performance advantages.

Figure 47:
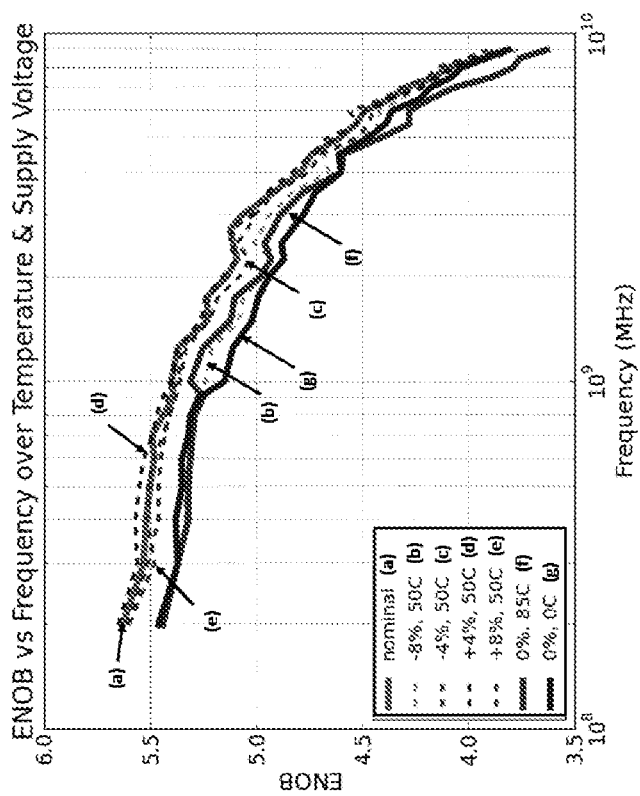
FIG. 47 is an example of ADC ENOB versus frequency over temperature and supply voltage, for the AFE of the single-chip receiver.
Figure 48:
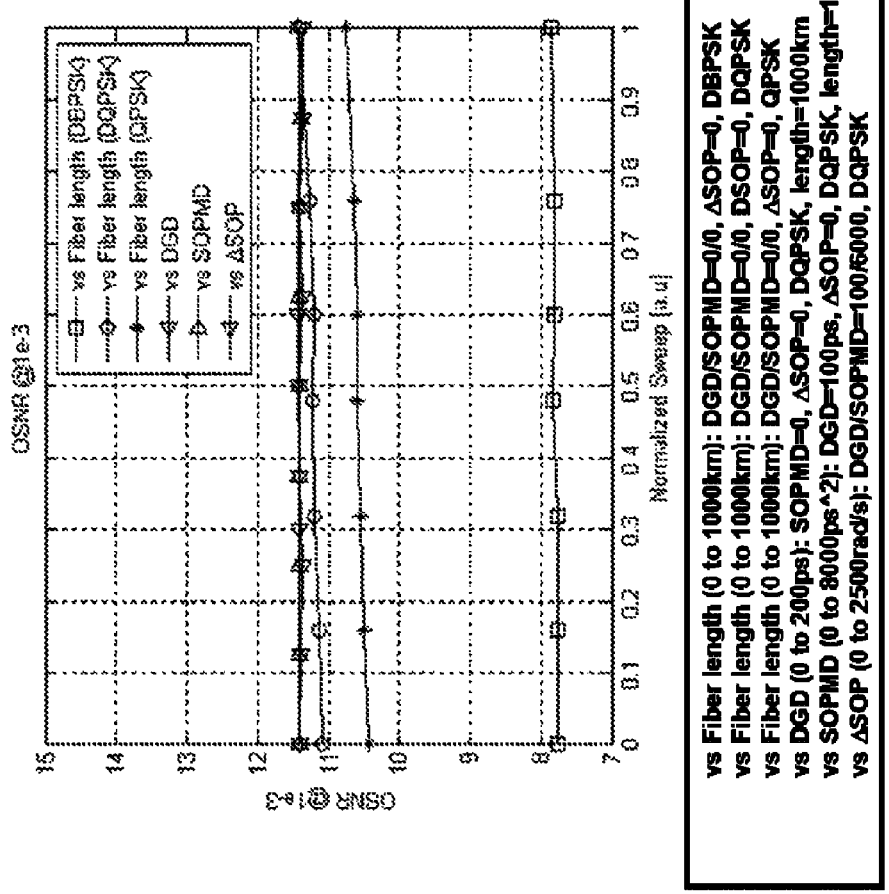
FIG. 48 is the Optical Signal-to-Noise Ratio (OSNR) required for $10^{-3}$ bit error rate, for several normalized paramaters.

FIG. 47 shows measured ADC ENOB versus frequency at various case temperatures and supply voltages with the DSP running. FIG. 48 shows the required OSNR versus normalized fiber length, differential group delay (DGD), second-order PMD (SOPMD), and rotational speed of the state of polarization (SOP). In particular, FIG. 48 shows the OSNR required for $10^{-3}$ bit error rate versus the following normalized parameters: (fiber length/1000-km), (differential group delay/200-ps), (second order polarization mode dispersion/8000-$ps^2$), (speed of rotation of the state of polarization/2500-(rad/sec)). In each sweep, parameters other than the one being swept are constant as indicated in FIG. 48. FIG. 48 also shows the values of parameters which remain constant. The range of DGD and SOPMD is twice that of alternative implementations such as that described in L. Nelson et al, "Performance of 46 Gbps Dual Polarization QPSK Transceiver With Real-Time Coherent Equalization Over High PMD Fiber," J. Lightwave Tech., Vol. 27, No. 3, February 2009, pp. 158-167, and, as is evident from FIG. 48, the OSNR penalty at maximum DGD/SOPMD is negligible (compared to ~1 dB in implementations such as that described in L. Nelson et al, "Performance of 46 Gbps Dual Polarization QPSK Transceiver With Real-Time Coherent Equalization Over High PMD Fiber," J. Lightwave Tech., Vol. 27, No. 3, February 2009, pp. 158-167. Chromatic dispersion performance, when tested for chromatic dispersion having a magnitude of up to 55,000 ps/nm (chromatic dispersion of 55,000 ps/nm is equivalent to 3,500 km of standard single mode fiber), results in a measured OSNR penalty generally less than or comparable to 1 dB in example embodiments.

Figure 49:
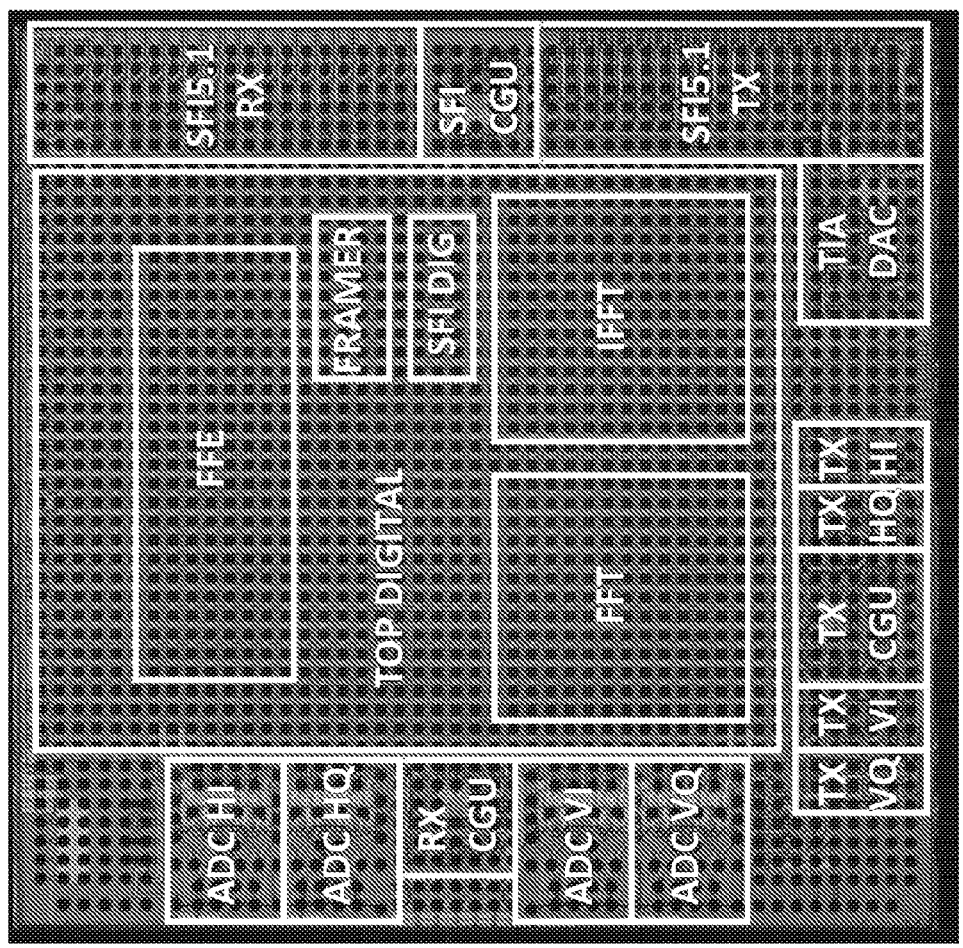
FIG. 49 is an illustration of the single-chip transceiver, with individual blocks outlined.

FIG. 49 shows a micrograph of the 75 mm$^2$ chip. The total gate count is 40 million, and the power dissipation is 25 W of which the AFE share is 5 W (including transmitter, receiver and host interface analog blocks). The blocks identified in the outline include the FFE block, the Framer block, the SFI DIG block (SFI Digital block), the FFT block, the IFFT block, and ADC HI block (Receiver block for XI channel), ADC HQ block (Receiver block for XQ channel), ADC VI block (Receiver block for YI channel), ADC VQ block (Receiver block for YQ channel), RX CGU (Receiver clock generation unit), SFI 5.1 RX block, SFI 5.1 TX block, SFI CGU (clock generation unit), TIA DAC (Trans-Impedence Amplifier DAC), and TX HI block (Transmitter block for XI channel), TX HQ block (Transmitter block for XQ channel), TX VI block (Transmitter block for YI channel), TX VQ block (Transmitter block for YQ channel), TX CGU (Transmitter CGU block). The Top Digital block comprises the following blocks: FFE, Framer, SFI DIG, FFT, and IFFT.

FIG. 50 is a comparison of receiver performance of the chip relative to alternative implementations such as that described in Y. Greshishchev et al, "A 40 GS/s 6 b ADC in 65 nm CMOS," ISSCC Dig. Tech. Papers, pp. 390-391, February 2010.

Figure 51:
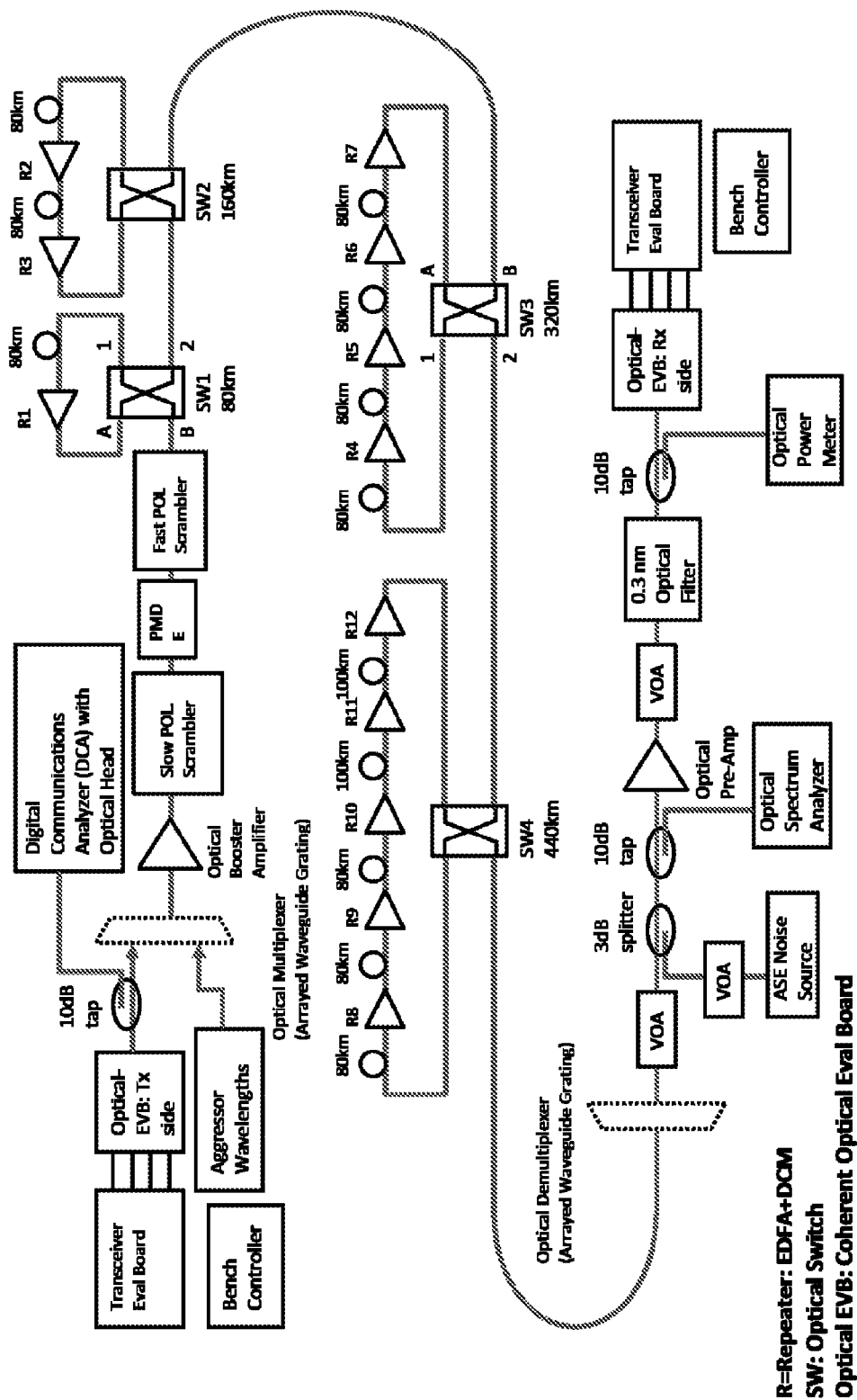
FIG. 51 is a diagram of the optical test bench layout used in the OSNR measurements of FIG. 48.

FIG. 51 is the optical test bench layout used to perform the measurements summarized in FIG. 50.

Figure 52:
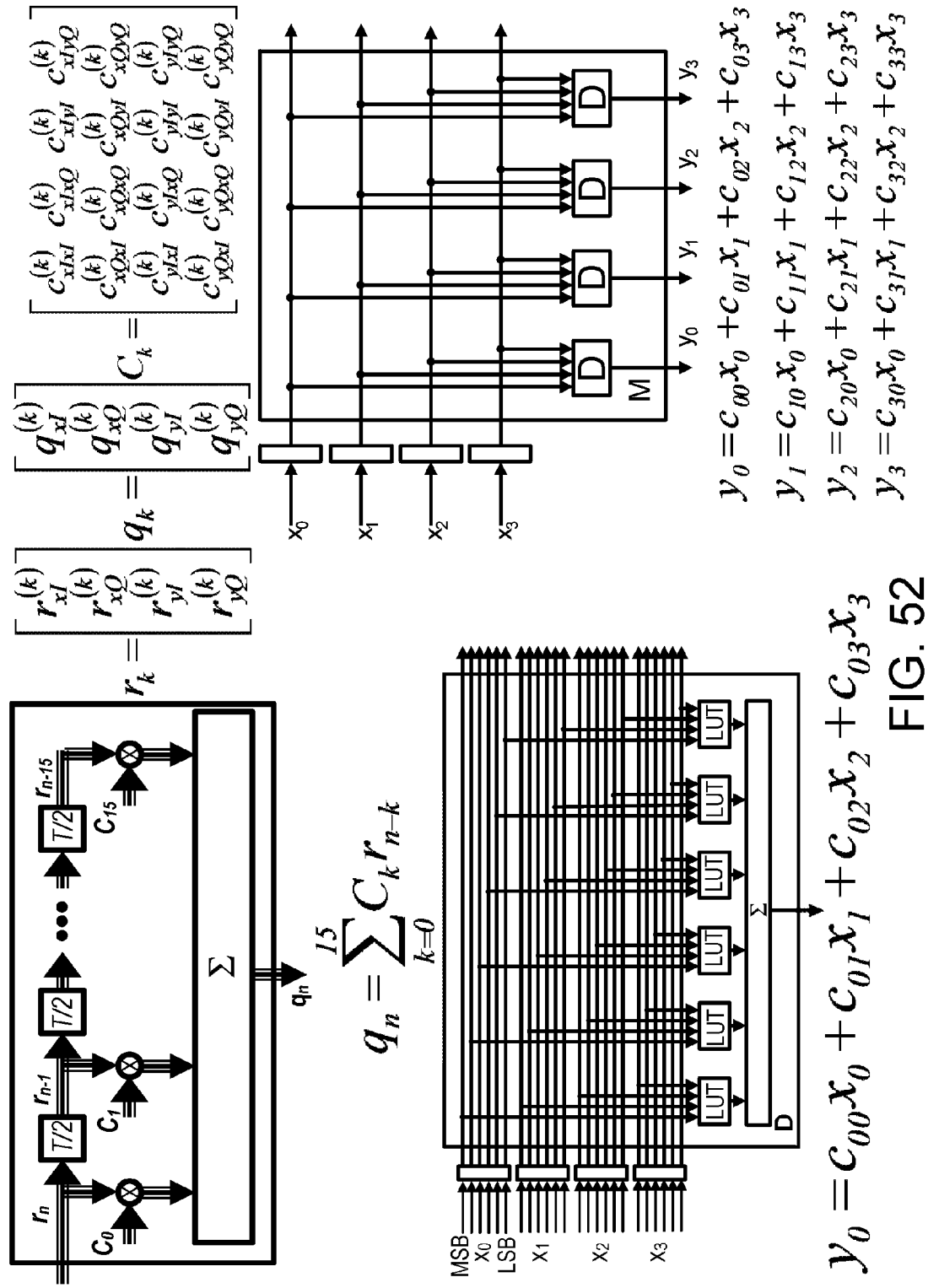
FIG. 52 is a set of block diagrams showing the architecture for the four-dimensional MIMO FFE.

FIG. 52 is a set of block diagrams illustrating the four-dimensional MIMO FFE.

Although the detailed description contains many specifics, these should not be construed as limiting the scope of the invention but merely as illustrating different examples and aspects of the invention. It should be appreciated that the scope of the invention includes other embodiments not discussed in detail above. For example, the functionality has been described above as implemented primarily in electronic circuitry. This is not required, various functions can be performed by hardware, firmware, software, and/or combinations thereof. Depending on the form of the implementation, the "coupling" between different blocks may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A transceiver device embodied in an integrated circuit, the device comprising:
   a transmitter module including:
      a transmitter host interface embodied in the integrated circuit, the transmitter host interface being configured to receive an input host signal;
      a transmitter framer embodied in the integrated circuit, the transmitter framer being configured to frame the input host signal and to generate a framed host signal;
      a transmitter coder embodied in the integrated circuit, the transmitter coder being configured to encode the framed host signal to generate an encoded host signal for transmission over a communication channel;
   a receiver module including:
      a bulk chromatic dispersion, fiber length estimation, and coarse carrier recovery circuit embodied in the integrated circuit, the bulk chromatic dispersion, fiber length estimation, and coarse carrier recovery circuit being configured to equalize a digital input ingress signal to generate an equalized ingress signal;
      a receiver framer embodied in the integrated circuit, the receiver framer being configured to frame the equalized ingress signal to generate a framed ingress signal; and
      a receiver host interface embodied in the integrated circuit, the receiver host interface being configured to output the framed ingress signal;
      wherein the receiver host interface is compatible with a framing protocol of the receiver framer.

2. The device of claim 1 further comprising an analog-to-digital converter (ADC) embodied in the integrated circuit, the ADC being configured to convert an analog input ingress signal to the digital input ingress using an approximately 0.4 pJ/conversion-step figure of merit.

3. The device of claim 1 wherein the bulk chromatic dispersion, fiber length estimation, and coarse carrier recovery circuit includes a fiber length estimation module configured to perform an automatic fiber length estimator upon startup of the transceiver and automatically programming a response of a filter based on the fiber length estimation.

4. The device of claim 1 further comprising a feedback fine carrier recovery circuit embodied in the integrated circuit, the feedback fine carrier recovery circuit being configured to perform a feedback fine carrier recovery and to perform a feed forward fine recovery to recover a carrier signal of the digital input ingress signal.

5. The device of claim 4 wherein feedback fine carrier recovery circuit includes a decision directed phase-locked loop; and wherein the feedback fine carrier recovery circuit is configured to perform the feedback fine carrier recovery.

6. The device of claim 5 wherein the decision directed phase-locked loop is configured to compute parallel numerically controlled oscillator outputs in a single clock cycle.

7. The device of claim 1 further comprising an analog front end embodied in the integrated circuit;
   wherein the analog front end includes an analog front end receiver module configured to receive an analog input ingress signal having four channels including an in-phase horizontally polarized channel, an in-phase vertically polarized channel, a quadrature horizontally polarized channel, and a quadrature vertically polarized channel;

wherein the analog front end includes an analog front end sampling module configured to sample each of the four channels of the analog input ingress signal at a sampling rate greater than a symbol rate to generate the digital input ingress signal; and wherein the analog front end includes an analog front end output module configured to provide the digital input ingress signal to the bulk chromatic dispersion, fiber length estimation, and coarse carrier recovery circuit.

8. The device of claim 7 wherein the sampling module includes at least four analog-to-digital converters (ADCs), each of the ADCs being configured one of the four channels of the analog input ingress signal; wherein each of the ADCs include a plurality of interleaved sub-ADCs; and wherein adjacent pairs of the sub-ADCs sample out of phase with each other and share a single buffer.

9. The device of claim 7 further comprising a timing recovery circuit embodied in the integrated circuit, the timing recovery circuit being configured to generate a timing signal based on an output of the bulk chromatic dispersion, fiber length estimation, and coarse carrier recovery circuit; and wherein the timing recovery circuit is configured to provide the timing signal to the analog front end for sampling the analog input ingress signal.

10. The device of claim 1 further comprising a feedforward equalizer embodied in the integrated circuit, the feedforward equalizer being configured to equalize the equalized ingress signal by performing polarization demultiplexing and compensation for polarization mode dispersion and polarization-dependent loss.

11. An optical communication system embodied in an integrated circuit, the system comprising:
a transmitter module including:
a transmitter host interface embodied in the integrated circuit, the transmitter host interface being configured to receive an input host signal;
a transmitter framer embodied in the integrated circuit, the transmitter framer being configured to frame the input host signal and to generate a framed host signal;
a transmitter coder embodied in the integrated circuit, the transmitter coder being configured to encode the framed host signal to generate an encoded host signal;
an optical front end including:
an optical front end converter module configured to convert the encoded host signal from an electrical signal to an optical output signal for transmission over a communication channel; and
an optical receiver module configured to receive an optical ingress signal from the communication channel;
wherein the optical front end converter module is configured to convert the optical ingress signal to a digital input ingress signal including an electrical signal;
a receiver module including:
a bulk chromatic dispersion, fiber length estimation, and coarse carrier recovery circuit embodied in the integrated circuit, the bulk chromatic dispersion, fiber length estimation, and coarse carrier recovery circuit being configured to equalize the digital input ingress signal to generate an equalized ingress signal;

a receiver framer embodied in the integrated circuit, the receiver framer being configured to frame the equalized ingress signal to generate a framed ingress signal; and
a receiver host interface embodied in the integrated circuit, the receiver host interface being configured to output the framed ingress signal;
wherein the receiver host interface is compatible with a framing protocol of the receiver framer;
wherein the transmitter module and the receiver module form a transceiver.

12. The system of claim 11 further comprising an analog-to-digital converter (ADC) embodied in the integrated circuit, the ADC being configured to convert an analog input ingress signal to the digital input ingress using an approximately 0.4 pJ/conversion-step figure of merit.

13. The system of claim 11 wherein the bulk chromatic dispersion, fiber length estimation, and coarse carrier recovery circuit includes a fiber length estimation module configured to perform an automatic fiber length estimator upon startup of the transceiver and automatically programming a response of a filter based on the fiber length estimation.

14. The system of claim 11 further comprising a feedback fine carrier recovery circuit embodied in the integrated circuit, the feedback fine carrier recovery circuit being configured to perform a feedback fine carrier recovery and to perform a feed forward fine recovery to recover a carrier signal of the digital input ingress signal.

15. The system of claim 14 wherein feedback fine carrier recovery circuit includes a decision directed phase-locked loop; and wherein the feedback fine carrier recovery circuit is configured to perform the feedback fine carrier recovery.

16. The system of claim 15 wherein the decision directed phase-locked loop is configured to compute parallel numerically controlled oscillator outputs in a single clock cycle.

17. The system of claim 11 further comprising an analog front end embodied in the integrated circuit;
wherein the analog front end includes an analog front end receiver module configured to receive an analog input ingress signal having four channels including an in-phase horizontally polarized channel, an in-phase vertically polarized channel, a quadrature horizontally polarized channel, and a quadrature vertically polarized channel;
wherein the analog front end includes an analog front end sampling module configured to sample each of the four channels of the analog input ingress signal at a sampling rate greater than a symbol rate to generate the digital input ingress signal; and
wherein the analog front end includes an analog front end output module configured to provide the digital input ingress signal to the bulk chromatic dispersion, fiber length estimation, and coarse carrier recovery circuit.

18. The system of claim 17 wherein the sampling module includes at least four analog-to-digital converters (ADCs), each of the ADCs being configured one of the four channels of the analog input ingress signal; wherein each of the ADCs include a plurality of interleaved sub-ADCs; and wherein adjacent pairs of the sub-ADCs sample out of phase with each other and share a single buffer.

19. The system of claim 17 further comprising a timing recovery circuit embodied in the integrated circuit, the timing recovery circuit being configured to generate a timing signal based on an output of the bulk chromatic dispersion, fiber length estimation, and coarse carrier recovery circuit; and wherein the timing recovery circuit is configured to provide the timing signal to the analog front end for sampling the analog input ingress signal.

20. The system of claim 11 further comprising a feedforward equalizer embodied in the integrated circuit, the feedforward equalizer being configured to equalize the equalized ingress signal by performing polarization demultiplexing and compensation for polarization mode dispersion and polarization-dependent loss.

\* \* \* \* \*